(12) United States Patent
Koshti

(10) Patent No.: US 8,577,120 B1
(45) Date of Patent: Nov. 5, 2013

(54) METHODS AND SYSTEMS FOR CHARACTERIZATION OF AN ANOMALY USING INFRARED FLASH THERMOGRAPHY

(75) Inventor: Ajay M. Koshti, League City, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 533 days.

(21) Appl. No.: 12/900,644

(22) Filed: Oct. 8, 2010

Related U.S. Application Data

(60) Provisional application No. 61/258,266, filed on Nov. 5, 2009.

(51) Int. Cl.
*G06K 9/00* (2006.01)

(52) U.S. Cl.
USPC .............................. 382/141; 250/341.8; 374/5

(58) Field of Classification Search
USPC ............ 382/141, 143, 149, 152; 348/86, 125; 250/330, 332, 341.1, 341.6, 341.8, 250/339.02, 339.14; 356/51; 374/5, 10, 374/120, 121
See application file for complete search history.

(56) References Cited

U.S. PATENT DOCUMENTS

| | | | |
|---|---|---|---|
| 6,013,915 A | 1/2000 | Watkins | |
| 6,236,049 B1 | 5/2001 | Thomas et al. | |
| 6,346,704 B2 | 2/2002 | Kenway | |
| 6,367,968 B1 | 4/2002 | Ringermacher et al. | |
| 6,394,646 B1 | 5/2002 | Ringermacher et al. | |
| 6,517,238 B2 | 2/2003 | Sun et al. | |
| 6,542,849 B2 | 4/2003 | Sun | |
| 6,690,016 B1 | 2/2004 | Watkins et al. | |
| 6,712,502 B2 | 3/2004 | Zalameda et al. | |
| 6,730,912 B2 * | 5/2004 | Sun et al. | 250/341.6 |
| 6,751,342 B2 | 6/2004 | Shepard | |
| 6,838,670 B2 | 1/2005 | Lewis et al. | |
| 6,840,666 B2 | 1/2005 | Enachescu et al. | |
| 7,149,343 B2 | 12/2006 | Enachescu et al. | |
| 7,157,714 B2 * | 1/2007 | Del Grande | 250/341.6 |
| 7,186,981 B2 | 3/2007 | Shepard et al. | |

(Continued)

OTHER PUBLICATIONS

Introduction to EchoTherm—Version 6, Thermal Wave Imaging, Inc., 2002, pp. 1-25.

(Continued)

*Primary Examiner* — Samir Ahmed
(74) *Attorney, Agent, or Firm* — Kurt G. Hammerle

(57) ABSTRACT

A method for characterizing an anomaly in a material comprises (a) extracting contrast data; (b) measuring a contrast evolution; (c) filtering the contrast evolution; (d) measuring a peak amplitude of the contrast evolution; (d) determining a diameter and a depth of the anomaly, and (e) repeating the step of determining the diameter and the depth of the anomaly until a change in the estimate of the depth is less than a set value. The step of determining the diameter and the depth of the anomaly comprises estimating the depth using a diameter constant $C_D$ equal to one for the first iteration of determining the diameter and the depth; estimating the diameter; and comparing the estimate of the depth of the anomaly after each iteration of estimating to the prior estimate of the depth to calculate the change in the estimate of the depth of the anomaly.

34 Claims, 35 Drawing Sheets

(56) References Cited

U.S. PATENT DOCUMENTS

| | | | |
|---|---|---|---|
| 7,365,330 B1 | 4/2008 | Sun | |
| 7,419,298 B2 | 9/2008 | Ouyang et al. | |
| 7,425,093 B2 | 9/2008 | Wickersham, Jr. et al. | |
| 7,457,455 B2 | 11/2008 | Matsui et al. | |
| 7,724,925 B2 * | 5/2010 | Shepard | 382/115 |
| 7,822,268 B2 * | 10/2010 | Rothenfusser et al. | 382/162 |
| 2006/0262971 A1 | 11/2006 | Foes et al. | |

OTHER PUBLICATIONS

MOSAIQ Manual Screen Shots from Software Program, Thermal Wave Imaging the Art of Inspection, 2001-2005, pp. 1-13.
ThermoCalc-6L User's Manual, 1998, pp. 1-42.
ThermoHeat-3D User's Manual, 1998, pp. 1-17.

* cited by examiner

| Calculation number | Measure from contrast data | Reference time symbol | Reference time, sec | $t'$ | $M$ |
|---|---|---|---|---|---|
| 1 | $t_{peak}$ | $t_{peak}^{ref}$ | 0.430 | 0.211 | 1.0 |
| 2 | $t_{50L}$ | $t_{50L}^{ref}$ | 0.075 | 0.169 | 0.5 |
| 3 | $t_{50R}$ | $t_{50R}^{ref}$ | 1.620 | 0.349 | 0.5 |
| 4 | $t_{10R}$ | $t_{10R}^{ref}$ | 2.800 | 1.315 | 0.1 |

*Fig. 12*

| Void Width, in | Gamma | Peak Time Ratio for 50% Attenuation |
|---|---|---|
| 0.512 | 12.8 | 0.34 |
| 0.433 | 10.8 | 0.39 |
| 0.354 | 8.9 | 0.41 |
| 0.276 | 6.9 | 0.44 |
| 0.197 | 4.9 | 0.51 |

METHODS AND SYSTEMS FOR CHARACTERIZATION OF AN ANOMALY USING INFRARED FLASH THERMOGRAPHY

I. CROSS REFERENCE TO RELATED APPLICATIONS

This application claims the benefit of the filing date of U.S. provisional patent application No. 61/258,266, incorporated herein by reference, which was filed on Nov. 5, 2009, by the same inventor of this application.

II. ORIGIN OF THE INVENTION

The invention described herein was made by an employee of the United States Government and may be manufactured and used by or for the Government of the United States of America for governmental purposes without the payment of any royalties thereon or therefor.

III. FIELD OF THE INVENTION

The present invention generally relates to the field of non-destructive evaluation (NDE) and of processing of data acquired from a system performing NDE. More particularly, the invention relates to methods and systems for analyzing and processing digital data comprising a plurality of infrared (IR) video images acquired by a system used for non-destructive evaluation.

IV. BACKGROUND OF THE INVENTION

The embodiments described herein relate generally to the field of non-destructive evaluation (NDE). Infrared flash (or pulsed) thermography is an example of a technique for NDE used primarily in the inspection of thin nonmetallic materials, such as laminated or bonded composites in the aerospace industry. IR flash thermography is primarily used to detect delamination-like anomalies, although surface cracks may also be detected to some extent. In one embodiment, a single-sided or reflection technique is used wherein the flash lamp (heat source) and the IR camera (detector) are on the same side of the test object undergoing inspection.

The hardware equipment for an IR flash thermography system comprises a flash lamp (source of light/heat), a flash hood, a flash power supply/trigger unit, a flash duration controller, an IR camera for capturing video images, data acquisition electronics, and a computer. The computer is used for controlling the flash trigger, for acquiring video data from the IR camera, for displaying data, and for post-processing of the acquired data.

In one example of an NDE technique using IR flash thermography, a plate is provided as a test object with a round delamination in the center. After applying heat to the top surface of the test object by triggering the flash lamp, the top surface area surrounding the anomaly cools faster than the top surface (footprint) area above the anomaly. The IR camera captures a sequence of images of the surface temperature in terms of pixel intensity and shows the anomaly as a hot spot (e.g., an area warmer than the surrounding area or the reference region of interest (ROI)). The hot spot is about the size and shape of the anomaly footprint. Relative pixel intensity, i.e., the difference in pixel intensity between the hot spot (measurement ROI) and surrounding area (reference ROI), varies with the post-flash time. Deeper anomalies appear at later times in the IR video data compared to the near surface anomalies. After the appearance of an anomaly in the IR video data, the relative pixel intensity continues to increase with time. The relative pixel intensity of the anomaly reaches a peak at a certain time and then the relative pixel intensity decays until the temperature of the indication area and the temperature of the surrounding area become equal.

V. SUMMARY

The exemplary embodiments described herein extend the theory and application of IR flash thermography to not just anomaly detection, but to anomaly characterization. The embodiments described herein examine the relative pixel intensity and the relative temperature between the measurement region of interest (ROI) and the reference ROI by using a combination of equations generically defined as the "normalized pixel intensity contrast" and the "normalized temperature contrast." By calculating a "normalized pixel intensity contrast" during the processing of the acquired IR video data, the embodiments comprise the development of a simulation model, a data analysis approach and method, and corresponding software for implementing the model, approach, and method with a computer, the methods being collectively referred to as the "IR Contrast" or the "Koshti Contrast" method. The software for implementing the "IR Contrast" method on a computer comprises an IR contrast prediction model that employs contrast matching algorithms for post-processing of the data acquired by an IR camera operating as part of a flash thermography system or as part of other non-destructive evaluation systems.

The IR Contrast method is focused on anomaly characterization as opposed to mere anomaly detection. The approach for the IR Contrast method relates thermal measurements, such as the contrast evolution (or contrast signal) amplitude of an anomaly, in terms of the normalized anomaly contrast as a function of the frame number or the post-flash time. Under some constraints, the normalized anomaly contrast is mainly influenced by factors "related" to an anomaly such as the material thermal properties (diffusivity and emissivity), anomaly size, the depth, and the gap thickness (heat transmissivity or thermal mismatch factor). The contrast is also affected by factors that are "unrelated" to the anomaly such as the part curvature, uneven part cross section, varying thermal properties along the part surface, surface cracks, surface texture, uneven flash heating, flash afterglow, camera pixel size, focusing and proximity to the part edge or the flash boundary. The IR Contrast method seeks to either minimize the effects of the unrelated factors in order to improve accuracy of the IR Contrast data analysis or to control the unrelated factors to improve repeatability of the IR Contrast data analysis. Several amplitude and time-related thermal measurements (e.g. peak contrast and peak contrast time, peak product time, persistence energy time, etc.) are computed from the measured contrast evolution. These parameters bear correlation to the anomaly depth, width, and gap thickness (or heat transmissivity through the anomaly). In other embodiments described herein, the approach of the IR Contrast method comprises measurement of the width of the indication using the half-max technique, as will be explained in further detail later.

The IR Contrast method also comprises steps for the calibrated simulation of the contrast evolution. The software calculates the diameter and depth as inputs, called equivalent flat bottom hole (EFBH) inputs, to the simulation that provide the best match to the measured contrast evolution. Thus, the anomaly depth and width are mapped into an EFBH diameter and depth. If the ratio of an EFBH diameter to half-max diameter is close to one for a round anomaly, then the anomaly is similar to a FBH or a gapping round delamination. Similarly, if the ratio of an equivalent uniform gap (EUG) diameter to half-max diameter is close to one for a round anomaly, then the anomaly is similar to a round void with a uniform gap thickness. The IR Contrast method hypothesizes that the EFBH depth is an estimation of the anomaly depth if the anomaly is similar to a gapping delamination or a FBH. Similarly, the EUG depth is an estimation of the anomaly depth if the anomaly is similar to a void with a uniform gap thickness. Embodiments of the IR Contrast method allow characterization of an anomaly in terms of its depth, width, and gap thickness. In another embodiment, the software implementing the IR Contrast method is programmed for variously different materials and therefore provides a quick approximate prediction of the contrast on a given delaminating-like anomaly. The software can also be used as a training tool for the application of flash thermography or other equivalent non-destructive evaluation systems.

The computer-implemented IR Contrast software comprises two methodologies to analyze the flash thermography contrast data for characterization of delaminating-like anomalies. The first methodology uses measurements such as the peak contrast, persistence energy time, withholding time, and peak time, which can be plotted against the location of the measurement. These measurements show some correlation to the anomaly depth, width, and gap thickness. The second methodology comprises matching the calibration-based predicted contrast evolution to the measured contrast evolution. The matching of the simulated contrast evolution to the measured contrast provides a size and depth based on the equivalent flat bottom hole (EFBH) or equivalent uniform gap (EUG) with known attenuation. In other words, the EFBH (or EUG) depth and diameter are correlated to the width and depth of the measured anomaly.

Another method known as "half-max edge detection" complements the IR Contrast EFBH (or EUG) width predictions, and the reverse is also true. The difference in the two width measurements is considered to be due to non-uniformity of the gap thickness, value of gap thickness, and length effect as well as to the limitations of the two estimations. The embodiments described herein provide information on the IR Contrast/half-max analysis of the flash thermography data. Comparison of the adjusted EUG diameter and EFBH diameter with the half-max width allows assessment of the gap thickness. Comparison of the peak product time with the square of the half-max width also allows assessment of the gap thickness.

Other aspects and advantages of the embodiments described herein will become apparent from the following description and the accompanying drawings, illustrating the principles of the embodiments by way of example only.

VI. BRIEF DESCRIPTION OF THE DRAWINGS

FIG. 2(*b*) is a single infrared (IR) video image of a flat bottom hole in a test object in accordance with some embodiments.

FIG. 9(*b*) shows an example of calibration curves for no attenuation (Flat Bottom Hole) and with 30 percent and 50 percent attenuation in accordance with embodiments described herein.

FIG. 12 is a table showing an example of calculation inputs in direct depth estimation.

Figure 17:
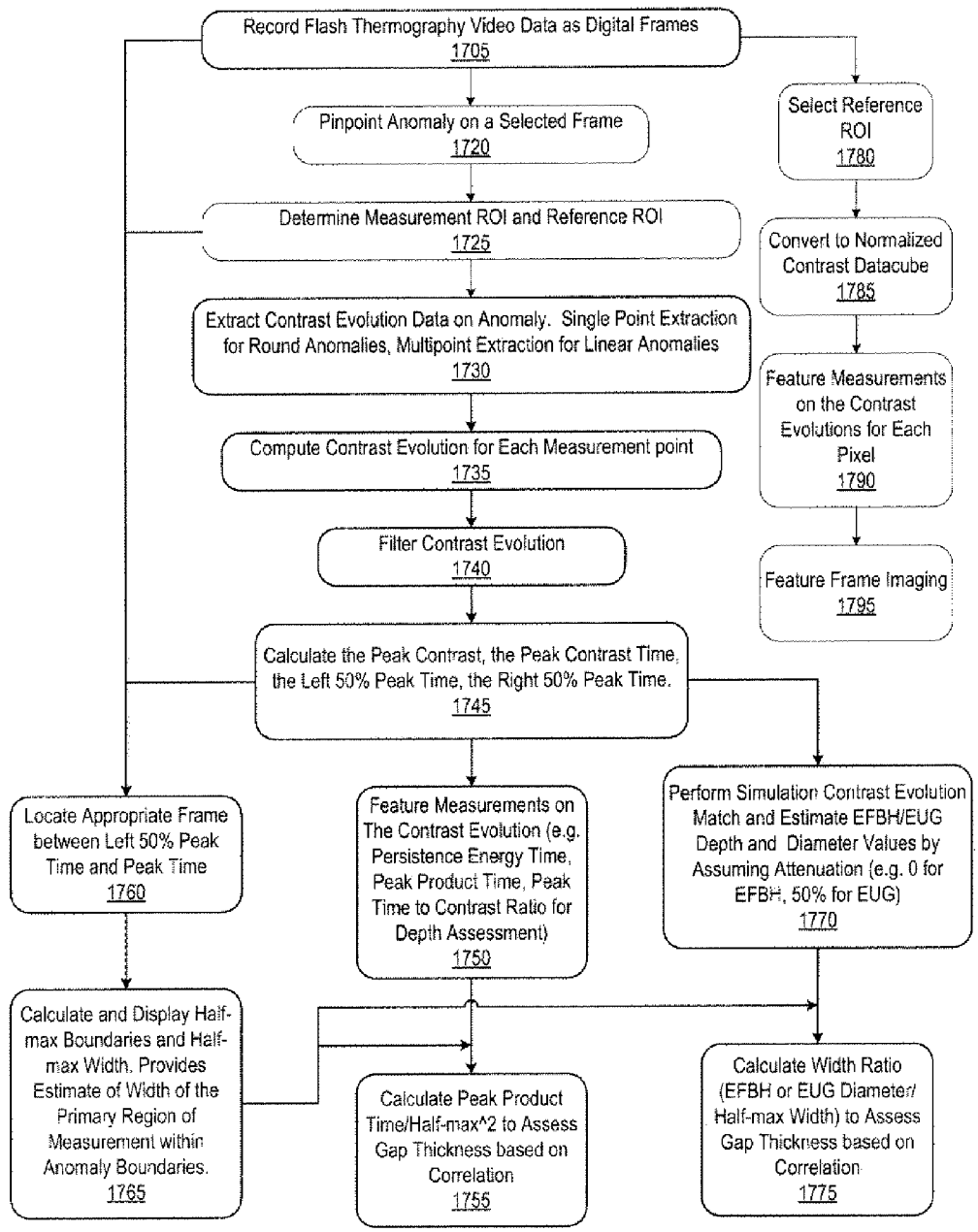

FIG. 17 is a flow diagram of how the measured flash thermography data is processed with four processing outcomes including: (1) the normalized datacube and feature measurement (e.g. peak contrast, peak time) on the entire contrast data cube and plotting of feature frame images similar to pixel intensity frame images; (2) the half-max anomaly boundaries; (3) measurements on the contrast evolution that relate to flaw depth and gap thickness; and (4) simulation match equivalent depth and diameter measurement and width ratio estimation that relates to the gap thickness, in accordance with embodiments described herein.

Figure 18:
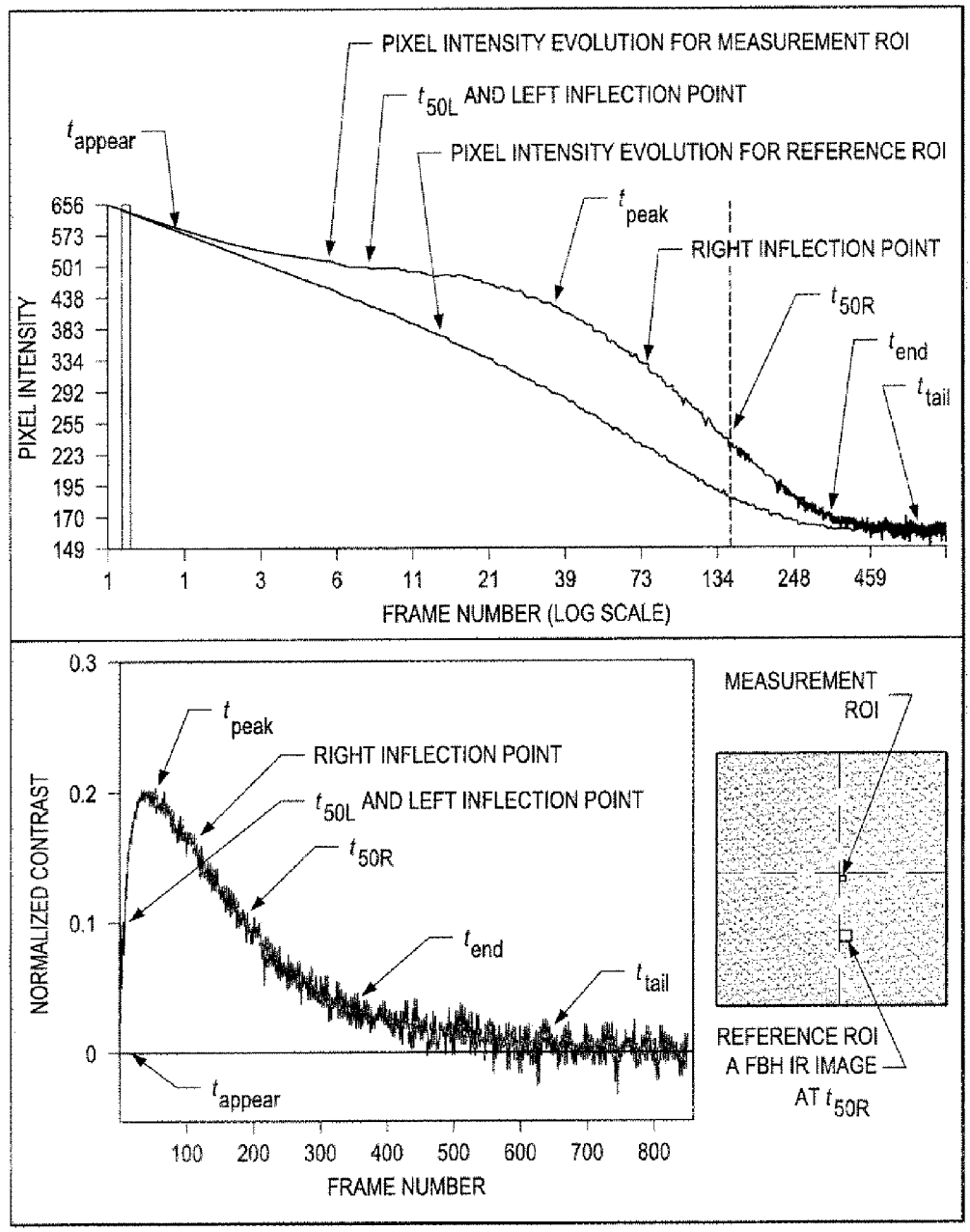

FIG. 18 is a graph of the measurement and reference regions of interest decay curves plotted in log time in accordance with embodiments described herein.

Figure 19:
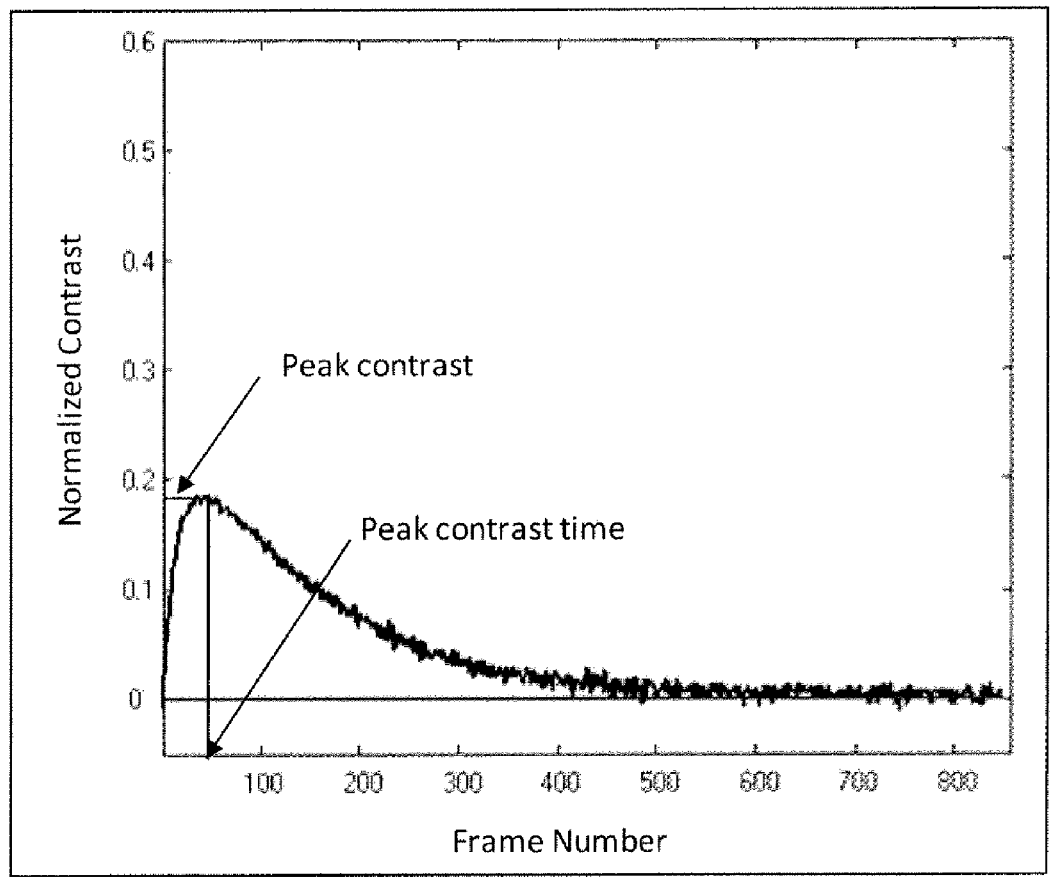

FIG. 19 is a graph showing the peak contrast and the peak contrast time in accordance with embodiments described herein.

Figure 20:
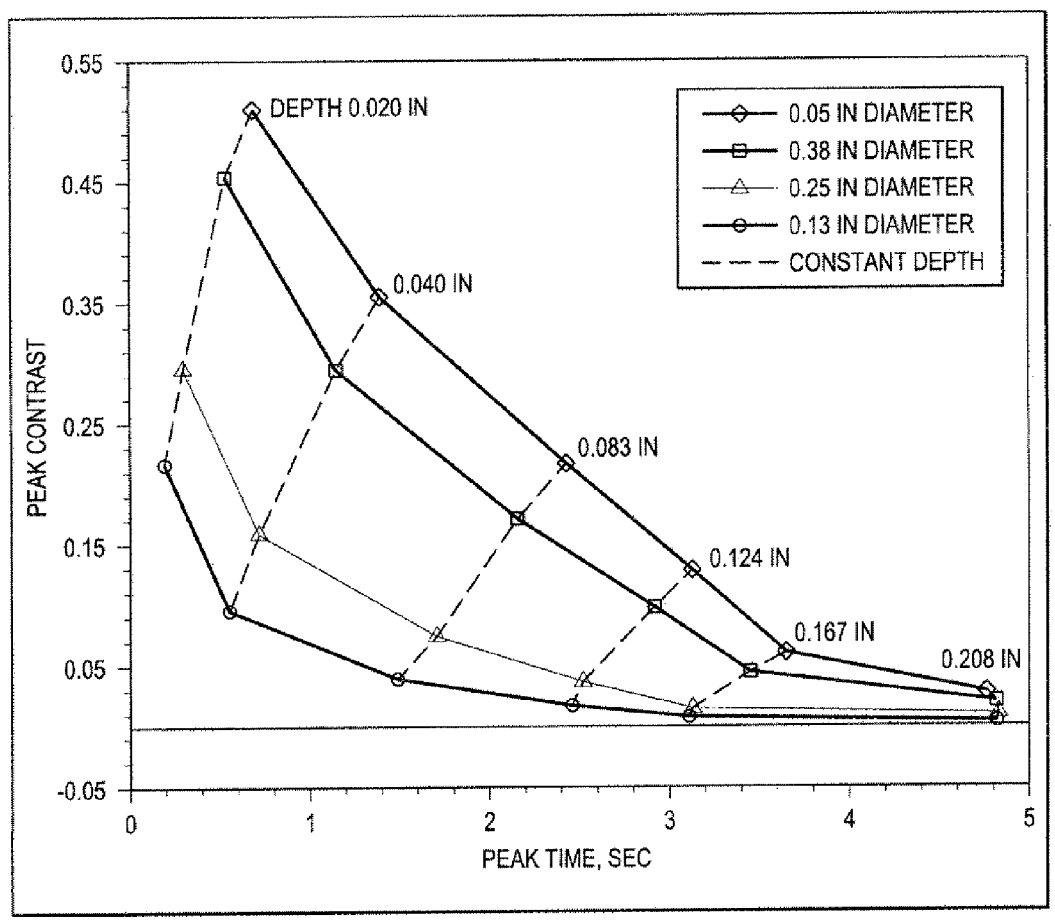

FIG. 20 is a graph of the peak contrast and peak contrast time simulation (contrast map) using the ThermoCalc simulation.

FIG. 21(*a*) and FIG. 21(*b*) are graphs of the peak contrast and peak time simulation (contrast map) using IR Contrast calibration on a reinforced carbon-carbon part in accordance with embodiments described herein.

Figure 22:
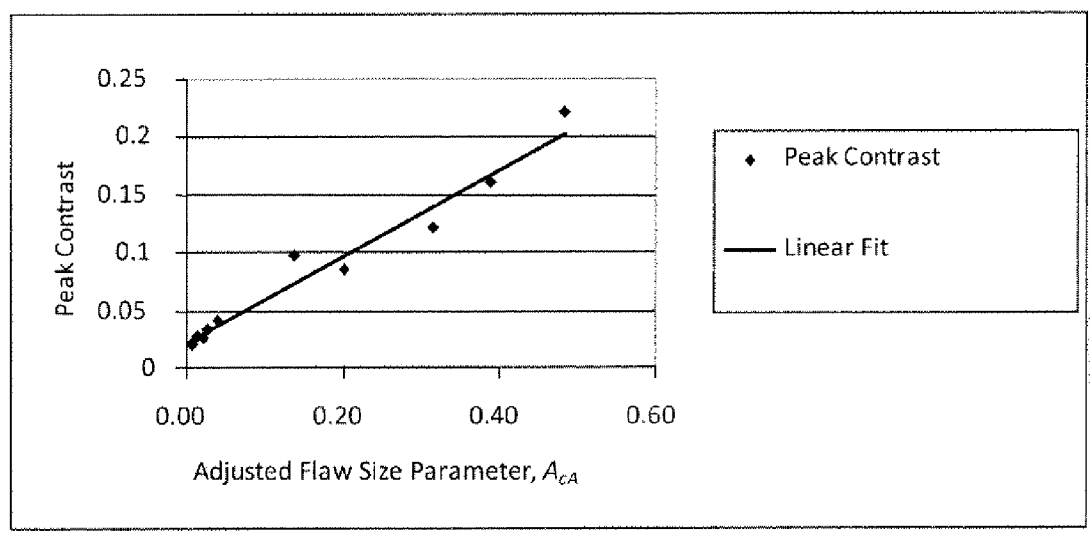

FIG. 22 illustrates the use of the adjusted flaw size parameter in prediction of the peak contrast in accordance with embodiments described herein.

Figure 23A:
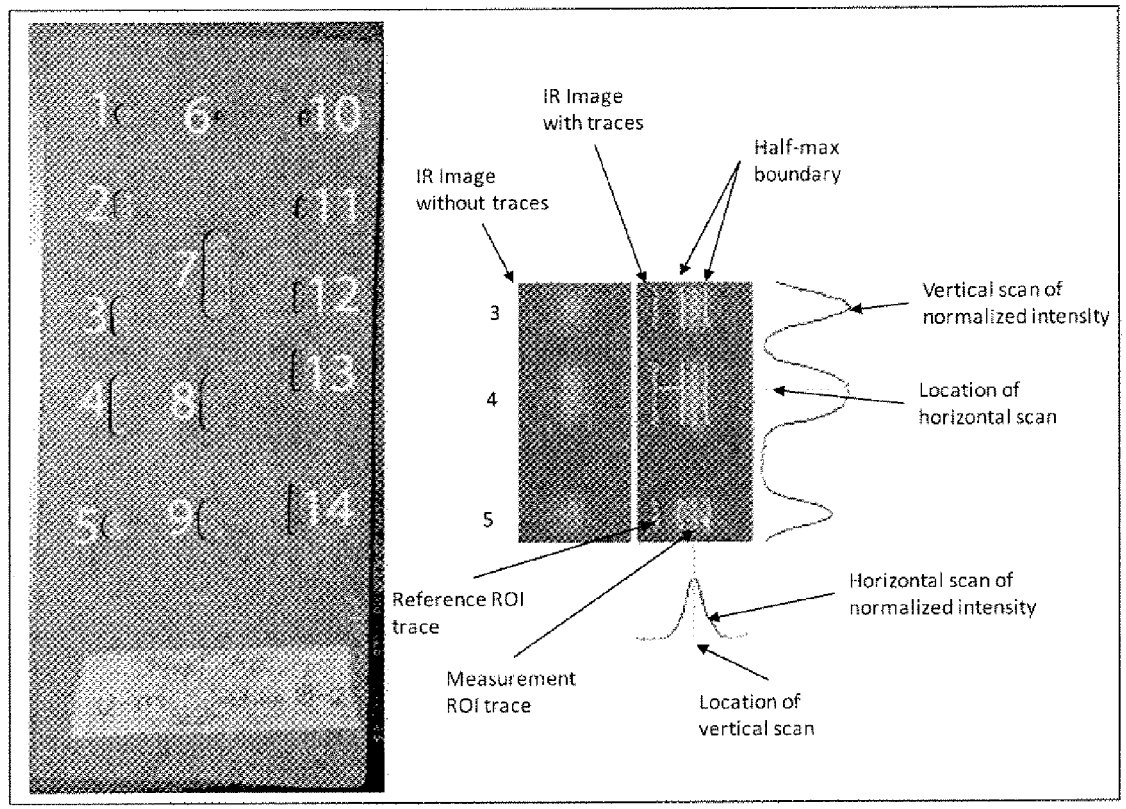
Figure 23B:
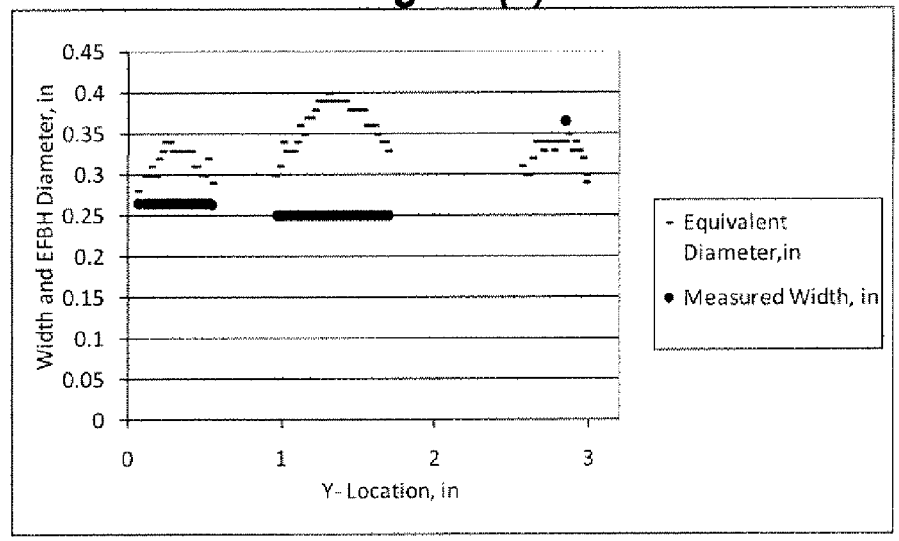

FIG. 23(a) shows the back side of a test plate with flat bottom holes and slots as well as a cropped area from a selected frame from the flash thermography data. Two identical IR images that include the region of holes numbered 3, 4, and 5 are provided; one without traces and one with half-max boundary traces, measurement ROI trace, and reference ROI trace, in accordance with embodiments described herein. FIG. 23(b) shows both the actual width and the equivalent diameter on holes numbered 3, 4, and 5 in a reinforced carbon-carbon (RCC) test specimen in accordance with embodiments described herein.

Figure 24:
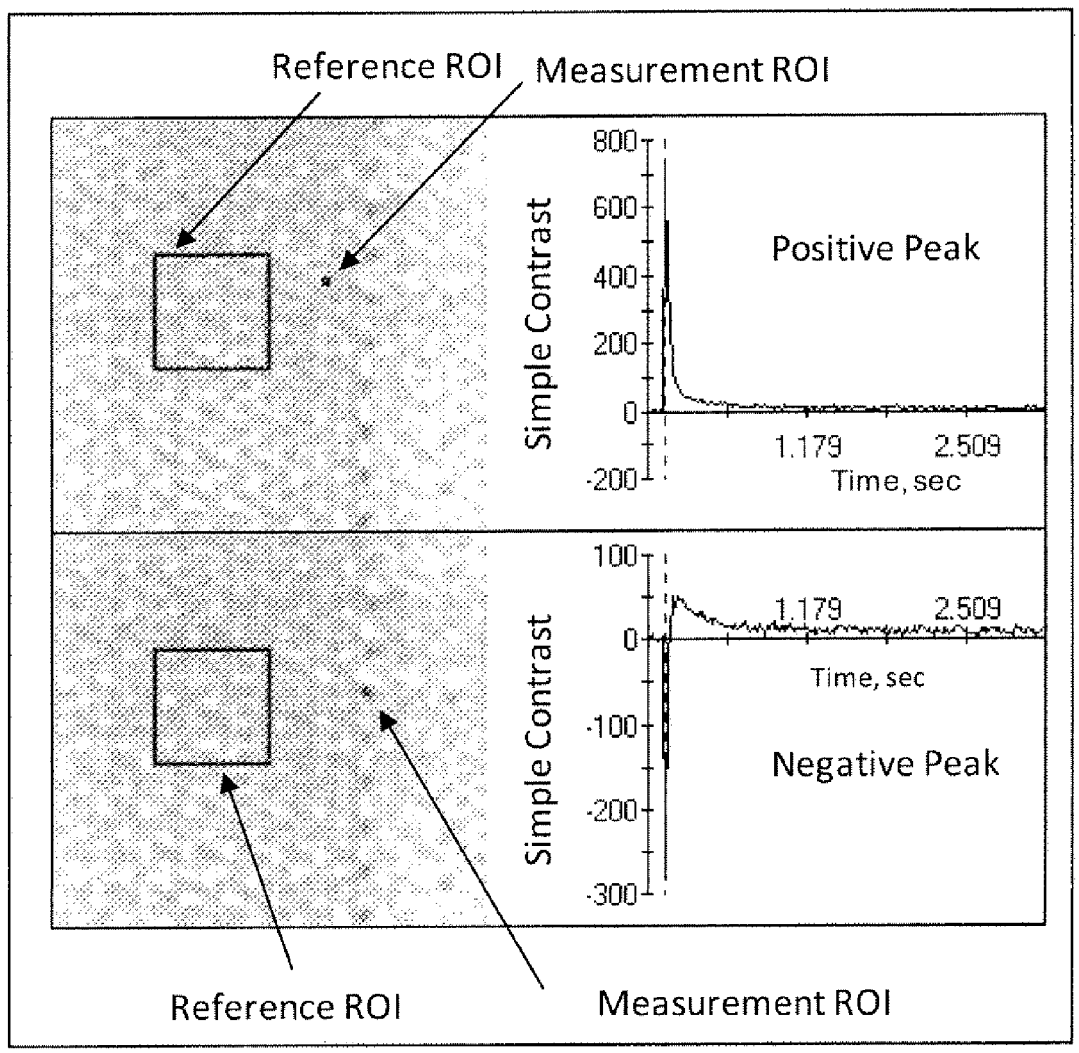

FIG. 24 shows an early IR frame of the flash thermography data for a graphite epoxy laminate. The image shows the weave like pattern called texture and the simple contrast evolutions illustrating the positive and negative texture peaks in accordance with embodiments described herein.

Figure 25:
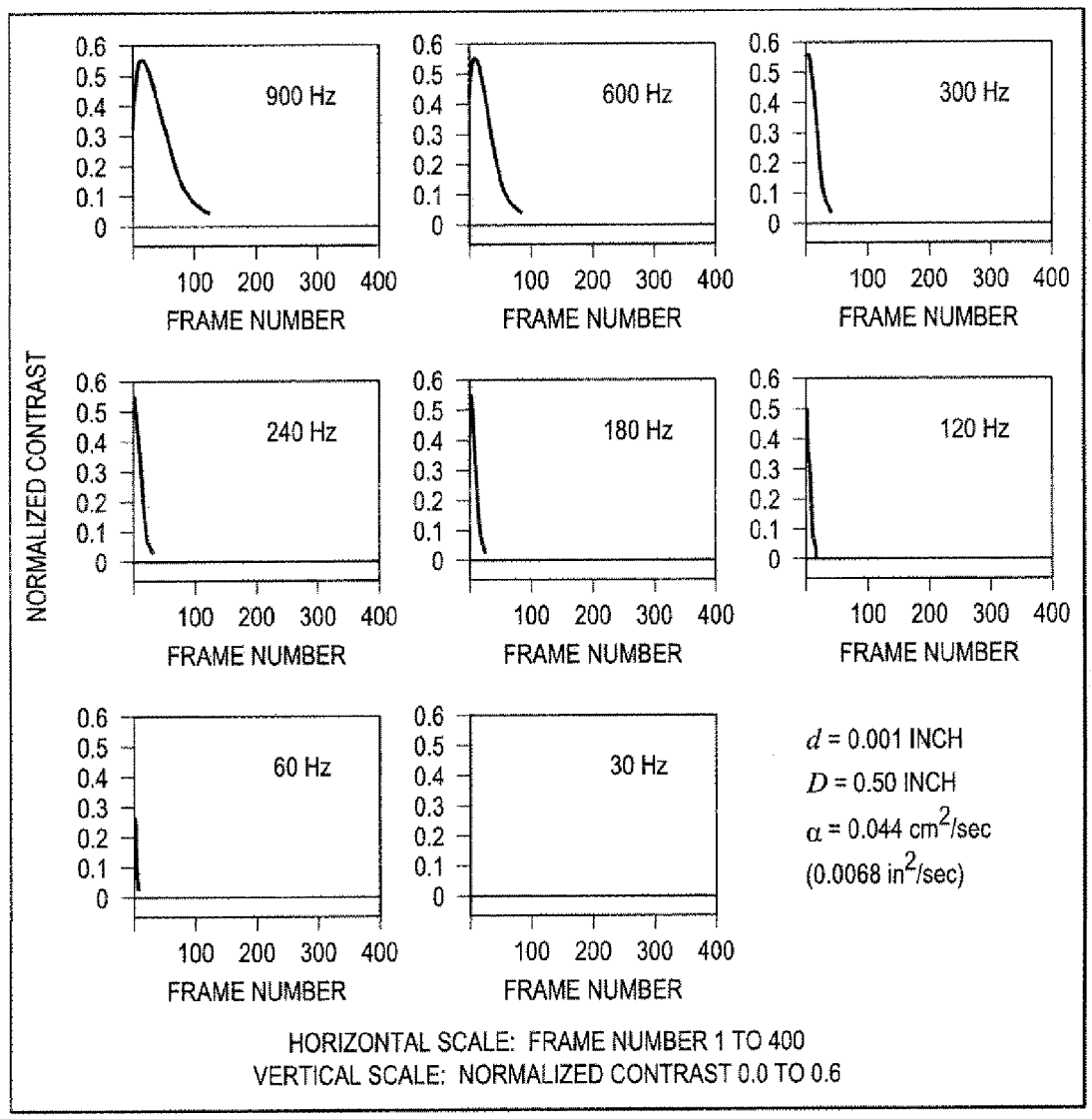

FIG. 25 displays multiple graphs illustrating the effect of the frame rate on the contrast evolution of shallow anomalies in accordance with embodiments described herein.

Figure 26:
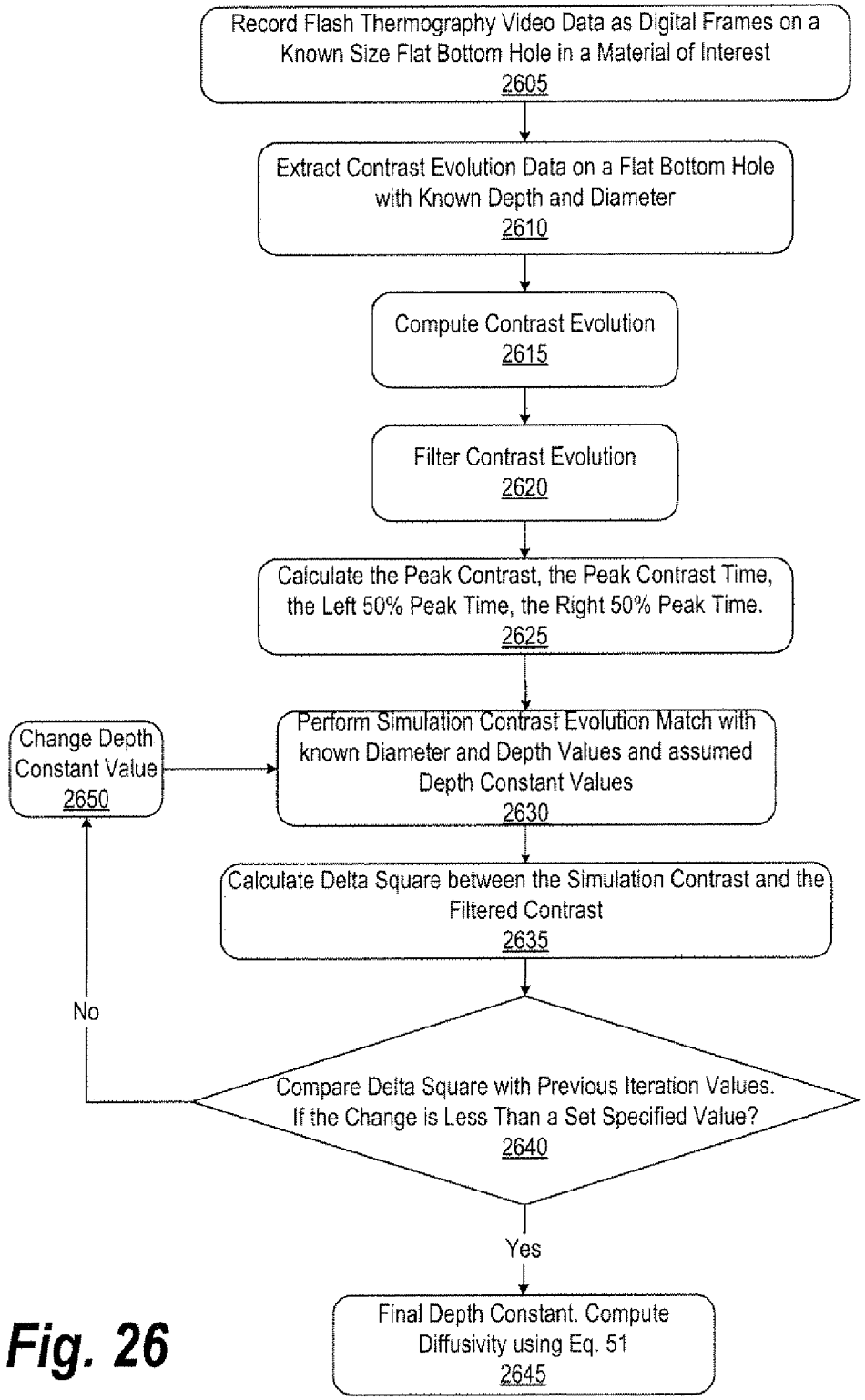

FIG. 26 is a flow diagram of the process of measuring the thermal diffusivity of the test piece with flat bottom holes in accordance with embodiments described herein.

Figure 27:
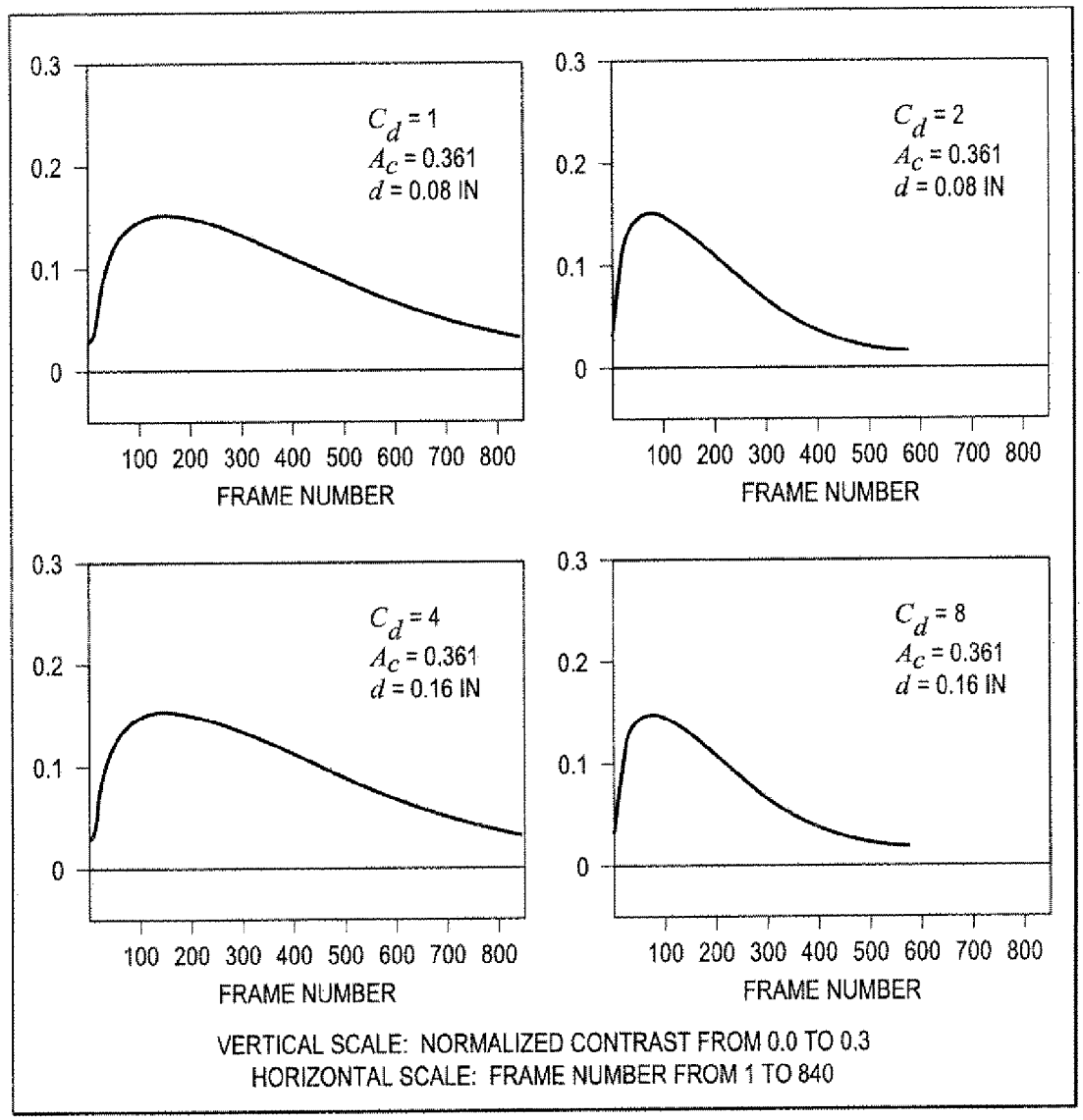

FIG. 27 displays multiple graphs illustrating the effect of the diffusivity and depth constant on the contrast evolution in accordance with embodiments described herein.

Figure 28:
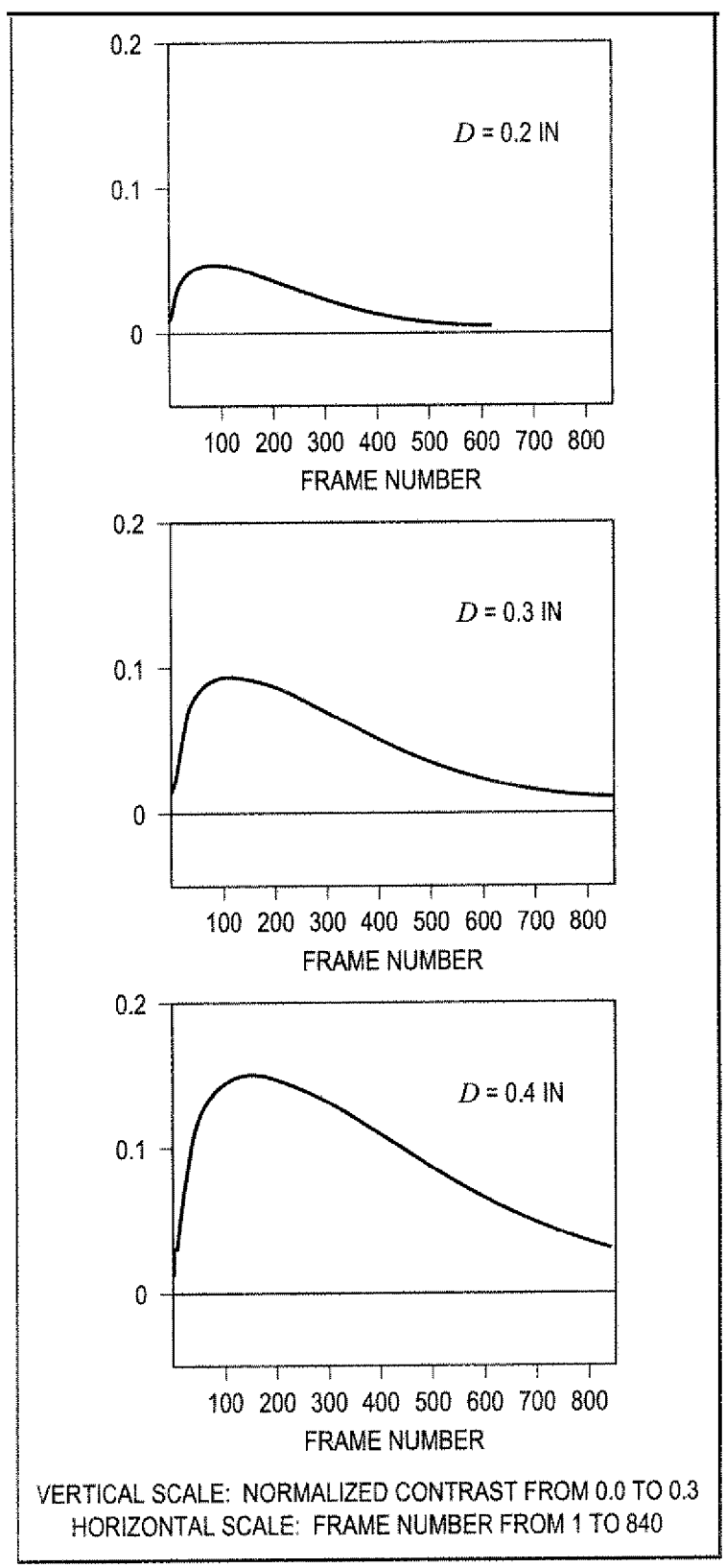

FIG. 28 provides multiple graphs illustrating the effect of change in the diameter on the contrast evolution in accordance with embodiments described herein.

Figure 29:
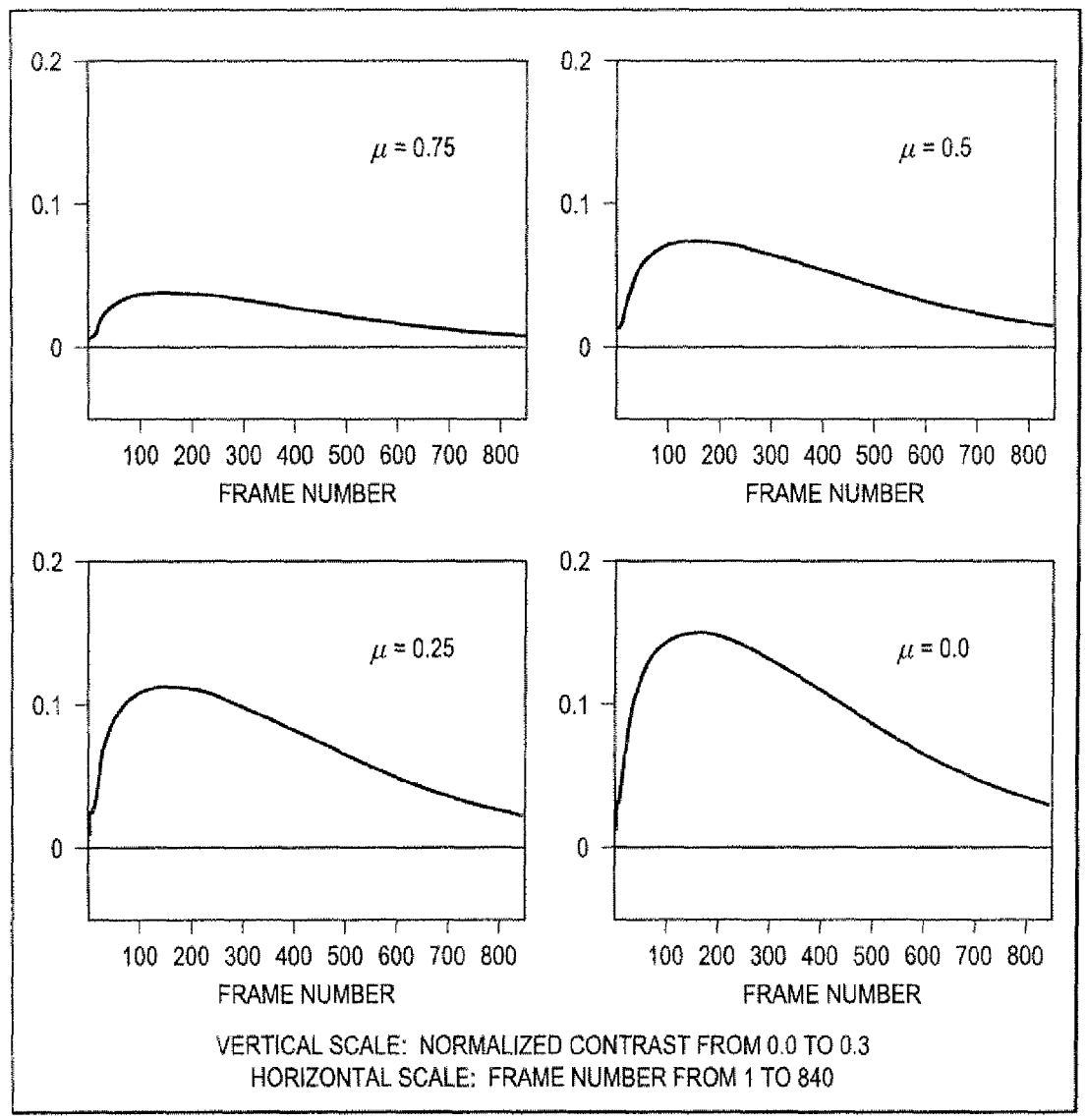

FIG. 29 illustrates the effect of change in the attenuation $\mu$ on the contrast evolution in accordance with embodiments described herein.

Figure 30:
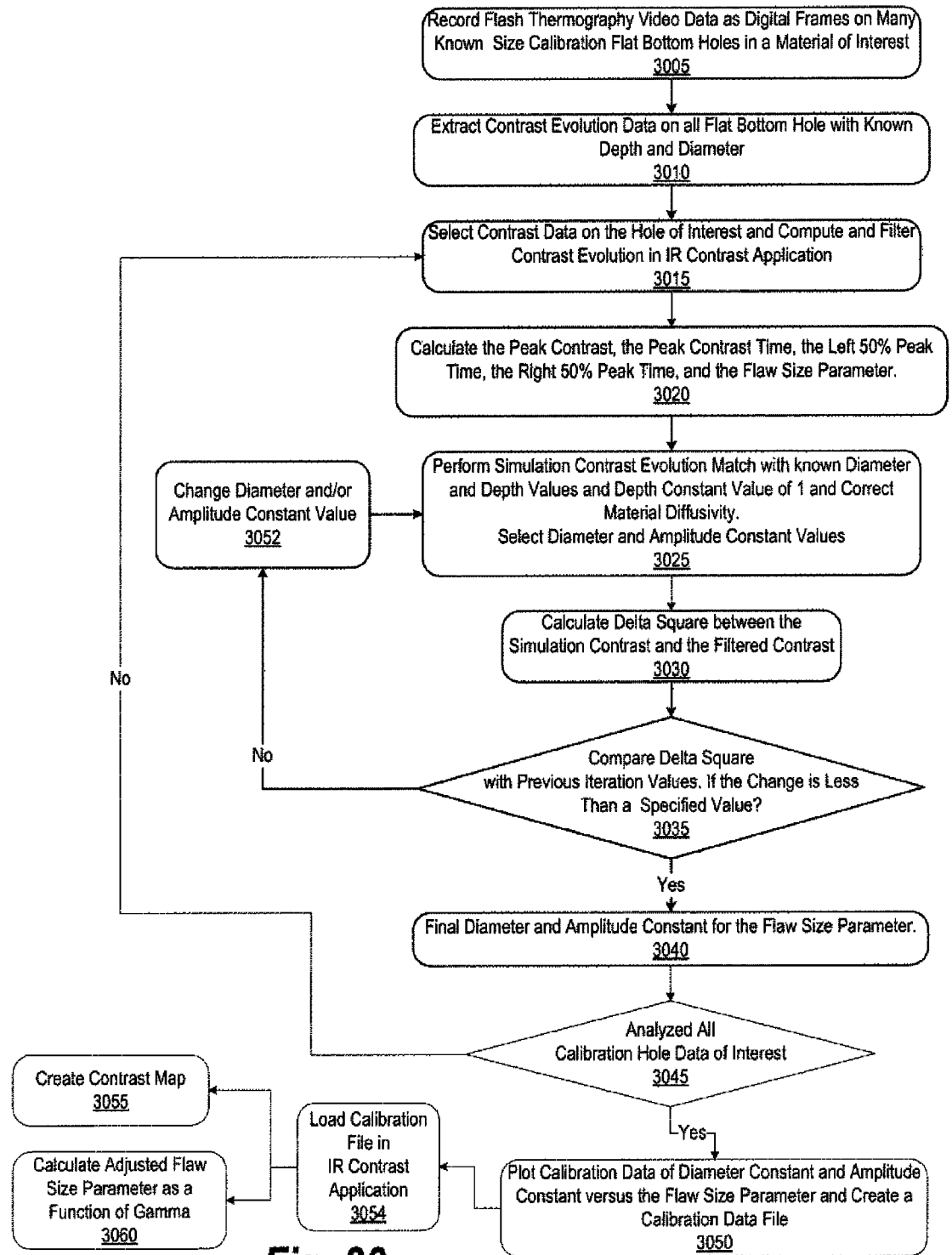

FIG. 30 is a flow diagram for generating calibration curves for flat bottom holes (no attenuation), calculating the adjusted flaw size parameter as a function of gamma, and creating a contrast map in accordance with embodiments described herein.

Figures 31A, 31B:
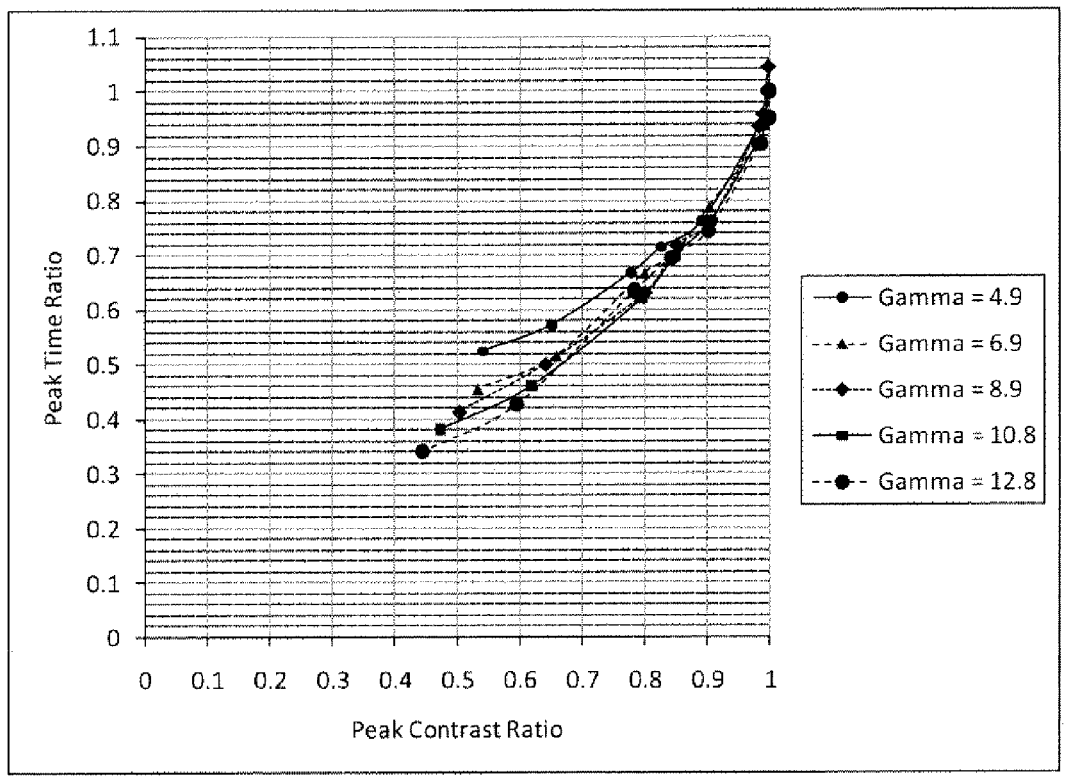

FIG. 31(a) shows results of a ThermoCalc simulation to generate relationships between the peak time ratio and the peak contrast ratio for various gamma values. The peak time ratio for the 50% attenuation is read from FIG. 31(a) and the results are shown in FIG. 31(b).

Figure 32:
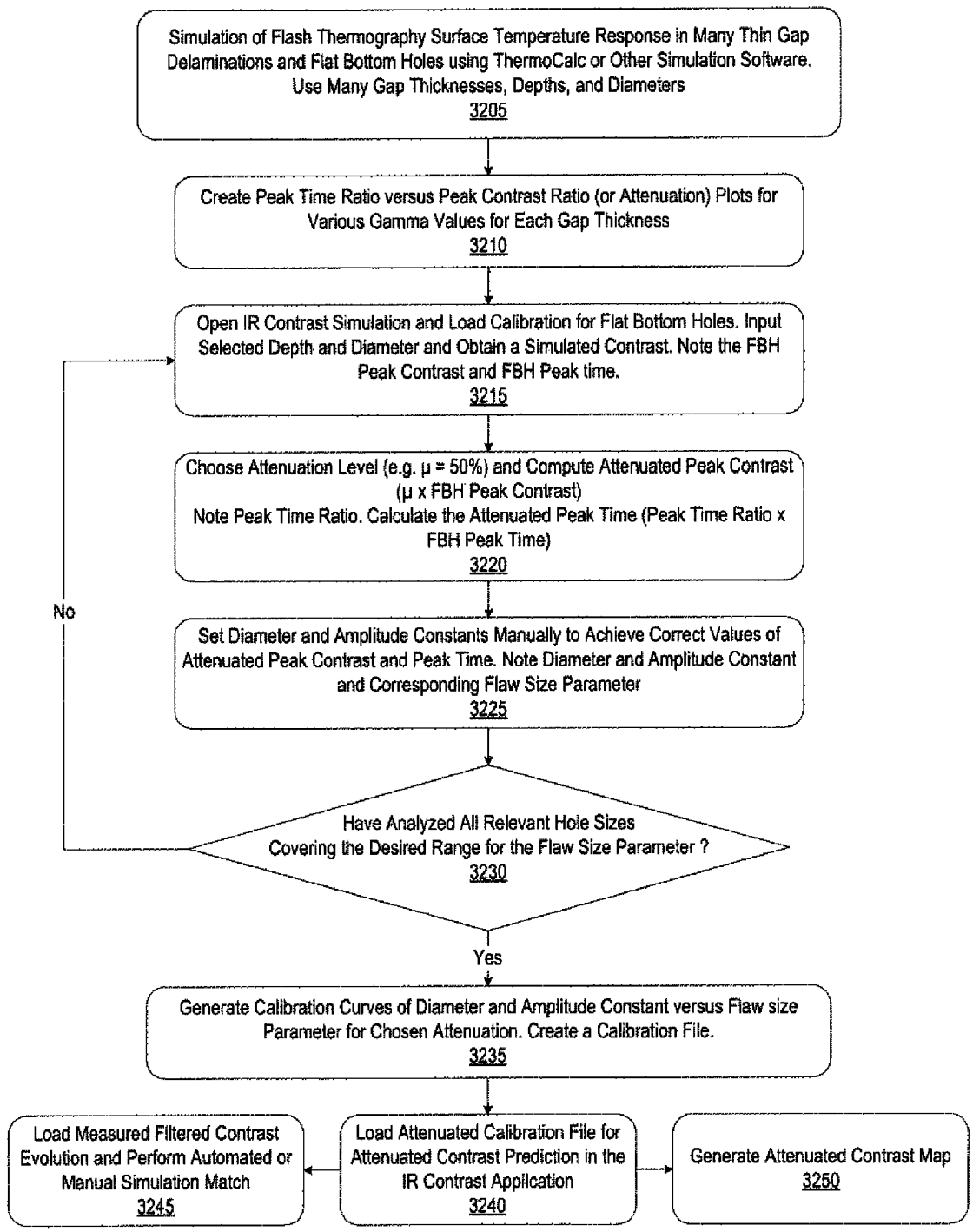

FIG. 32 is a flow diagram for the process of generating calibration curves for uniform gap delamination-like voids with selected attenuation and of creating contrast maps in accordance with embodiments described herein.

Figure 33A:
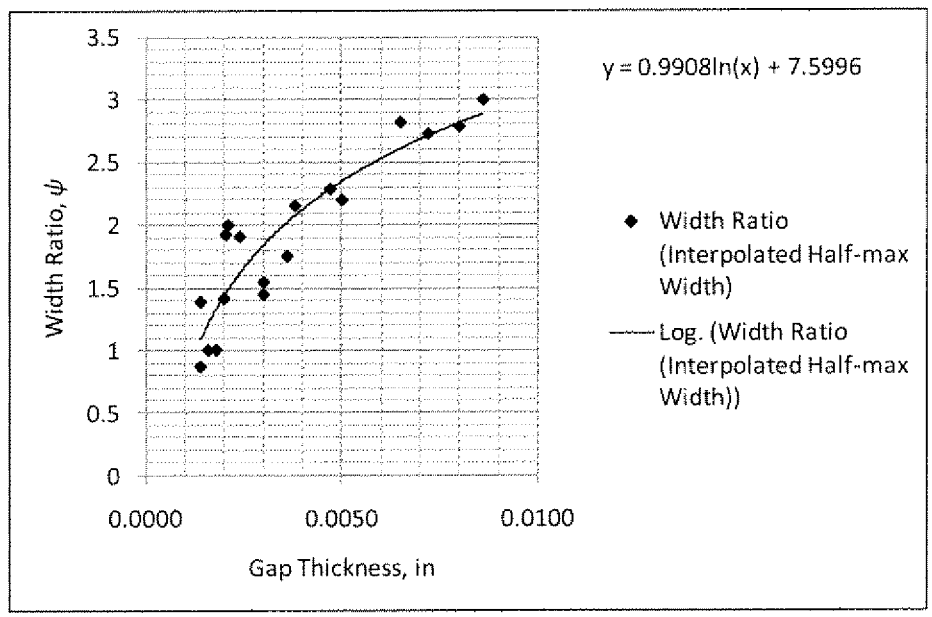
Figure 33B:
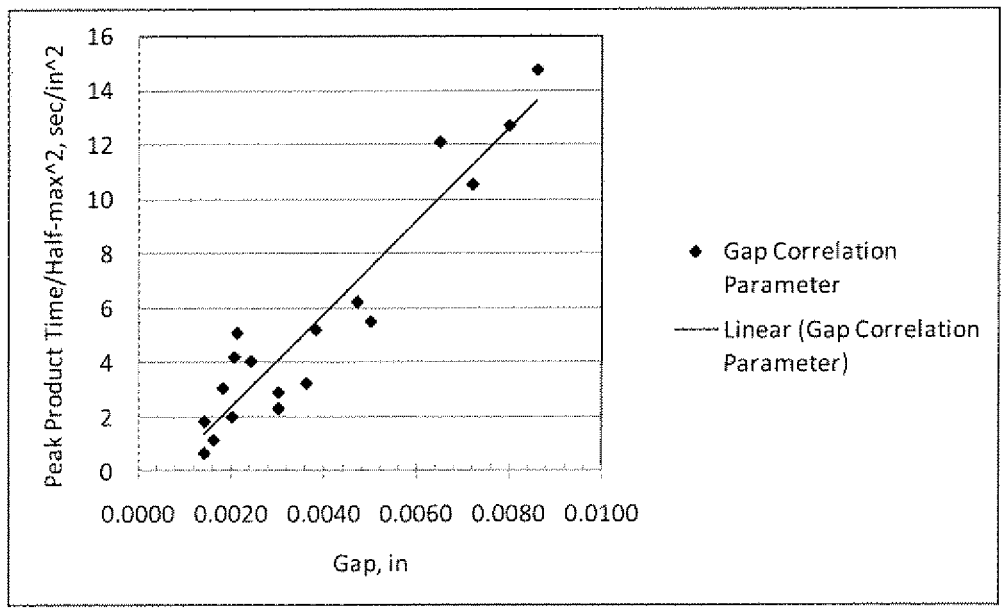

FIG. 33(a) shows experimental correlation between the width ratio and gap thickness in RCC material. FIG. 33(b) shows experimental correlation between the gap correlation parameter defined as peak product time divided by the square of the half-max width and the gap thickness in RCC material in accordance with embodiments described herein.

Figure 34:
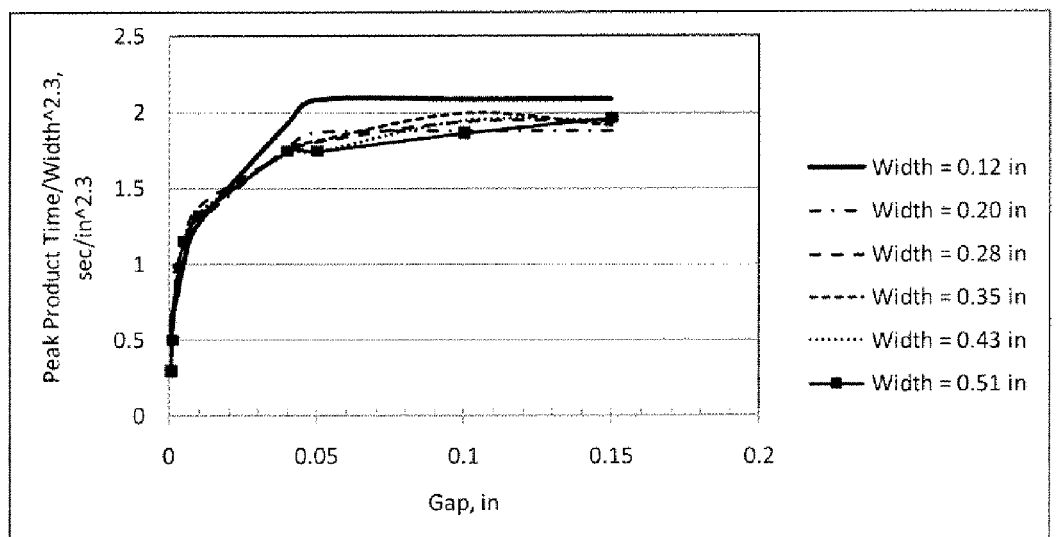

FIG. 34 shows a ThermoCalc simulated data correlation between the gap correlation parameter defined as peak product time divided by 2.3 power of the simulated void width and the simulated void gap thickness in a material.

Figure 35:
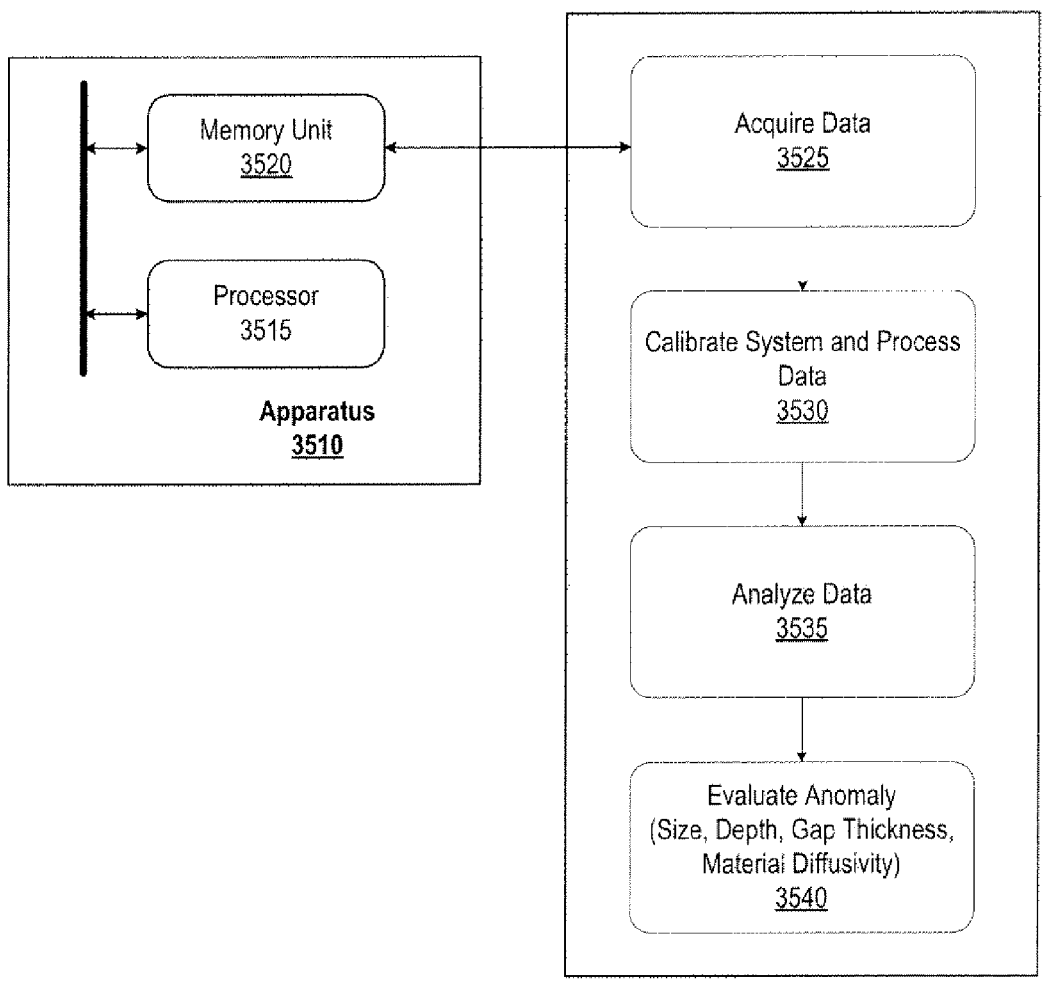

FIG. 35 is a block diagram illustrating an apparatus for characterizing anomalies in a material in accordance with embodiments described herein.

While the embodiments described herein are subject to various modifications and alternative forms, the specific embodiments are shown by way of example in the drawings and the accompanying detailed description. It should be understood, however, that the drawings and detailed description are not intended to limit the invention to the particular embodiments described herein. This description is instead intended to cover all modifications and alternatives as falling within the scope of the invention as defined by the appended claims.

VII. DETAILED DESCRIPTION

The objects in the drawings are not necessarily to scale and certain features may be shown exaggerated in scale or in somewhat generalized or schematic form in the interest of clarity and conciseness. In the description which follows like parts may be marked throughout the specification and drawings with the same reference numerals. The foregoing brief description of the drawings is provided for a more complete understanding thereof. It should be understood, however, that the embodiments described are not limited to the precise arrangements and configurations shown. Although the design and use of various embodiments are discussed in detail below, it should be appreciated that the embodiments described represent concepts that may be embodied in a wide variety of contexts. The specific aspects and embodiments described herein are merely illustrative, for it would be impossible or impractical to include all of the possible embodiments and contexts in this detailed description. Upon reading this description, alternative embodiments will be apparent to persons of ordinary skill in the art.

The embodiments described herein examine the relative pixel intensity and the relative temperature between the measurement region of interest (ROI) and the reference ROI by using a combination of equations generically defined as the "normalized pixel intensity contrast" and the "normalized temperature contrast." By calculating a "normalized pixel intensity contrast" during the processing of the IR video data acquired, the embodiments comprise the development of a simulation model, a data analysis approach and method, and corresponding software for implementing the model, approach, and method with a computer, collectively referred to as the "IR Contrast" or the "Koshti Contrast" method. The software for implementing the "IR Contrast" method on a computer comprises an IR contrast prediction model that employs contrast matching algorithms for post-processing of the data acquired from an IR camera, with the camera operating in some embodiments as part of a flash thermography system or in other embodiments as part of other non-destructive evaluation systems.

The IR Contrast method is geared toward anomaly characterization as opposed to mere anomaly detection. The approach for the IR Contrast method relates thermal measurements, such as the contrast evolution (or contrast signal) amplitude of an anomaly, in terms of the normalized anomaly contrast as a function of the frame number or the post-flash time. Under some constraints, the normalized anomaly contrast is mainly influenced by factors "related" to an anomaly such as the material thermal properties (diffusivity and emissivity), the anomaly size, the anomaly depth, the gap thickness, and the heat transmissivity or thermal mismatch factor. The contrast is also affected by factors that are "unrelated" to the anomaly such as the part curvature, uneven part cross section, varying thermal properties along the part surface, surface cracks, surface texture, uneven flash heating, flash afterglow, camera pixel size, focusing, and proximity to the part edge or the flash boundary. The IR Contrast method seeks to either minimize the effect of the unrelated factors in order to improve accuracy of the IR Contrast analysis or to control the unrelated factors to improve repeatability of the IR Contrast analysis. Several amplitude and time-related thermal measurements (e.g. peak contrast and peak contrast time, peak product time, persistence energy time, etc.) are computed from the measured contrast evolution. These parameters bear some correlation to the anomaly depth, width, and gap thickness (or heat transmissivity through the anomaly). The approach also involves measurement of the indication using the half-max technique.

The IR Contrast method also comprises steps for calibrated simulation of the contrast evolution. The software calculates the diameter and depth as input iteratively, called equivalent flat bottom hole (EFBH) inputs, to the simulation that provides the best match to the measured contrast evolution. Thus, the anomaly depth and width are mapped into an EFBH diameter and depth. If the ratio of an EFBH diameter to half-max diameter is close to one for a round anomaly, then the anomaly is similar to a flat bottom hole (FBH) or a gapping round delamination. Similarly, if the ratio of equivalent uniform gap (EUG) diameter to half-max diameter is close to one for a round anomaly, then the anomaly is similar to a round void with a uniform gap thickness. Using the IR Contrast method, the EFBH depth is an estimation of the anomaly depth if the anomaly is similar to a gapping delamination or a FBH. Similarly, the EUG depth is an estimation of the anomaly depth if the anomaly is similar to a void with a uniform gap thickness. The IR Contrast methods allow characterization of an anomaly in terms of its depth, width, and gap thickness. The IR Contrast software may be programmed for many materials and therefore provides a quick approximate prediction of the contrast on a given delamination-like anomaly. The software can be used as a training tool for the application of flash thermography or other non-destructive evaluation systems.

The computer-implemented IR Contrast software comprises two methodologies to analyze the flash thermography contrast data for characterization of delaminating-like anomalies. The first methodology uses measurements such as a peak contrast, persistence energy time, withholding time, and peak time, which can be plotted against the location of the measurement. These measurements show some correlation to the anomaly depth, width, and gap thickness. The second methodology comprises matching the calibration-based predicted contrast evolution to the measured contrast evolution. The matching of the simulated contrast evolution to the measured contrast provides size and depth of the equivalent flat bottom hole (EFBH) or equivalent uniform gap (EUG) with known attenuation. The EFBH (or EUG) depth and diameter may be correlated to the width and depth of the measured anomaly. Comparison of the EFBH (or EUG) evolutions with measured contrast evolutions, so as to provide evaluation of delaminations in terms of depth, width, and presence of surface cracks, confirms this correlation.

Another method known as half-max edge detection complements the IR Contrast EFBH (or EUG) width predictions, and the reverse is also true. The difference in the two width measurements is considered to be due to non-uniformity of the gap thickness, value of gap thickness, and length effect as well as the limitations of the two estimations. The embodiments described herein provide information on the IR Contrast/half-max analysis of the flash thermography data. Comparison of the adjusted EUG diameter and EFBH diameter with the half-max width allows assessment of the gap thickness. Comparison of the peak product time with the square of the half-max width also allows assessment of the gap thickness.

Exemplary embodiments will now be described with reference to the accompanying figures. Like elements or components in the figures are denoted with the same reference characters for consistency.

Figure 1:
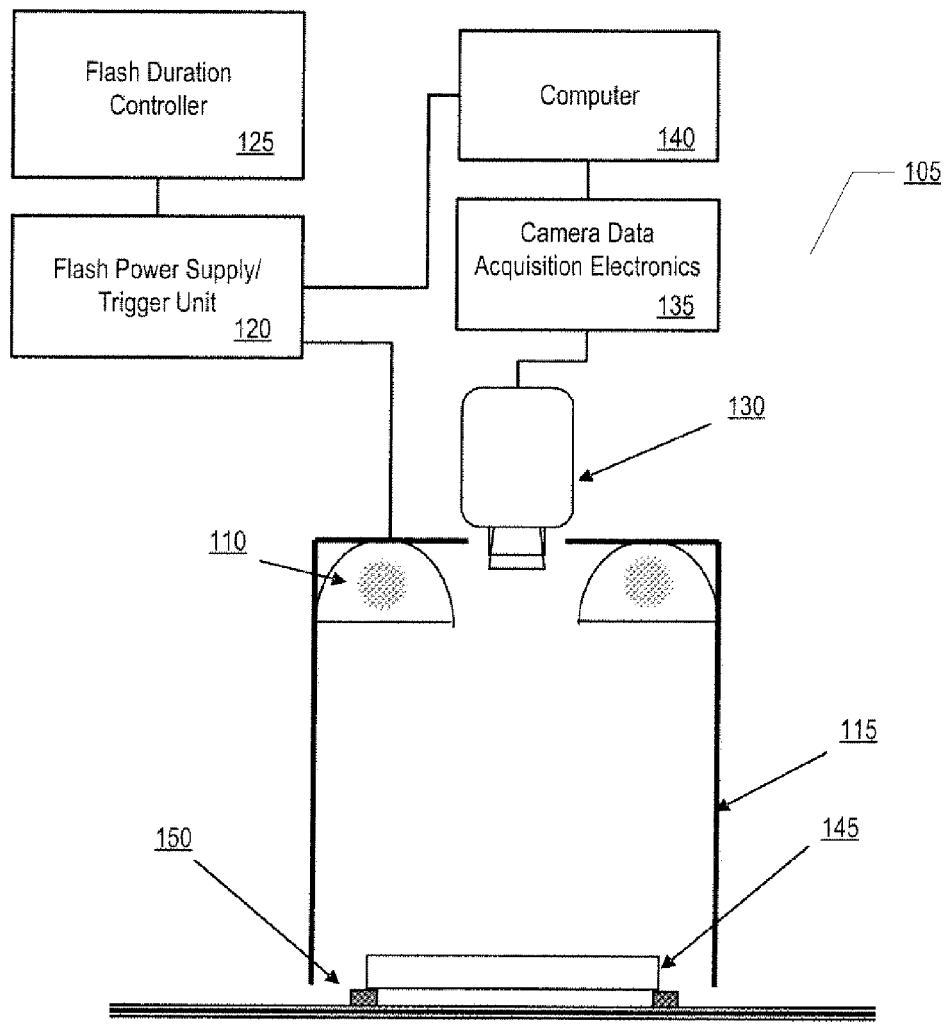
FIG. 1 is a schematic diagram of an exemplary single-sided flash thermography system in accordance with embodiments described herein.

FIG. 1 is a schematic diagram of an exemplary single-sided flash thermography system in accordance with embodiments described herein. As shown in FIG. 1, the equipment for an IR flash thermography system 105 comprises a flash lamp (source of light/heat) 110, a flash-hood 115, flash power supply/trigger unit 120, flash duration controller 125, an IR camera 130 for capturing video images, camera data acquisition electronics 135, and a computer 140. The computer 140 is used for controlling the flash trigger 120 for the flash lamp 110, data acquisition of the camera video data, data display, and post-processing of the acquired data. The flash-hood 115 may be made from sheet metal to form a box-like structure, although other structures that form an interior volume, such as a cylinder, hemi-sphere, etc. may be used. However the flash-hood is structurally configured, one portion of the hood may have a large opening so as to enable the hood to be positioned on a surface supporting a test object 145. The side opposite to the large opening of the hood has a hole in the center to provide a window for the lens of the IR camera 130, which is positioned outside of the flash-hood 115. The IR camera 130 is focused at the top surface of the test object 145 (part) positioned inside the hood. At least one flash lamp 110 (two are shown in FIG. 1) is located within the inner wall of the flash-hood 115 in proximity to the IR camera 130. The flash lamp(s) 110 directs illumination towards the location of the test object 145 without directly shining light upon or into the IR camera 130. The flash-hood 115 functions as a housing that contains most of the intense flash.

If the size of the test object 145 can be accommodated inside the hood 115, then the test object 145 is positioned near the hood opening slightly inside the interior volume of the hood 115. Otherwise, the test object 145 is located slightly outside of the hood 115 opening. A short duration (e.g., 5 msec), intense (12 kJ) flash is triggered by the computer 140. The data acquisition is triggered a few seconds before the flash and it continues until the prescribed time. The camera 130 provides a sequence of IR images (or frames) called the data-cube (or digital video) of the test object's surface taken at the chosen frame rate (e.g. 60 Hz or 60 frames per sec). The intensity (numerical value) of each pixel in the image is a function of the surface temperature of the corresponding area on the test object 145 at the time of the image frame. The flash causes the surface of the test object 145 to warm up slightly, and the heat starts to dissipate rapidly. The surface cools through thermal radiation, convection, and conduction. Heat conduction is considered to be the dominant heat transfer mode within the test object 145 until the temperature gradients within the test object become small. At later times, the heat conduction is of the comparable magnitude of order as the combined effect of heat convection and radiation. The IR data acquisition and data analysis utilizes the thermal data in the short duration immediately after the flash wherein heat conduction dominates the thermal dissipation within the test object 145.

The heat exchange across the boundaries due to the convection can be assumed to be zero if the Biot number ($N_{Bi}$=hL/k) is less than 0.1. For example, a half centimeter thick graphite/epoxy (k=0.64 W/mK) plate, using h=10 W/m$^2$K, has a Biot number of 0.078. Therefore, heat conduction is the dominant mode of heat transfer for this graphite/epoxy plate example. Thinner test objects tend to equalize the temperature within the test object quickly and have a relatively longer cooling time by heat loss to environment. Such test objects are not suitable for the IR Contrast simulation analysis. A term called threshold thickness ($d_{threshold}$) may be used to classify a test object as too thin or too thick for heat conduction in flash thermography.

Figure 2A:
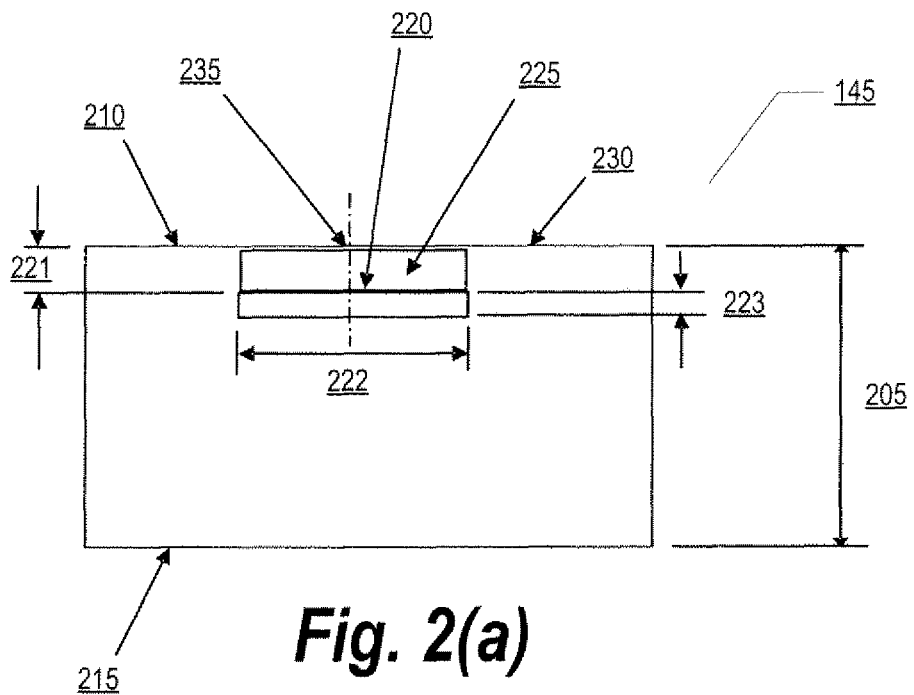
FIG. 2(*a*) is a schematic diagram of a plate depicting a gapping delamination with measurement and reference regions of interest (ROIs) in accordance with embodiments described herein.
Figure 2B:
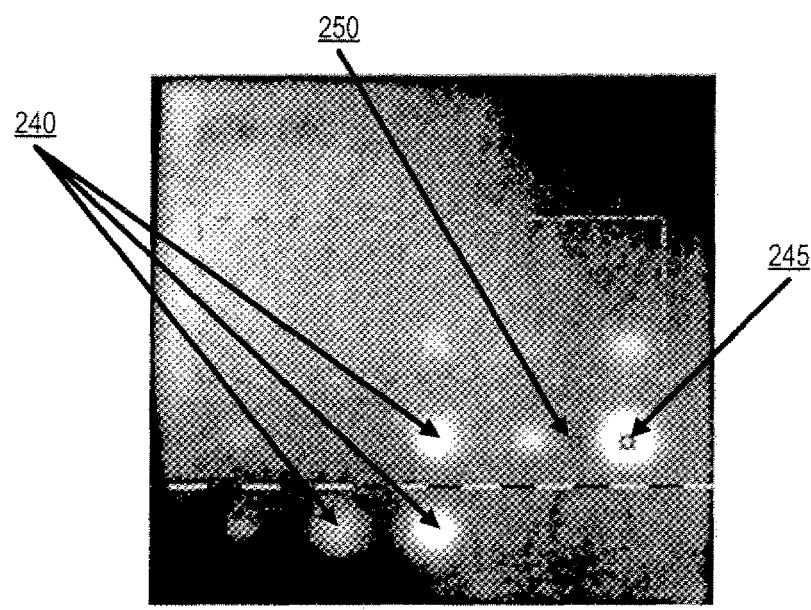

FIG. 2(a) is a schematic diagram of a plate serving as the test object 145. FIG. 2(a) depicts a gapping delamination or anomaly 220 with measurement and reference regions of interest (Rills) in accordance with embodiments described herein, whereas FIG. 2(b) shows a single infrared (IR) video image of a test object with a flat bottom hole in accordance with at least one embodiment. Referring now to FIGS. 1 and 2(a), the test object 145 is made of a thermally isotropic material with constant thickness 205 and fits inside hood 115. The test object 145 is supported at the corners on insulating standoffs 150 and the hood is oriented vertically thereabove. Assuming that the flash intensity is uniform over the test object's top surface 210, the heat conduction will be in a direction normal to the top surface 210 in most of the acreage area (i.e., area away from edges of the test object and flash boundary). The heat is conducted uniformly from the top surface 210 to the bottom surface 215 of the test object. Normal heat conduction will be obstructed by an anomaly such as a small round gapping delamination 220 at the center of the test object, as depicted in FIG. 2(a). The delamination 220 is characterized by noting it begins at some depth (d) 221 below the top surface 210. The delamination 220 may also be characterized as having some diameter (D) or width 222 and a gap 223. The volume bounded by the anomaly 220 on one side and the top surface 210 on the other side is called the heat trapping volume 225.

The top surface area 230 surrounding the anomaly 220 cools faster than the top surface area (or footprint) 235 above the anomaly 220. The IR camera 130 captures the surface temperature image in terms of the pixel intensity and shows the anomaly 220 as a hot spot (e.g. an area warmer than the surrounding area) which is about the size and shape of the anomaly footprint. The relative pixel intensity of the hot spot changes with the time. Deeper anomalies appear at later times in the IR video compared to the near surface anomalies. After the appearance of an anomaly in the IR video, its relative pixel intensity continues to increase with time. The relative pixel intensity associated with the anomaly reaches a peak at a certain time, and then the relative intensity decays until the indication area temperature and the surrounding area temperature become equal. FIG. 2(b) shows one of the frames in a sample IR data-cube from a reinforced carbon-carbon (RCC) part with round FBHs machined from the back side to simulate gapping delaminations of differing depths and diameter. IR indications 240 from different flat bottom holes are clearly visible in the IR image. A measurement ROI 245 is shown as a square in the middle of one of the anomalies. A reference ROI 250 is shown as a square outside the anomaly area. The part continues to cool down to ambient temperature through heat convection and radiation. If any objects contact the part or the part has significant area that does not receive the flash, then the heat conduction to the unflashed areas or to the contacting object also causes cooling.

In some embodiments, such as for when the test object is a laminated thick plate with a large diameter anomaly at a shallow depth (i.e. the diameter to depth ratio is very large) and with the center point of the footprint of the anomaly which is on the top or flash illumination surface, the temperature decay after the flash at the center point does not depend on the diameter of the anomaly. The temperature decay is, however, dependent on the depth of the anomaly, especially after the time when a heat wave-front reaches the anomaly. The time at which the effect of the heat wave-front, reaching the bottom surface, is detectable on the top surface is called the normal transit time. For the example of an instantaneous pulse of heat radiation being applied to the plate, in which no heat transfer from the plate to the environment after receiving the flash is assumed, then the surface temperature is governed by heat conduction within the plate. The prior publication of H. S. Carslaw and J. C. Jaeger (*Conduction of Heat in Solids*, Clarendon Press, Oxford, 1959) provides many analytical solutions for heat conduction problems. An approximate solution for the surface temperature rise at the center point as given by J. W. M. Spicer (*Active Thermography for Manufacturing and Process Control, Short Course Notes SC05, Thermosense, SPIE—The International Society for Optical Engineering*, April 1995) is, $$\Delta T(t) = \frac{\varepsilon Q}{\beta \sqrt{\pi t}} \left[ 1 + 2 \sum_{n=1}^{\infty} (-\Gamma)^n e^{\left(\frac{-\tau_n}{t}\right)} \right] \quad (1)$$

where, $$\Gamma = \frac{\beta_d - \beta}{\beta_d + \beta}, \quad (2)$$

$$\tau_n = \frac{n^2 d^2}{\alpha}, \quad (3)$$

$$\alpha = \frac{k}{\rho c}, \quad (4)$$

$$\beta = \sqrt{k \rho c}, \text{ and} \quad (5)$$

$$H = \frac{Q}{\Delta t}, \quad (6)$$

where $\Delta T$ is the temperature change from the pre-flash temperature on the front surface (° C., K, or ° F.), t is the time (sec) measured from end of the flash, $\tau_n$ is the multiple of heat transit time to the anomaly, $\alpha$ is the thermal diffusivity of the material or effective diffusivity (cm$^2$-sec$^{-1}$, m$^2$-sec$^{-1}$ or in$^2$-sec$^{-1}$), $\beta$ is the thermal effusivity of (layered) material above the anomaly (cal-cm$^{-2}$-° C.$^{-1}$-sec$^{-1/2}$, kcal-m$^{-2}$-K$^{-1}$-sec or BTU-ft$^{-2}$-° F.$^{-1}$-hr$^{-1/2}$), $\beta_d$ is the thermal effusivity of (layered) material below the anomaly (cal-cm$^{-2}$-° C.$^{-}$-sec$^{-1/2}$, kcal-m$^{-2}$-K$^{-1}$-sec$^{-1/2}$ or BTU-ft$^{-2}$-° F.$^{-1}$-hr$^{-1/2}$), c is the specific heat (cal-gm$^{-1}$-° C.$^{-1}$, kcal-kg$^{-1}$-K$^{-1}$ or BTU-lbm$^{-1}$-° F.$^{-1}$), d is the thickness of the (layered) material above the anomaly or anomaly depth (cm, m or in), e is the emissivity of the flashed surface, $\Delta t$ is the flash time (see), H is the average heat flux incident on the surface of the test object (cal-cm$^{-2}$ sec$^{-1}$, kcal-m$^{-2}$ sec$^{-1}$ or BTU-ft$^{-2}$hr$^{-1}$), Q is the total heat incident on the test object per unit surface area (cal-cm$^{-2}$, kcal-m$^{-2}$ or BTU-ft$^{-2}$), k is the thermal conductivity, (cal-cm$^{-1}$-° C.$^{-1}$ sec$^{-1}$, kcal-m$^{-1}$-K$^{-1}$ sec$^{-1}$ or BTU-ft$^{-1}$-° F.$^{-1}$ hr$^{-1}$), $\rho$ is the (layered) material density (g-cm$^{-3}$ kg-m$^{-3}$ or lbm-ft$^{-3}$), and $\Gamma$ is the thermal mismatch factor at the anomaly ($\Gamma$ is the Greek letter capital gamma). Equation (1) assumes that the surface temperature is affected solely by the diffusion of heat within the test object by conduction. The heat conduction at the center point is assumed to be in a direction normal to the top surface. The flash from each of the flash lamps is assumed to approximate the instantaneous heat pulse. The anomaly is modeled as a contact between two dissimilar layers with a mismatch factor $\Gamma$. For the situation with no anomaly and no thermal mismatch, $\Gamma$ is equal to zero and there is perfect contact between layers of the same material. For a transmissive anomaly, $\Gamma$ is equal to one and the bottom layer is a perfect conductor or heat sink and there is perfect contact with the conductor. For the case with a gapping delamination and no heat transmissivity, the bottom layer is a perfect insulator and $\Gamma$ is equal to minus one. It is assumed that air is present in the delamination gap causing heat transmission by conduction across the gap. For thin gap delaminations, the delamination gap thickness also factors in the thermal mismatch with values ranging typically between minus one and zero. Similarly, for bridging within a delamination and uneven contact pressure within the delamination, the thermal mismatch values would range from minus one to zero, indicating partial transmission of the heat. For a thick test object, with no anomaly, Γ is equal to zero and equation (1) simplifies to, $$\Delta T(t) = \frac{\varepsilon Q}{\beta \sqrt{\pi t}} \quad (7a)$$

Equation (7a) implies that the test object continues to cool to its initial temperature indefinitely. The above equations are not applicable at the instant flash time and earlier times. The surface temperature at the "zero time", which occurs immediately after the flash, is given by, $$\Delta T_0 = \frac{\varepsilon Q}{\beta \sqrt{\pi \Delta t}} \quad (7b)$$

It is difficult to measure the temperature at "zero time" because it changes very rapidly within the camera measurement period or the instrument response time. For instance, a variation in the delay between flash trigger with respect to the camera frame trigger may cause the camera to measure varying flash responses. In other instances, some cameras may saturate momentarily due to the high intensity of the flash. Also, the tail end of the flash, if not decayed sufficiently, may continue in the first or earlier post-flash frames. Therefore, measurements taken immediately after the flash (i.e., the first frame) may have lower repeatability and undesired information. Hence, options to block or omit these frames in the IR Contrast model and data analysis are provided. For the situation in which a large gapping anomaly Γ is equal to minus one, equation (1) simplifies to:

$$\Delta T(t) = \frac{\varepsilon Q}{\beta \sqrt{\pi t}} \left[ 1 + 2 \sum_{n=1}^{\infty} e^{\left(\frac{-\tau_n}{t}\right)} \right]. \quad (8)$$

In some embodiments, the anomaly appears in the IR image video sequence at a time related to the normal transit time given by equation (9), $$t_{appear} = l_1 \tau, \quad 0 < l_1 < 1 \quad (9)$$

where, $$\tau = \frac{d^2}{\alpha}. \quad (10)$$

The normal transit time, τ, is related to the Fourier Modulus. The intensity of the anomaly indication is strongest at another time called the "optimal time" (or the peak contrast time as defined later) and is given by equation (11), $$t_{peak} = l_2 \tau, \quad l_2 > l_1 > 0. \quad (11)$$

The anomaly has a lateral heat flow around its center point. The heat is conducted over the edges of the anomaly to cooler surrounding areas and material below the anomaly. The effect of the boundary of the anomaly on the temperature of the center point of the anomaly footprint is influenced by the lateral (transverse) transit time given by equation (12):

$$t_{appear}^{lateral} = l_3 \tau_l, \quad 0 < l_3 < 1. \quad (12)$$

The lateral transit time $\tau_l$, is given by equation (13):

$$\tau_l = \frac{r^2}{\alpha_l}, \quad (13)$$

where r is the radius of the anomaly (cm, ft) and $\alpha_l$ is the lateral (or transverse) diffusivity which is the same as the thickness diffusivity for isotropic materials. With the IR Contrast model, a single value for the diffusivity that provides an acceptable calibration match will be used. This value is likely to be between the two diffusivities, the normal and the lateral, but can also be dependent on the depth of the anomaly. The IR Contrast model addresses the difference in diffusivities through calibration constants and limits on the applicability of the model. $l_3$ is similar to $l_1$ and is used conceptually to illustrate that the temperature of the center point is affected by the diffusion transit times to the lower boundary defined by the flaw depth and the edge boundary defined by the radius.

The effect of the anomaly edge (diameter) on the temperature at the center point will occur before the effect of the depth of the anomaly if $\tau_l$ is less than τ. The ratio of these two transit times plays an important role in the relative contribution of the depth, d, and diameter, D, in the peak contrast time of the anomaly. The ratio of the transit times is proportional to the square of the diameter to depth ratio, i.e. $\tau_l/\tau \alpha (D/d)^2$. Three ratios, gamma (γ), omega (ω), and phi (φ), based on the dimensional measurements can be defined. Gamma is the ratio of the diameter of the anomaly (or the width of a long anomaly φ≥3, φ is defined in Equation (14c)) to its depth below the surface as shown in equation (14a), $$\gamma = \frac{D}{d}, \quad \text{or } \gamma_{ap} = \frac{D_{ap}}{d}. \quad (14a)$$

In the above equation, the subscript $_{ap}$ indicates an apparent value referring to a value provided by the analysis rather than the actual measurement. For an anomaly described by its depth and diameter, the heat trapping volume is given by $d\pi D^2/4$. Omega, the ratio of the anomaly depth to test object thickness ratio, is shown in equation (14b), $$\omega = \frac{d}{d_{th}}, \quad (14b)$$

where $d_{th}$ is the test object thickness. Phi, the aspect ratio of the anomaly length (major axis) to the anomaly width (minor axis), is shown in equation (14c), $$\varphi = \frac{l}{w}, \quad (14c)$$

where w is the width of the anomaly. For a linear anomaly, the width is defined as the shorter of the two dimensions along the orthogonal axes. The length of the anomaly, l, is defined as the longer of the two dimensions along the orthogonal axes.

Next, the terms "normalized temperature contrast" and "normalized pixel intensity contrast" need to be defined. The normalized temperature contrast at an anomaly of interest may be defined as given in equations (15a) and (15b), $$\bar{C}^t = \frac{(T-T^0) - (T_{ref} - T_{ref}^0)}{(T-T^0) + (T_{ref} - T_{ref}^0)}, \quad (15a)$$

$$\bar{C}_{\%}^t = \frac{(T-T^0) - (T_{ref} - T_{ref}^0)}{(T-T^0) + (T_{ref} - T_{ref}^0)} \times 100, \quad (15b)$$

where, $\bar{C}^t$ is the normalized temperature contrast or modulation temperature contrast and is a function of time, t. Time is measured from the moment of the flash where time equals zero seconds. $\bar{C}_{\%}^t$ is the normalized temperature contrast expressed as percentage. T is the surface temperature at the measurement ROI in °C., K, or °F. $T_{ref}$ is the surface temperature at the reference ROI which is usually outside the footprint area of the anomaly. $T^0$ is the surface temperature of the measurement ROI before the flash. $T_{ref}^0$ is the surface temperature of the reference ROI before flash. Defining the temperature rise or normalized temperature at the measurement ROI at time t as $\Delta T=T^n=T-T^0$ and the temperature rise or normalized temperature at the reference area outside the anomaly at time t as $\Delta T_{ref}=T_{ref}^n=T_{ref}-T_{ref}^0$, equation (15a) can be expressed as shown in equation (16a):

$$\bar{C}^t = \frac{\Delta T - \Delta T_{ref}}{\Delta T + \Delta T_{ref}}. \quad (16a)$$

Thus, the "normalized temperature contrast", as defined herein, is a measure of the ratio of the difference between temperature rises (i.e., the relative change in temperature) occurring at the anomaly measurement ROI and the reference ROI compared to the sum of the two temperature rises occurring at the anomaly measurement ROI and the reference ROI. This definition is similar to the definition of signal modulation, and the values would range from minus one to one in normal, customary circumstances. In some abnormal situations, values beyond the customary range are possible. In most measurement situations, the reference area is always cooler than the anomaly area and, therefore, the contrast should normally be positive in value. But in practice, surface heat gradients caused by factors such as the proximity of the anomaly to the edge of the flash zone or the uneven thickness of the cross section may cause the anomaly to appear cooler at later times compared to the temperature of reference area. The pre-flash surface temperature distribution and emissivity variation may also affect the contrast. Ideally, $T^0 = T_{ref}^0$ and equation (15a) simplifies as shown in equation (16b):

$$\bar{C}_N^t = \frac{T - T_{ref}}{T + T_{ref} - 2T^0}. \quad (16b)$$

The denominator in the contrast definition normalizes the numerator. The contrast changes with time and increases rapidly after the flash. The contrast reaches a peak value and then slowly decays and achieves a substantially constant value. The contrast should ultimately reach zero when the temperature equalizes in the test object; however, the denominator also becomes quite small due to the low temperature rise increasing the noise in the contrast evolution at times beyond the end (analysis) time (which will be defined later). In the above anomaly definition, the measurement area can be considered to be a plate with thickness equal to the anomaly depth and the reference area can be considered to be a plate with infinite thickness. It was assumed that there was no heat loss from the test object and no thermal connection between the reference area and the anomaly area. Therefore, the contrast would not reach a zero value but would mostly level out or reach close to a steady state value after a certain time.

Most radiometric capable IR cameras are calibrated to measure the surface temperature. These cameras provide a surface temperature map using either a color pallet or a gray scale. The contrast formula is directly applicable in this situation. However, the IR cameras used in a flash thermography set-up may not be calibrated for measurement of the temperature. The IR cameras used in flash thermography may have a linear pixel intensity response with the irradiance or the total radiation incident on the camera detector pixel. In this situation, the total radiation incident on the detector has three main components: (1) an emitted radiation from the surface of the test object; (2) a reflected radiation from the surface of the test object; and (3) a radiation from the air between the test object and the camera. The main component is assumed to be due to the thermal emission as a result of the high emissivity of the test object. Therefore, a normalized pixel intensity contrast may be defined as shown in equation (16c):

$$\bar{C}_W^t = \frac{\Delta W - \Delta W_{ref}}{\Delta W + \Delta W_{ref}}, \quad (16c)$$

wherein $\Delta W_{ref} = W_{ref}^n = W_{ref} - W_{ref}^0$ is the rise in the pixel intensity or normalized pixel intensity at the reference ROI at time t, $\Delta W = W^n = W - W^0$ is the rise in the pixel intensity or normalized pixel intensity at the measurement ROI at time t. Thus, the "normalized pixel intensity contrast", as defined herein, is a measure of the ratio of the difference in pixel intensity rise (i.e. relative pixel intensity rise) between the anomaly measurement ROI and the reference ROI to the sum of the two pixel intensity rises.

The pixel intensity registered by the camera due to the thermal emissions is approximately proportional to the fourth power of the surface temperature of the areas of the test object imaged in the pixel. However, it is expected that if the contrast definition is applied to the total incident radiation (or pixel intensity), the contrast would be approximately the same as the contrast calculated from the true surface temperatures (e.g. $\bar{C}^t \cong_W^t$) for high emissivity (>0.95) surfaces, assuming that the thermal emissivity (within the range of camera sensing wavelength) is high (>0.8) and constant over the surface of the test object under inspection. In addition, it is assumed that the flash intensity on the surface of the test object, the flash duration, and the part/camera/hood geometry are kept constant. With these assumptions, the pixel contrast and the temperature contrast are approximately equal to each other. The influence of small variations in the emissivity will be modeled approximately using a quantity called the emissivity factor ratio (to be defined later).

The flash time marks the beginning of the contrast evolution, where normally the contrast value is zero. On acreage delaminations, the contrast rises rapidly above the zero level with time to reach a peak and then slowly decays to the zero level at long times. An ideal shape of the contrast evolution is similar to a Gaussian distribution that is skewed to the left. Confidence in the analysis of the contrast evolution is higher if the shape of the contrast evolution is close to the ideal shape. Factors such as the part curvature, proximity to the part edge, step in the part, and uneven flash intensity may cause the contrast evolution to have a non-ideal shape. Some factors cause lateral heat flows that are not related to the anomaly under investigation causing a non-ideal contrast shape. In such situations, one may instead extract the contrast evolution with the proper choice of measurement and reference ROIs such that the shape of the evolution is as close to the ideal shape as possible. In the embodiment described herein, a method of artificially leveling or shifting the evolution vertically is provided, but it should be used only after validation.

In some embodiments, the contrast may not start at the zero level. The contrast may also dip below the zero level after reaching the peak and then slowly come back to the zero level as the temperature equalizes. In this situation, there may be a time period beyond the peak time when it is below the zero level but later it levels out providing a steady value for a considerable time. The steady state contrast is given by equations (17a) and (17b), $$\bar{C}^{Steady} = \frac{\Delta T^S - \Delta T_{ref}^S}{\Delta T^S + \Delta T_{ref}^S} \text{ and} \quad (17a)$$

$$\bar{C}_W^{Steady} = \frac{\Delta W^S - \Delta W_{ref}^S}{\Delta W^S + \Delta W_{ref}^S}. \quad (17b)$$

The superscript S is used to indicate a period of time in which the change in the contrast over passage of time is small. This period of time is called the "steady state time", where $\Delta T^S$ and $\Delta T_{ref}^S$ represent the temperature rises at steady state time for the measurement ROI and the reference ROI, respectively, and $\Delta W^S$ and $\Delta W_{ref}^S$ correspondingly represent the pixel intensity rises at steady state time for the measurement ROI and the reference ROI, respectively. To achieve leveling of the tail portion of the contrast evolution, an adjustment to the contrast may be applied using the expressions in equations (18a) and (18b):

$$\bar{C}_{adjusted}^t = \frac{\Delta T - \Delta T_{ref}}{\Delta T + \Delta T_{ref}} - l_4 \bar{C}^{Steady}, 0 < l_4 < 1 \text{ and} \quad (18a)$$

$$\bar{C}_{W\,adjusted}^t = \frac{\Delta W - \Delta W_{ref}}{\Delta W + \Delta W_{ref}} - l_4 \bar{C}_W^{Steady}. \quad (18b)$$

Selecting a value of $l_4$ equal to one would result in bringing the contrast at the steady state time to zero. Under ideal conditions of flash uniformity and test object geometry, the contrast on the flat bottom holes is near zero at steady state times. In other embodiments, choosing the reference ROI closer to the anomaly reduces the negative incursion of the contrast. Uniformity of the flash intensity also helps in reducing the negative incursion of the contrast. The flash intensity is usually most uniform in the center of the flash-hood. Locating the anomaly away from edges of the flash boundary also helps in mitigating the negative incursion of the contrast. The negative incursions of the contrast may be minimized by adjusting the physical test parameters before applying any contrast adjustment.

The Fourier Modulus in heat conduction is defined as the variable t' and is called the normalized time. It is related to the time as expressed in equation (19):

$$t' = t/\tau. \quad (19)$$

The time ratio of equation (1) can then be expressed as equation (20)

$$\frac{\tau_n}{t} = \frac{n^2}{t'}. \quad (20)$$

Substituting equation (20) into equation (1) results in the equations of (21a) and (21b):

$$\Delta T = \left(\frac{\varepsilon Q}{\beta d}\sqrt{\frac{\alpha_e}{\pi}}\right)\frac{1}{\sqrt{t'}}\left[1 + 2\sum_{n=1}^{\infty} e^{\left(-\frac{n^2}{t'}\right)}\right] \text{ and} \quad (21a)$$

$$\frac{\Delta T \beta d}{\varepsilon Q}\sqrt{\frac{\pi}{\alpha_e}} = \frac{1}{\sqrt{t'}}\left[1 + 2\sum_{n=1}^{\infty} e^{\left(-\frac{n^2}{t'}\right)}\right]. \quad (21b)$$

The right hand side of equation (21b) is only a function of the normalized time. Equation (7a) can be expressed as shown in equation (22), $$\Delta T_R = \left(\frac{\varepsilon Q}{\beta d}\sqrt{\frac{\alpha_e}{\pi}}\right)\frac{1}{\sqrt{t'}}. \quad (22)$$

Substituting equation (21a) and equation (21b) into equation (16a) yields equation (23):

$$\bar{C}^{t'} = \frac{\sum_{n=1}^{\infty} e^{\left(-\frac{n^2}{t'}\right)}}{1 + \sum_{n=1}^{\infty} e^{\left(-\frac{n^2}{t'}\right)}}, \text{ where } 0 < \bar{C}_N^{t'} < 1. \quad (23)$$

Figure 3:
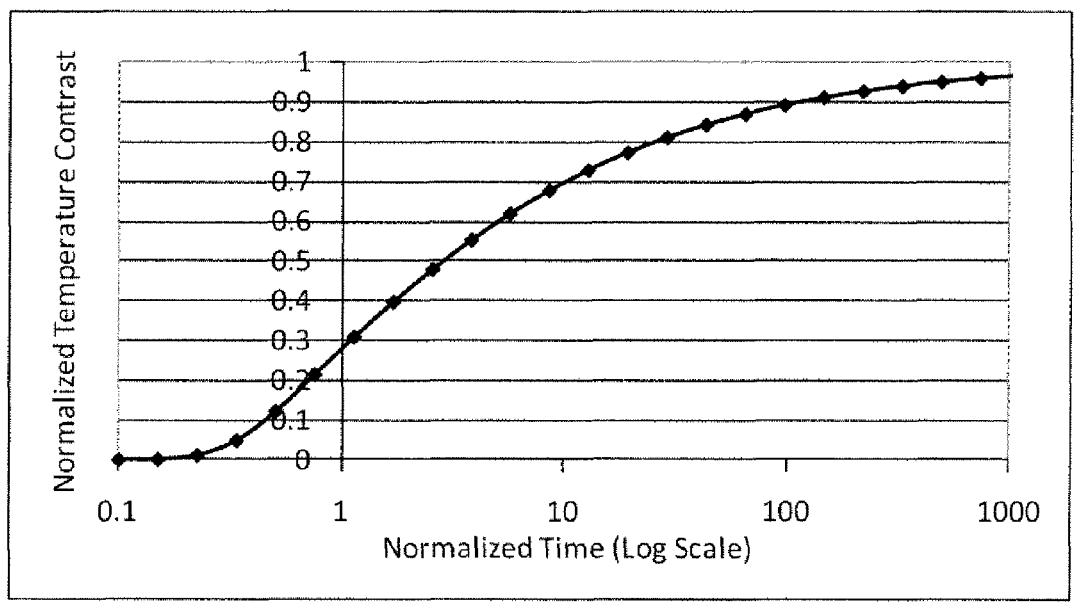
FIG. 3 is a graph of the normalized temperature contrast as a function of the normalized time in accordance with embodiments described herein.

The normalized contrast is solely a function of the normalized time. It should always be positive per equation (23). Equation (23) implies that the normalized contrast evolution against the normalized time is the same for all isotropic materials and anomaly depths. Therefore, the evolution is called the invariant contrast evolution. The normalized contrast is also considered to be the thermal response of the anomaly. Equation (23) is plotted in FIG. 3 in semi-log and linear form. As can be seen in FIG. 3, there is an inflection point at t' equal to 0.5. Defining an early detection time ($t_{appear}$) as one percent contrast, then t' equals to 0.2 and $l_1$=0.2 per equation (9). Here, the normalized contrast keeps increasing with time and is asymptotic to one. The above contrast evolution is applicable to high values of the diameter D to depth d ratio or gamma γ. Essentially, the contrast evolution is drawn from the center points of two plates of the same material. The measurement ROI is on a plate with thickness equal to the anomaly depth. The reference ROI is on a plate with infinite thickness. Due to separation of the plates, there is no cross heat flow between the two plates and the two plates cannot reach the same temperature after the flash. While the thinner plate reaches a constant temperature, the thicker slab continues to cool down indefinitely. The contrast evolution for any isotropic material with a large FBH-like anomaly can be obtained by using the above contrast evolution and by transforming the normalized time to the real time by using equation (19). The concept of using the invariant contrast evolution for prediction of the normalized contrast is developed further to design the IR Contrast prediction model.

As the $\gamma$ ratio becomes smaller, the lateral heat conduction contributes to the cooling rate and the contrast evolution has a shorter peak. In some embodiments, the contrast rarely approaches the value of one, because heat from the trapped volume is dissipated to the surrounding area due to cross heat flow. For delaminations, heat from the trapped volume is also conducted to material below the delamination through the delamination gap. The peak in the contrast is reached below a contrast value of one with a subsequent gradual reduction in the contrast to zero due to temperature equalization by the cross anomaly heat flow. At later normalized times, the heat loss mechanisms influence the surface temperature as much as the internal conduction. In most embodiments, the contrast rarely goes above 0.7 on true delaminations, particularly if the reference area chosen is significantly larger (10 times) than the size of texture and the measurement area is larger (>2 times) than the texture size.

Figure 4:
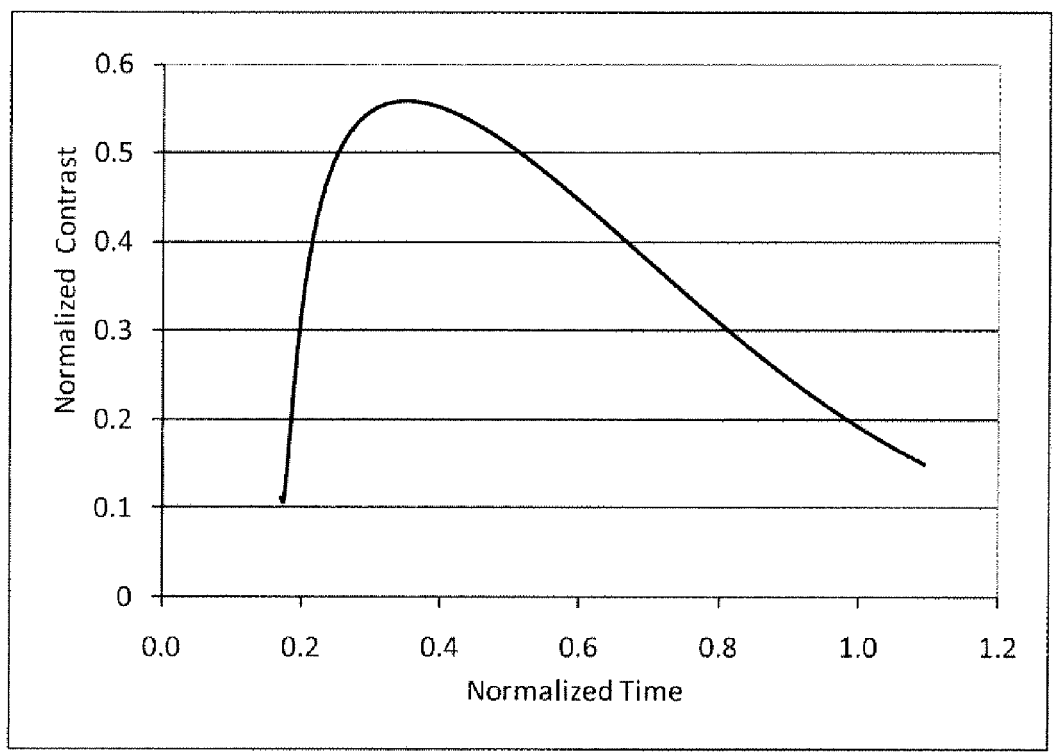
FIG. 4 is a graph of the normalized reference contrast evolution curve in accordance with embodiments described herein.

In order to accommodate lower values of the $\gamma$ ratio and to apply the contrast evolution prediction to practical situations, a measured contrast evolution curve (normalized contrast versus time) taken on a flat bottom hole (FBH) in an isotropic material (e.g., an anomaly with a 1 inch diameter and a depth of 0.05 inch, resulting in a $\gamma_{ref}$=20) is used to generate a "reference contrast evolution" curve to capture effects of most factors in the contrast measurement. The reference contrast evolution is considered to be a modified instance of the invariant contrast evolution of equation (23). The reference contrast evolution curve would be applicable to a range of $\gamma$ ratios in the neighborhood of its reference $\gamma$ value. FIG. 4 shows the normalized reference contrast evolution curve. The reference contrast evolution curve is similar to the invariant contrast evolution curve of FIG. 3 in that it is the source to generate the simulated contrast evolution curve, but the process also uses calibration and empirical relationships, which will be explained in further detail later.

In the above example, $l_1$ equals 0.2 and $l_2$ equals 0.35, per calculations using equation (9) and equation (11), respectively. All material properties as well as the surface emissivity are known. Transforming the actual time to the normalized time generates the normalized contrast versus the normalized time curve. In order to generate the simulated (predicted) contrast evolution of a flat bottom hole, the material properties of flat bottom hole depth and diameter need to be known. The normalized time (with known contrast) is transformed to the real time. Thus, the contrast versus the real time evolution is obtained. Making numerous changes to this approach allows calibration on known contrast evolutions. Here, the term "calibration" refers to the process of defining values of certain calibration constants to obtain a better match between evolutions of the predicted contrast and the measured contrast.

Using the reference normalized contrast (contrast with normalized time) and the ratio $\gamma$, and the three calibration constants (which will be described and defined later), the predicted contrast evolution may be fine-tuned within the diameter and depth range that is validated during calibration. To accommodate the smaller diameter of the anomaly, the normalized time expression in equation (19) is further modified as expressed in equation (24a):

$$t' = \frac{C_3\left(e^{-\frac{C_6}{\gamma'}}\right)}{\left(1 - e^{-\frac{\gamma'}{C_1}}\right)} \left(C_d \frac{\alpha_e t}{d^2} + C_7\right) + C_8, \tag{24a}$$

where $\alpha_e$ is the effective diffusivity (cm$^2$ sec$^{-1}$). The transformation coefficient $C_f$ is defined as given in equation (24b), $$C_f = \frac{C_3\left(e^{-\frac{C_6}{\gamma'}}\right)}{\left(1 - e^{-\frac{\gamma'}{C_1}}\right)}, \tag{24b}$$

and used to simplify the expression of the normalized time expression as shown in equation (24c), $$t' = C_f\left(C_d \frac{\alpha_e t}{d^2} + C_7\right) + C_8. \tag{24c}$$

To set-up the calibration based on the diameter of an anomaly, a diameter constant $C_D$ is introduced as expressed in equations (25a) and (25b), $$\gamma' = C_D \gamma \tag{25a}$$

and $$D' = C_D D, \tag{25b}$$

where $C_D$ is the diameter or width calibration constant and the nominal value for the diameter constant is equal to one. The contrast evolution shape (or profile) constants, $C_3$, $C_6$, $C_7$, and $C_8$ are derived empirically. Here, "$\alpha_e$" is defined as the effective diffusivity or an estimate of the effective diffusivity rather than the actual diffusivity. The effective diffusivity refers to a value of diffusivity used in this model that provides an acceptable prediction match after calibration. For isotropic materials, the effective diffusivity is the same as the material diffusivity. For anisotropic materials, it is related to material diffusivity and to direction of the heat flow. An appropriate value of the effective diffusivity may provide adequate calibration on selected flat bottom holes of a test object. "$C_d$" is the depth (or diffusivity) calibration constant. It is assumed to be constant for a given isotropic material within the validated range of flaws. The nominal value for the depth constant is equal to one. An expression for the simulated (predicted) contrast evolution is shown in equations (26a), (26b), (27a), and (27b), $$\overline{C}_{w,e}{}^{t} = \zeta \epsilon'' C_A C_5 A_c \overline{C}_{w,ref}{}^{tref} \tag{26a}$$

$$\overline{C}_{T,e} = \zeta C_A C_5 A_c \overline{C}_{T,ref}{}^{tref}, \tag{26b}$$

$$\epsilon'' = \frac{\epsilon'}{\epsilon'_{std}}, \text{ and} \tag{27a}$$

$$\epsilon' = \frac{\overline{C}'_w}{\overline{C}'_T}, \tag{27b}$$

where $C_5$ is the contrast evolution shape (or profile) constant and is derived empirically. $\epsilon''$ is the emissivity factor ratio used to account for differences in the emissivity between the calibration standard and the test object. $\epsilon'$ is a ratio of the normalized pixel intensity contrast to the normalized temperature contrast. Higher emissivity or flash power provides higher temperature rise and better signal-to-noise ratio. Lower emissivity or flash power provides lower temperature rise and lower value of the simple contrast. Lower emissivity also reflects more heat. The reflected heat causes the image contrast to decrease due to the increase in the denominator of equations (16a), (16b), and (16c). The emissivity factor ratio is introduced: to approximately account for small change in the emissivity or power. The value of the emissivity factor is equal to one for the object emissivity of one. Usually, the flash power setting is not changed and the emissivity of the test article is required to be high (>0.8) and the same as that of the calibration standard. Under these circumstances, the emissivity factor ratio is assumed to be unchanged with a value of one. The emissivity factor ratio is not needed for prediction of the temperature contrast, provided that the part emissivity is assumed to be uniform.

Starting with the realtime t (e.g. a frame at 1/60 or 1/120 sec), the realtime is transformed to the normalized time t' using equation (24b) and then t' is "inverse transformed" to the realtime $t_{ref}$ for a reference material flat bottom hole. Next, the contrast is read from the reference curve of FIG. 4. The reference curve is stored as a mathematical function $F(t_{ref})$. In some embodiments, it is stored as a digital curve. The mathematical function when matched is considered to be a curve-fit and allows for easy calculation of derivatives (e.g., $F'(t_{ref})$, $F''(t_{ref})$, etc.). The transformation/calculation process steps are given below. The reference contrast evolution may be obtained from a material different from the non-destructive evaluation (NDE) reference standard. The transformation is indicated by → and the calculation is indicated by ⇒. The realtime transformation is expressed in equation 28, $$t \to t' \to t_{ref} \Rightarrow \overline{C}_{w,ref}^{\,t_{ref}}. \tag{28}$$

A flaw size parameter (FSP), $A_c$, defined as a function of $\gamma$, is expressed in equation (29):

$$A_C = 1 - e^{-\left(\frac{\gamma' C_9}{C_4}\right)}, \quad 0 < A_C < 1. \tag{29}$$

Figure 5:
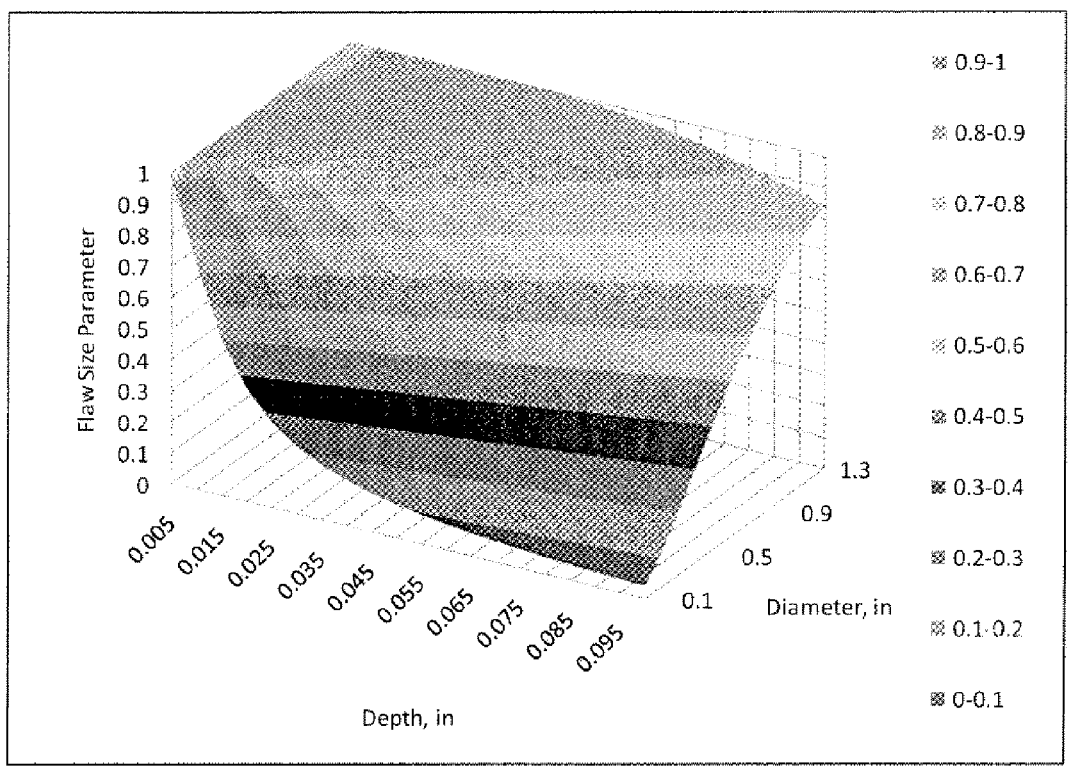
FIG. 5 is a graph of the flaw size parameter as a function of the depth and diameter in accordance with embodiments described herein.
Figure 6:
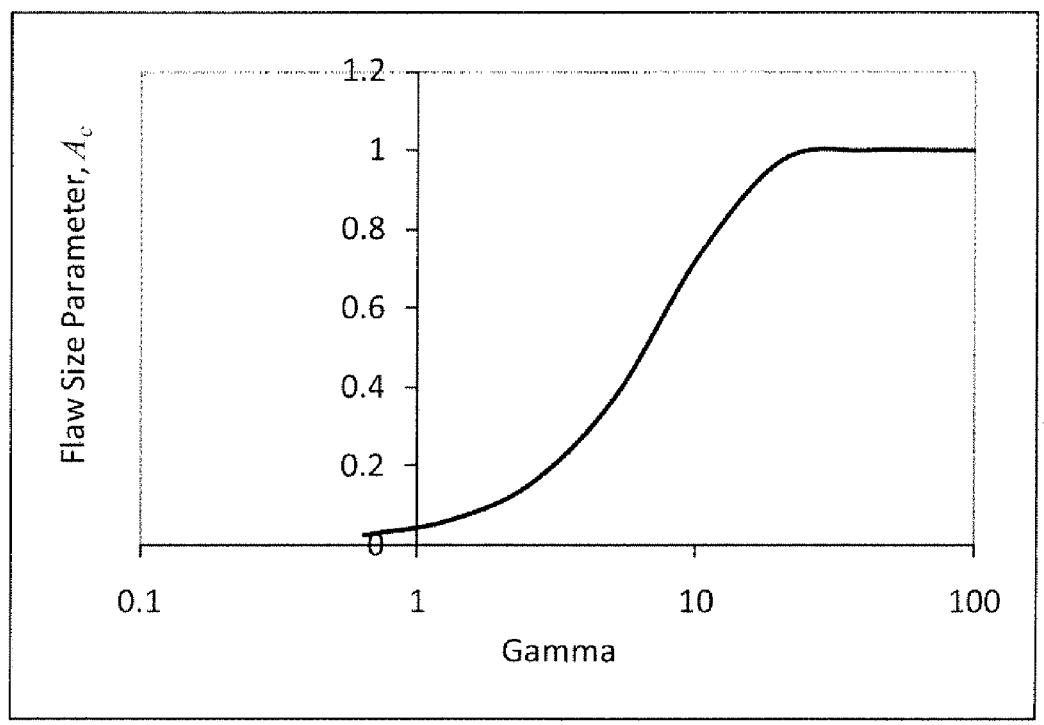
FIG. 6 is a graph of the flaw size parameter as a function of gamma in accordance with embodiments described herein.
Figure 7:
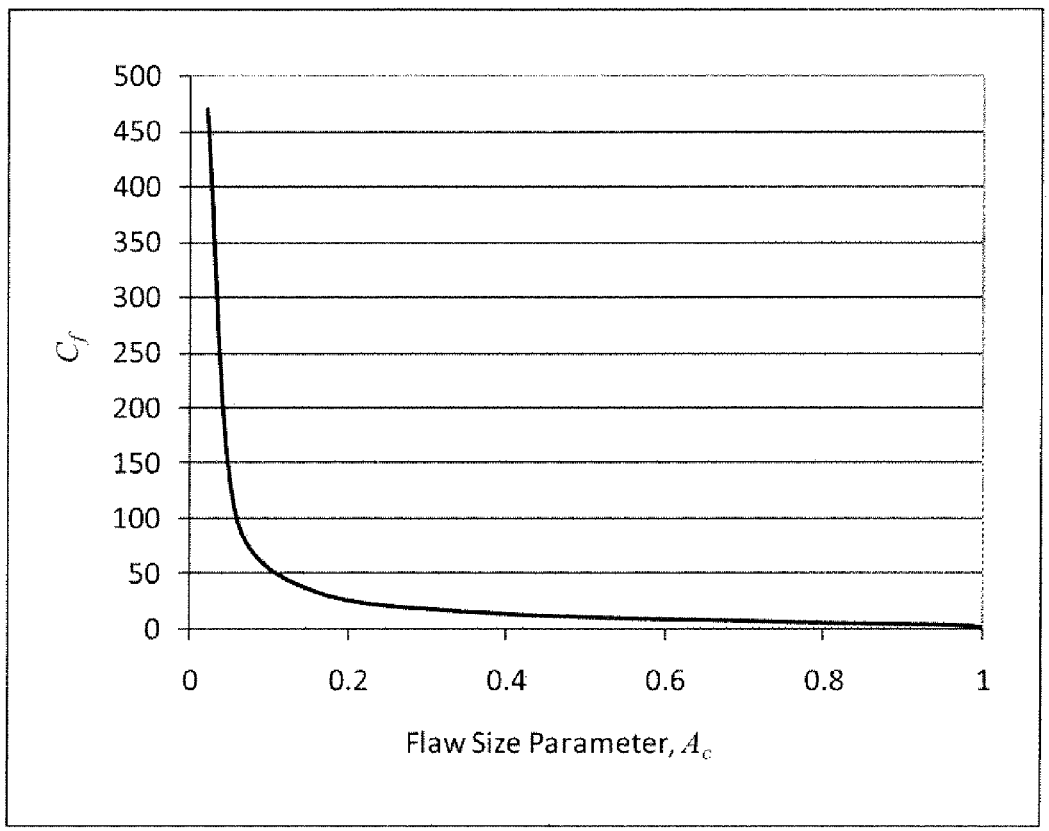
FIG. 7 is a graph of the transformation coefficient $C_f$ as a function of the flaw size parameter in accordance with embodiments described herein.
Figure 8:
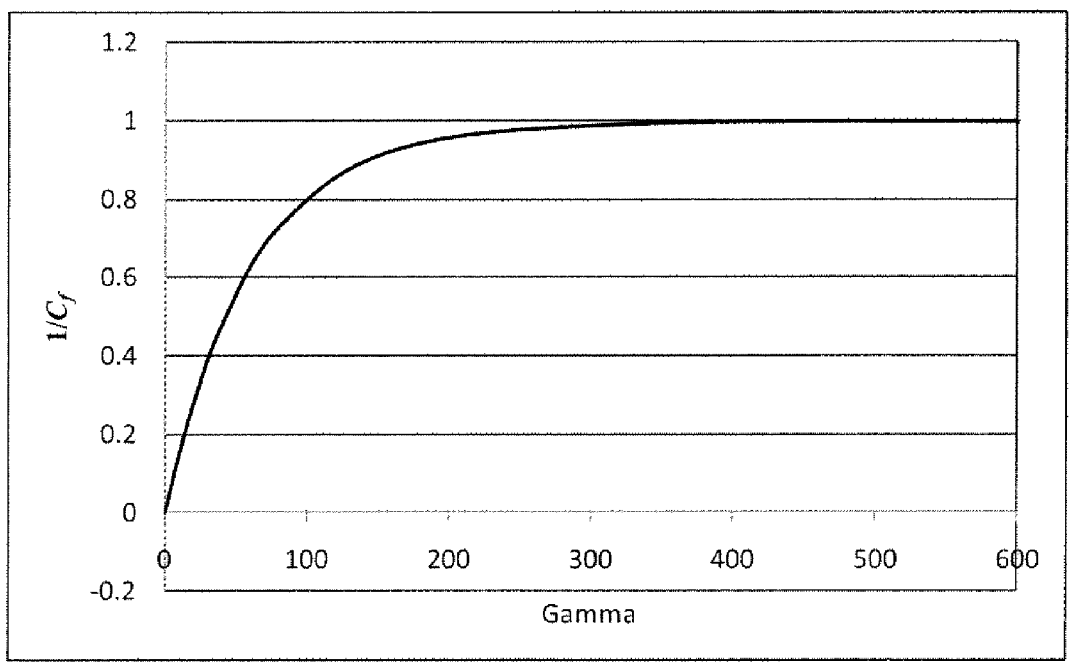
FIG. 8 is a graph of the inverse of the transformation coefficient as a function of gamma in accordance with embodiments described herein.

$C_4$ and $C_9$ are the contrast evolution shape constants. The FSP (also called "parameter 1") is used for amplitude and diameter calibration. FIG. 5 shows a plot of the FSP as a function of the depth and diameter of the anomaly. FIG. 6 shows a plot of the FSP as a function of gamma. For high values of gamma, the value of the FSP is equal to one. FIG. 7 shows the transformation coefficient $C_f$ as a function of the flaw size parameter $A_C$. For high values of the FSP, the value of the transformation coefficient $C_f$ is equal to one. The value of the transformation coefficient increases with a decrease in the value of the FSP. The inverse of the transformation coefficient is plotted against gamma in FIG. 8. This plot indicates that, for high values of gamma, the value of the transformation coefficient is equal to one.

Figure 9A:
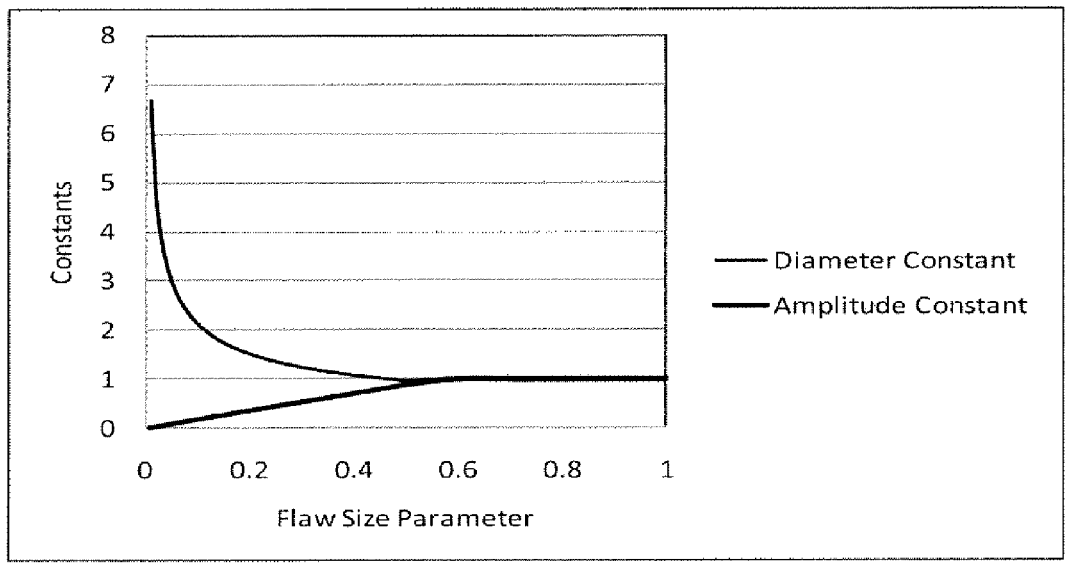
FIG. 9(*a*) is a graph of the diameter constant and amplitude constant calibration curves.

During the calibration process, the amplitude constant ($C_A$) and the diameter constant ($C_D$) are determined by trial and error for a given flat bottom hole. Many flat bottom holes are used to establish the calibration/correlation relationship between the FSP and the amplitude constant and between the FSP and the diameter constant. Usually a curve fit in the calibration data is used to establish these functions. FIG. 9(a) is a representative plot of the diameter constant and amplitude constant calibration curves established from flash thermography data on a calibration test sample having flat bottom holes. $C_5$ is a contrast evolution shape constant based on values of the contrast evolution shape constants $C_4$ and $C_9$. $C_5$ has a normalizing effect of the FSP and is expressed as $$C_5 = \frac{1}{1 - e^{-\left(\frac{20 C_9}{C_4}\right)}}. \tag{30}$$

Figure 10:
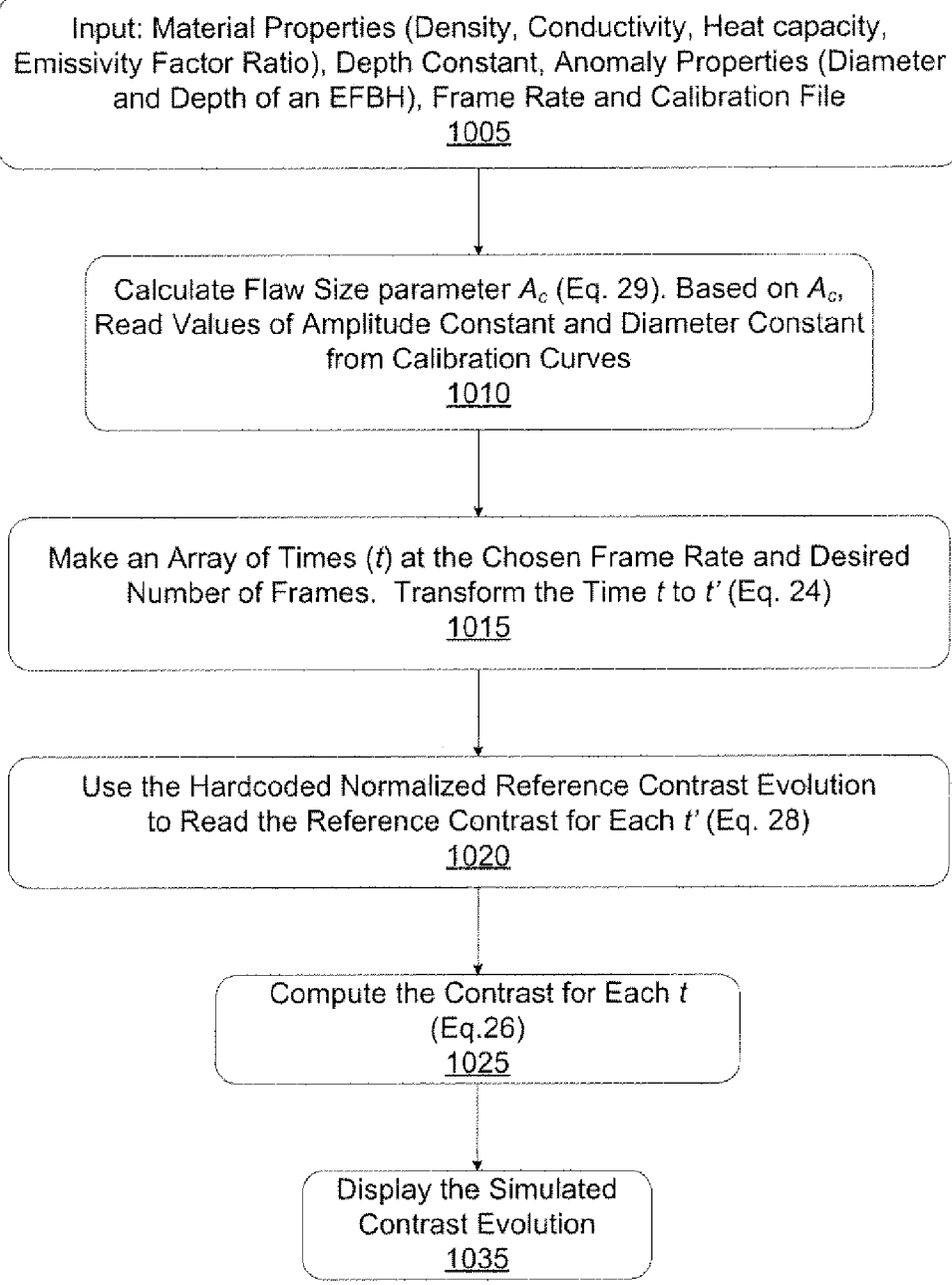
FIG. 10 is a flow diagram illustrating the process for simulating the contrast evolution.

In equation (30), the following values were substituted, d=0.05 inch, D=1.0 inch; and $\gamma'$=D/d 20. Values of the evolution shape constants are derived empirically. A flowchart of the process of generating the calibration curves is provided and described in further detail with reference to FIG. 30. A flow chart exemplifying the steps of the method for the above contrast simulation is shown in FIG. 10. The method begins at step or block 1005, where material properties, depth constant, anomaly properties, frame rate, and the calibration file are used as inputs. At block 1010, the flaw size parameter $A_c$ is calculated by using equation (29). Once $A_c$ is calculated, its value is used to derive values of amplitude constant and diameter constant from the respective calibration curves. At step or block 1015, an array of times (t) at the chosen frame rate and desired number of frames is made and then transformed to t' from equations (24a) and (24c). At step or block 1020, the hardcoded normalized reference contrast evolution is used to read the reference contrast for each t' as given by equation (28). At step or block 1025, the contrast for each t is computed using equations 26(a) and 26(b). At step or block 1035, the simulated contrast evolution is displayed.

In one embodiment, a direct depth estimation can be made. By manipulating equation (24a), an expression for the depth of an anomaly can be obtained as expressed in equation (31), $$\frac{1}{d^2} = \left(\frac{(t' - C_8)\left(1 - e^{-\frac{\gamma'}{C_1}}\right)}{C_3 \left(e^{\frac{C_6}{\gamma'}}\right)} - C_7\right) \frac{1}{C_d \alpha_e I}. \tag{31}$$

By estimating $\gamma'$, equation (31) can be used at many t and t' values to estimate the depth. Starting with the measured contrast data, which would typically be a two-column array (column 1 provides the time or the frame number, column 2 provides the contrast) with a time spacing of 0.017 sec (1/60 of sec based on 60 Hz frame rate), the peak contrast of the measured data is found. Using equation (26a), a multiplier, M, can be defined as expressed in equation (32), $$M \equiv \epsilon' \zeta C_A C_5 A_c = \frac{\overline{C}_{w,a}^{t'-peak}}{\overline{C}_{w,ref}^{t'-peak}} = \frac{\overline{C}_a^{t'-peak}}{0.56}. \tag{32}$$

For equation (32), the subscript "a" indicates the actual or measured contrast. The denominator with a value of 0.56 comes from the peak amplitude of the invariant evolution derived from FIG. 4. By manipulating equation (32), $A_c$ can be expressed as shown in equation (33), $$A_c = \frac{M}{\varepsilon' \zeta C_A C_5}. \quad (33)$$

By manipulating equation (29), $\gamma'$ can be expressed as shown in equation (34), $$\gamma' = (-(\ln(1 - A_c))C_4)^{\frac{1}{C_9}}. \quad (34)$$

By manipulating equation (25), the diameter can be expressed as shown equation (35), $$D = \frac{\gamma' d}{C_D}. \quad (35)$$

Figure 11:
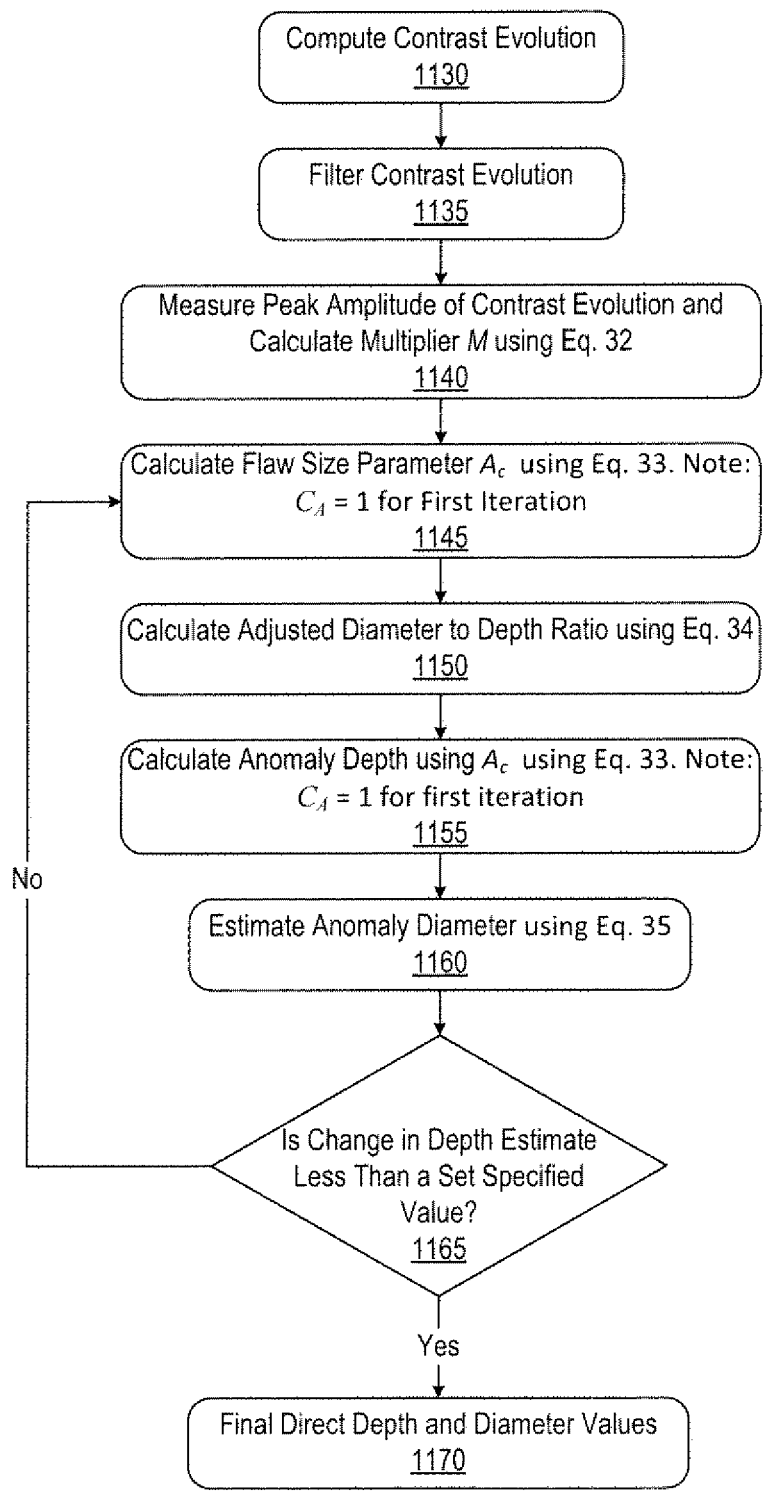
FIG. 11 is a flow diagram illustrating the direct estimation of the equivalent flat bottom hole depth and diameter in accordance with embodiments described herein.

Equation (35) can be used to estimate the equivalent diameter of the flat bottom hole, if all quantities on the right hand side are known. Equation (34) cannot be used to estimate $\gamma'$ until we know the value of $A_c$. Per equation (33), the value of $A_c$ is not known until the value of $C_A$ is known. However, an iterative loop can be set up between equations (31) through (35). The starting values for $C_D$ and $C_A$ are the nominal values equal to one. M is calculated using equation (32) as a constant for the iterative loop. Equation (33), followed by equation (34), is used to provide the value of $\gamma'$. At this point, the calibration constant for $C_D$ and $C_A$ are calculated, as they are functions of $A_c$. Next, equation (31) is used to estimate the depth, and equation (35) is used to estimate the diameter. Next, $A_c$ can again be estimated using equation (33) with the latest value for the amplitude constant $C_A$, and the process is repeated until the change in the depth estimation in successive iterations is less than a predetermined set value. The flowchart of this reiterative process is illustrated in detail in FIG. 11, and the process is called the direct estimation of the equivalent FBH depth and diameter. The method begins at step or block 1130, where the contrast evolution is computed, followed by filtering the contrast evolution at block 1135. At step or block 1140, the peak amplitude of the contrast evolution is measured and the multiplier M is calculated using equation (32). At step or block 1145, setting the value of $C_A$ equal to one for the first iteration, the flaw size parameter $A_c$ is calculated using equation (33). At step or block 1150, the adjusted diameter to depth ratio is calculated using equation (34). At step 1155, setting the value of $C_A$ equal to one for the first iteration and using the value of $A_c$ from equation (33), the anomaly depth is calculated. At step 1160, the anomaly diameter is estimated using equation (35). At decision block 1165, if the change in the depth estimate from the previous estimate is less than a predetermined set value, then the direct depth and diameter values are finalized. If not, the method loops back to step 1145 and re-performs the calculations through step 1160 until the change in the depth estimate is less than the predetermined value specified at step 1165.

The depth estimation may be done at numerous times during the measured contrast evolution to improve confidence in the value derived. For instance, it can be done at the peak contrast time as shown for Calculation number 1 in the table of FIG. 12. The other points of interest include the left 50 percent peak contrast point (Calculation number 2 values of FIG. 12), the right 50 percent peak contrast point (Calculation number 3 values of FIG. 12), and the right 10 percent peak contrast point (Calculation number 4 values of FIG. 12). For time beyond the right 50 percent contrast point ($t_{50R}$), influence of the lateral heat diffusion processes may be noticeable as a significant change in the contrast evolution.

The IR Contrast model uses several constants in equation (24a) and equation (25a). Equation (24a) is the time transformation equation. Therefore, the constants appearing in equation (24a) are called the "transformation constants". These include $C_1$, $C_3$, $C_6$, $C_7$, $C_8$, $C_d$, and $C_D$. The constants $C_1$, $C_3$, $C_6$, $C_7$, and $C_8$ have fixed values. Constants $C_7$ and $C_8$ are used to set the time offset in the transformation. Constants $C_1$, $C_3$, and $C_6$ are used to manipulate effect of $\gamma$. The effect of change in $\gamma$ is not fully accounted for by these internal constants, especially for the lower $\gamma$ values. The effect of change in $\gamma$ on the shape of the contrast evolution curve (e.g. the peak amplitude, the peak time, etc.) may need adjustment or calibration for change in the diffusivity from material to material due to change in anisotropy and layer thickness. Therefore, an external constant $C_D$ as a multiplier to $\gamma$ is introduced. This external constant is calibrated to capture the behavior of measured contrast on a given material, and therefore it is considered as one of the calibration constants. Since $C_D$ multiplies to $\gamma$, it is also called the "diameter constant". The effect of change in $C_D$ is more complex. It changes both the amplitude and the peak time (or time scale) of the contrast evolution and changes the estimation of the EFBH diameter.

The external constant $C_d$ is used as a multiplier to the diffusivity. Change in $C_d$ causes a change in the time scale or the shape of the profile but the peak amplitude is not affected. The constant is used to choose (or calibrate to) the effective diffusivity of the material and can be determined by matching the simulated contrast evolutions to the measured contrast evolutions of the FBHs with known diameter and depth. It multiplies to the depth ($1/d^2$). Therefore, it is also called the depth constant. Because $C_d$ also multiplies to the diffusivity, it can also be called the diffusivity calibration constant. The effect of change in the diffusivity in analyzing a given contrast data results in a change in the time scale and the depth estimation of the anomaly. The calibration process is intended to minimize errors due to small differences between the actual diffusivity and the effective diffusivity. Equations (26a) and (26b) involve additional constants. They include $C_A$, $A_c$, and $C_5$. These quantities have the effect of changing the amplitude of the contrast (amplification of vertical scale) and have no effect on the time. Therefore, $C_A$ and $C_5$ are called the "amplitude constants". Constant $C_5$ has a fixed value.

The flaw size parameter is not a constant. $A_c$ is a function of $\gamma$. Internal constants $C_4$ and $C_9$ are used in the computation of $A_c$. The effect of change in $\gamma$ on the contrast amplitude is not fully accounted for by $A_c$. Also, the effect of $\gamma$ on the amplitude may need adjustment or calibration for change in the diffusivity from material to material. Therefore, an external constant $C_A$, used as a multiplier to $A_c$, is introduced. This constant is calibrated to capture the behavior of the measured contrast amplitude, and therefore it is considered as one of the calibration constants. The effect of $C_A$ is to change the amplitude without affecting the time scale. Therefore, $C_A$ is called the amplitude calibration constant.

Constants $C_1$ through $C_9$ are internal constants with fixed values. They are used in the time transformation as well as the computation of the contrast amplitude. Internal constants are not part of the calibration constants. The IR Contrast uses three external constants for calibration. They are $C_A$, $C_D$, and $C_d$. The calibration constants capture effects of variation in $\gamma$ or the flaw size parameter, $A_c$, on the contrast evolution. Therefore, calibration profiles of $C_A$ and $C_D$, as functions of $A_c$, are established. The nominal value for each of the constants is one, and usually for high values of the $A_c$ (>0.5), the corresponding values of $C_A$ and $C_D$ are expected to be close to the nominal value of one.

A typical calibration process for an isotropic material involves use of various acreage FBHs in the subject material providing the $A_c$ values from 0.01 to at least 0.5. An optimized contrast evolution is obtained on each of the flat bottom holes. Each contrast evolution is analyzed separately starting with the highest $A_c$ (≥0.5) values. The data contrast evolution is displayed in the IR Contrast application, and a simulation contrast evolution is generated by choosing inputs for material, emissivity factor ratio, FBH depth, and FBH diameter (with depth constant=1, diameter constant=1, and amplitude constant. The process of matching simulation reveals any changes needed in the depth constant. The exercise is repeated on contrast data from many high flaw size parameter value holes, and a value of depth constant providing the best match on the contrast evolution curve is determined. Once the depth constant has been determined, contrast evolution curves with lower flaw size parameter values are analyzed with the calibrated (fixed) depth constant. The analysis involves matching the simulation with the measured contrast by using the actual FBH depth, the actual FBH diameter, and the depth constant as determined above. In addition, the diameter constant and amplitude constant are adjusted in an iterative manner to provide the best match of the simulation. The best match values of the diameter and amplitude calibration constants are plotted against the respective flaw size parameter value. Curves fitted through the plotted data are called the calibration curves. The amplitude and the diameter constant curves diverge with reduction in the flaw size parameter value.

The emissivity factor ratio $\epsilon''$ is normally set to one during calibration instead of choosing the actual value for emissivity. Normally, it is impractical to assess emissivity at the measurement region. It is assumed that the emissivity is high and uniform over the surface of the test object. Thus, the emissivity factor ratio can be set to one during calibration. Similarly, the amplitude ratio $\zeta$ (explained in further detail later herein) is set to one during calibration on the FBHs. The emissivity factor ratio and the amplitude ratio have identical effect on the contrast prediction. The IR Contrast simulation assumes that the flaws are located at a shallow depth compared to the part thickness. It also assumes that the part thickness is considered to be quite thick, i.e., much greater than the threshold thickness.

Even the approach of averaging four points (to find a better match of the simulation contrast with the measured contrast) is not likely to provide the optimum solution due to differences between the shape of the simulated contrast evolution and the measured contrast evolution. The direct depth estimation may provide a solution close to the optimum solution. Thus, the direct depth estimation is considered to be a starting point for a more accurate depth estimation using the following method.

The second method of estimating depth is based on scanning possible values of depth and diameter. An array of "I" depth values and an array of "J" diameter values is defined. Both I and J are natural numbers. The direct estimation of depth and diameter are captured in these arrays, possibly as the center values. This results in I times J diameter and depth pairs. The simulation contrast for one depth-diameter pair at a time is calculated. The simulation match or the fit index "delta square" is calculated from the measured contrast using the expression of equation (36), $$\Delta \overline{C}_w^2 = \sum_{n=ns}^{nf} (\overline{C}_{w,e} - \overline{C}_{w,a})^2. \tag{36}$$

A second fit index "delta square average" is calculated using the expression of equation (37), $$\Delta \overline{C}_{w,av}^2 = \frac{\sum_{n=ns}^{nf} (\overline{C}_{w,e} - \overline{C}_{w,a})^2}{nf - ns + 1}. \tag{37}$$

A third fit index "percent delta square" is calculated using the expression of equation (38), $$\Delta \overline{C}_{w,\%}^2 = 100 \frac{\sum_{n=ns}^{nf} (\overline{C}_{w,e} - \overline{C}_{w,a})^2}{\sum_{n=ns}^{nf} (\overline{C}_{w,a})^2}, \tag{38}$$

where ns and nf are the starting and ending frame numbers, respectively. Typically, the range may span from a frame at left 50 percent peak contrast to a frame at right 10 percent peak contrast. The delta square, equation (36), is calculated for all depth-diameter pairs and the minimum of all delta squares is sorted out. The diameter-depth input providing the minimum delta square is the best possible match within the selected range of frames. Equation (37) provides the average difference (difference square per frame) as an indicator of the fit between the simulation and the measured data. The method of array search is called the "scan fit." When the array is constructed around the direct depth estimation solution, then the method is termed as the "search fit." Equation (38) provides the percent difference between the simulation and the measured data.

Figure 13:
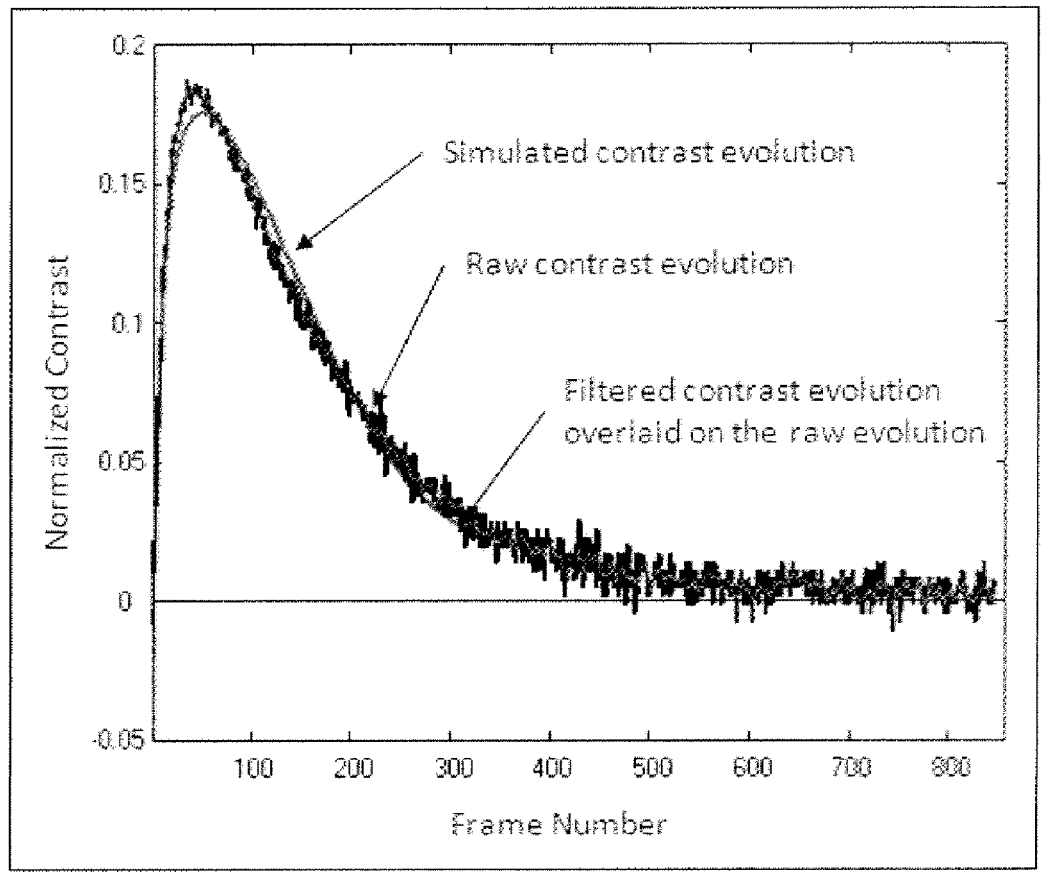
FIG. 13 is a graph of the measured raw contrast evolution, the filtered contrast evolution, and the simulated (predicted) contrast evolution in accordance with embodiments described herein.

The raw contrast data contains camera pixel noise. The signal can be filtered by a signal processing routine to improve the IR Contrast calculations. The filtered contrast and the measured raw contrast are shown in FIG. 13. Many signal smoothing options are available in the IR Contrast method. They include a Fast Fourier Transform (FFT) filter, an infinite impulse response filter, a finite impulse response filter, an exponential running average filter, an alpha beta filter, and a Kalman filter. Detecting frames that provide the peak contrast, such as left 50 percent of peak frame, etc., are affected by the noise incursion in the selected frame. Signal smoothing using signal processing filters (e.g., low pass FFT) helps to locate the frames more precisely. Also, the delta square calculation is affected somewhat by the noise and thus preferable to perform the delta square calculation on the smoothed (or smooth) data.

A smoothing index is defined as a sum of square of difference between the raw (unfiltered) contrast evolution and the filtered contrast evolution using the equation (39), which is similar to equation (36). The smoothing index "delta square" is calculated using the expression of equation (39), $$\Delta \overline{C}_w^{2-f} = \sum_{n=ns1}^{nf1} (\overline{C}_{w,af} - \overline{C}_{w,a})^2. \tag{39}$$

A smoothing index "delta square average" is calculated using the expression of equation (40), $$\Delta \overline{C}_{w,av}^{2-f} = \frac{\sum_{n=ns1}^{nf1} (\overline{C}_{w,af} - \overline{C}_{w,a})^2}{nf1 - ns1 + 1}. \tag{40}$$

A smoothing index "percent delta square" is calculated using the expression of equation (41), $$\Delta \overline{C}_{w,\%}^{2-f} = 100 \frac{\sum_{n=ns1}^{nf1} (\overline{C}_{w,af} - \overline{C}_{w,a})^2}{\sum_{n=ns1}^{nf1} (\overline{C}_{w,a})^2}, \tag{41}$$

where ns1 and nf1 are the starting and ending frame numbers used in this calculation. The subscript "af" is used to indicate the filtered or smooth contrast evolution. Lower values of the smoothing index imply a better match but not necessarily better smoothing, which is controlled by the degree of smoothing input. Starting from a highly low-pass-filtered (low-pass frequency f) signal, for any decrease in the filtering, (i.e. increase f), the delta square values would correspondingly be decreased. The derivative of slope, $|d^2 \Delta \overline{C}_w^{2-f}/df^2|$, decreases to zero with the low-pass frequency. The slope $|d\Delta \overline{C}_w^{2-f}/df|$ reduces with low-pass frequency, and at one point no significant reduction in the delta square is observed at the cost of increasing the low-pass frequency. Therefore, a compromise is chosen between the degree of smoothing and the smoothing index as the optimized smoothing solution. If a consistent degree of filtering (filter type and setting) is used, then equation (41) can be viewed as a measure of noise-to-signal ratio. The measured noise-to-signal ratio is higher than this estimation, as the filtered signal is not completely smooth similar to the predicted evolution. FIG. 13 also shows the predicted contrast curve that provides the best match to the measured contrast evolution. The EFBH depth and diameter input to the simulation providing the best match to measured contrast data is obtained in an automated way. The IR Contrast method calculates the approximate depth and diameter of the EFBH directly based on the peak contrast, peak contrast time and other times including $t_{50L}$, $t_{50R}$ and $t_{10R}$. The simulation matching provides an indirect method of assessing the EFBH depth and diameter.

Figure 14:
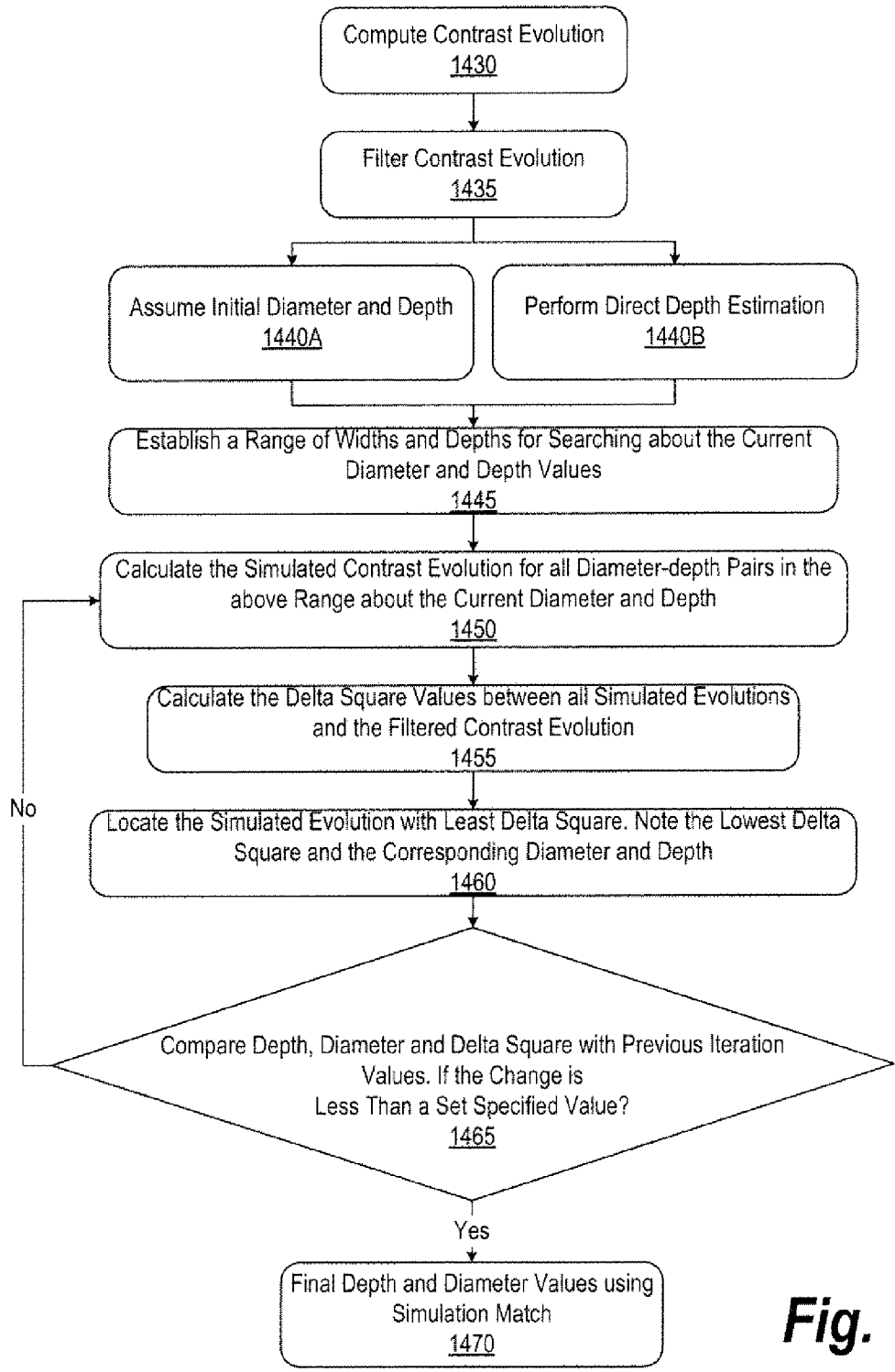
FIG. 14 is a flow diagram showing the process of contrast simulation match with the measured contrast evolution in accordance with embodiments described herein.

In accordance with embodiments described herein, a flowchart of an exemplary process of estimating depth and diameter values via a simulation match is provided with reference to FIG. 14. At step or block 1430, the estimation process begins by computing the contrast evolution. At step 1435, the contrast evolution is filtered. Next, either at step 1440A or step 1440B, the process comprises the step of assuming the initial diameter and depth, or the step of estimating a direct depth value, respectively. At step 1445, a range of widths and depths for searching about the current diameter and depth values is established. At step 1450, the simulated contrast evolution for all diameter-depth pairs in the range from step 1445 are calculated. Next, at step 1455, the delta square values between all simulated evolutions and the filtered contrast evolutions are calculated. At step 1460, the simulated evolution with least delta square is located. The lowest delta square and the corresponding diameter and depth are noted. At step 1465, the depth, diameter, and delta square are compared with the values from the previous iteration. If the change is less than a predetermined, specified value, then the process continues to step 1470. If not, then the process loops back to step 1450 and the step of calculating the simulated contrast evolution is repeated along with the steps 1455, 1460, and 1465 to arrive at compared values again. Once the process arrives at step 1470, the final depth and diameter values are determined using a simulation match.

Figure 15:
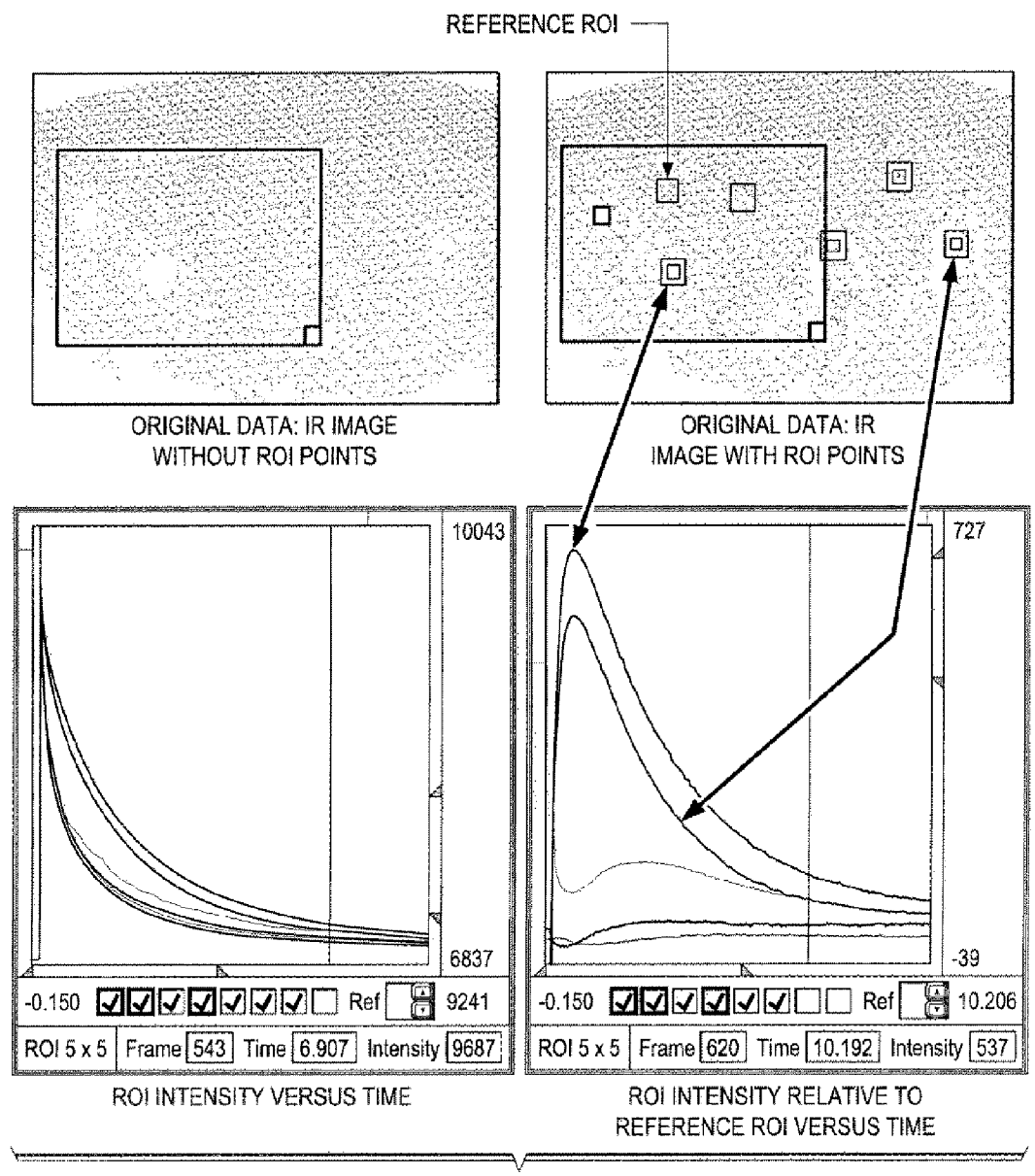
FIG. 15 is a frame from a raw data-cube with temperature versus time curves at selected regions of interest (ROI) including a reference region of interest.

In another embodiment, a separate contrast imaging method application is written to work with a commercially available IR data analysis software application sold under the brand name of EchoTherm®. For this embodiment, the contrast imaging application allows for the choice of the reference area, and the method then converts the raw data-cube into the contrast data-cube using the reference area chosen. The temperature versus time profile of each pixel is replaced by the normalized contrast versus time evolution. The contrast data-cube images look similar to the raw data-cube images. FIG. 15 shows a frame from a raw data-cube with temperature versus time curves at selected regions of interest (ROIs), including the reference ROI. Here, all pixels are used as the measurement pixels. Thus, the pixels within the reference ROI would have a contrast value of zero or close to zero.

Figure 16:
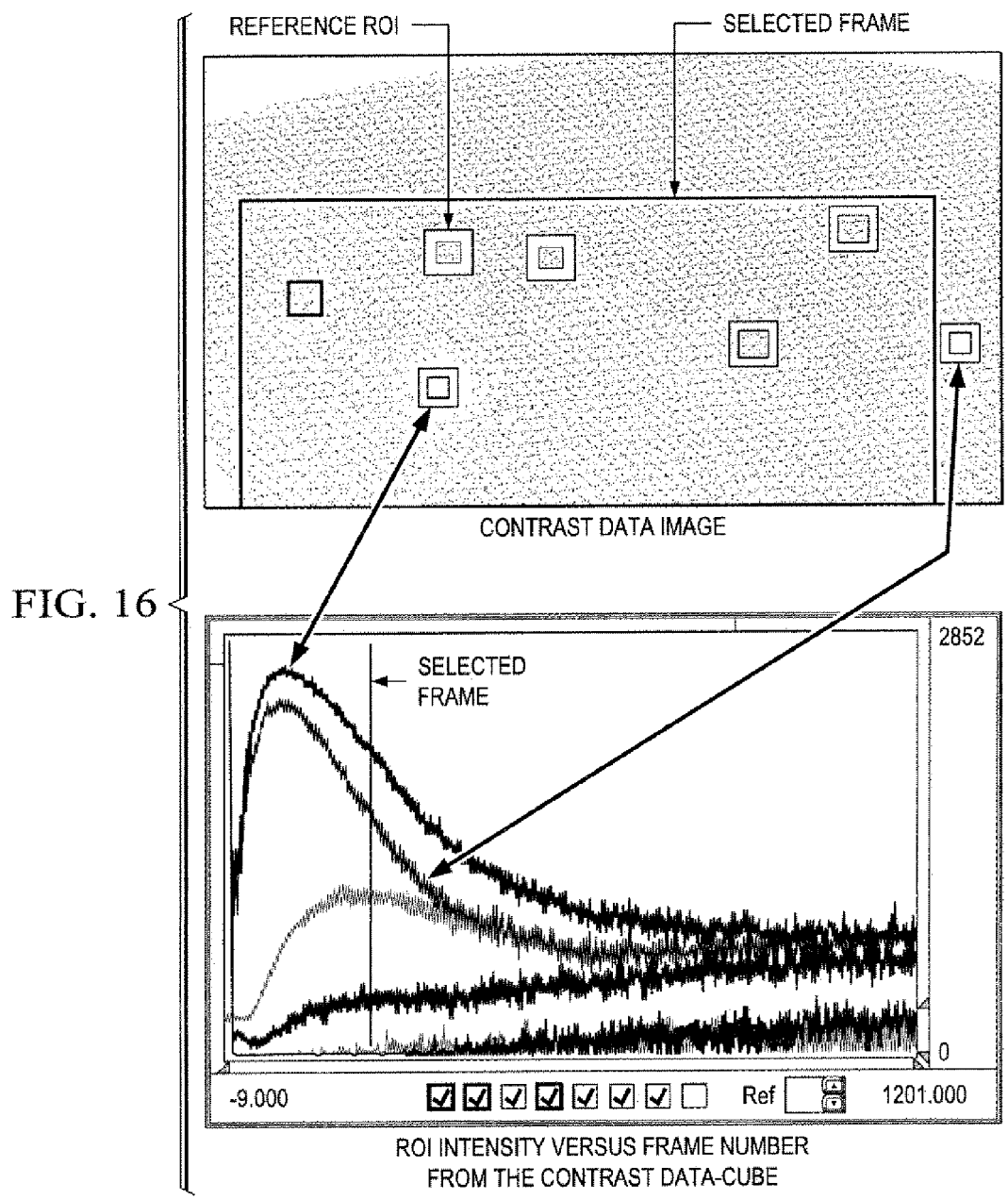
FIG. 16 is a frame from the contrast data-cube with the contrast versus time curves at selected region of interests in accordance with embodiments described herein.

FIG. 16 shows a frame image from a contrast data-cube with the contrast versus time curves at selected ROIs. The contrast data-cube allows for a quick view of the contrast evolution within the vicinity of the chosen reference ROI and forms the basis for feature images based on signal processing (e.g., filtering) and on the thermal measurements (e.g., peak time) described further in the following paragraph. These feature values are calculated for each pixel and displayed as a feature frame image. In accordance with another embodiment, the flowchart for the overall. IR Contrast process is provided in FIG. 17. The process begins at step 1705, wherein the flash thermography video data is recorded as a sequence of digital frames. At step 1720, an anomaly on one of the digital frames is selected. At step 1725, measurement and reference region of interest are determined. At step 1730, the contrast evolution data of the anomaly is extracted using either a single point extraction for round anomalies or a multipoint extraction for linear anomalies. At step 1735, the contrast evolution is computed for each measurement point followed by the act of filtering the contrast evolution at step 1740. At step 1745, the peak contrast, the peak contrast time, the left fifty percent peak time, and the right fifty percent peak time are calculated. From steps 1705, 1725, or 1745, the process can continue to step 1760, wherein an appropriate frame between the left fifty percent peak time and the peak contrast time is located, followed by the actions performed at step 1765, wherein the half-max boundary and the half-max width of the boundary of the anomaly are calculated. At step 1745, the process can also proceed to step 1750, wherein the peak product time is measured along with other features of the contrast evolution, followed by the actions at step 1755, wherein the anomaly gap thickness based on correlation is assessed by calculating the ratio of the peak product time to the square of the half-max width. Alternatively, from step 1745, the process can proceed to step 1770, wherein an equivalent flat bottom hole or equivalent uniform gap diameter value is estimated, such as by assuming an attenuation of zero for the equivalent flat bottom hole or a fifty percent attenuation for the equivalent uniform gap. Then, at step 1775, the anomaly gap thickness based on correlation is assessed by calculating a ratio of the equivalent flat bottom hole diameter or of the equivalent uniform gap diameter to the half-max width. Additionally, from step 1705, the process may continue to step 1780, wherein a reference region of interest is selected. Continuing with this thread of the process at step 1785, the sequence of digital frames is converted to a normalized contrast data-cube. At step 1790, the features of the contrast evolutions for each pixel are measured, which in turn are subsequently displayed as a feature frame image at step 1795.

The contrast evolution on a FBH has a shape close to the ideal shape of the contrast evolution. The ideal shape is similar to a skewed statistical distribution. Therefore, measurements based on the ideal shape of the evolution are possible. The shape of the contrast evolution is affected by two pixel intensity decay curves, e.g. the pixel intensity decay at the measurement ROI and the pixel intensity decay at the reference ROI. FIG. 18 shows the measurement and reference ROI decay curves plotted in log time. In FIG. 18, the reference pixel intensity versus the log of decay time is more or less linear until about frame 248. After this frame, the slope of the curve turns and becomes horizontal. The bend in the slope of the curve signifies the point in time of the effect of heat reaching the lower surface and affecting the heat diffusion from the reference ROI. For isotropic materials, the pixel intensity log decay is linear until the equilibrium temperature ($t_{tail}$ described in further detail later herein) is reached. In the normalized contrast definition, it is assumed that the reference decay curve with the log of time is linear. The reference decay curve is dictated by the heat diffusion or diffusivity in the normal direction. Apart from using the simulation contrast, thermal feature measurements on both the measured and the IR Contrast simulated evolution can be performed. An explanation of each measurement parameter now follows:

Peak Contrast, $\overline{C}_{w}^{t\text{-}peak}$:

The peak contrast is defined as the "amplitude" or value of the highest point in the contrast evolution curve. It may also be referred to as the peak amplitude or contrast amplitude. FIG. 19 shows a graph with the peak contrast and peak contrast time identified. The peak contrast is related primarily to the dominant feature of the anomaly. When surface texture (unlike delamination) is present, it provides its own peaks which may be superimposed on the peak caused by the subsurface anomaly. The surface texture indications occur at earlier times and the subsurface delamination indications occur at later times depending upon the depth. The peak in contrast is reached at later times if surface texture indications are not present. However, the texture indications may provide significant contrast at earlier times and may advance the resultant peak contrast time. Thus, in some embodiments the peak contrast is used as a measure of the resultant effect of the surface and subsurface anomaly. The peak contrast has a strong relation to the anomaly width and gap thickness in the anomaly.

Peak Contrast Time (sec), $t_{peak}$:

The peak contrast time is defined as the time (flash time=0 sec) at which the peak in the contrast occurs. The peak contrast time is also called the peak rise time or peak time. The contrast increases until the peak time and decreases after the peak time. Peak time divides the time into two time windows, namely the contrast rise time window and the contrast decay time window. The time window from the end of flash time to the peak time is called the contrast rise time window. The time window starting from the peak time and thereafter is called the contrast decay time window. The peak contrast time is influenced by the superimposition of effects of the surface/near surface texture and sub-surface anomaly. The two material conditions may provide either a single merged peak or two distinct peaks in the contrast evolution. It is assumed that the peak contrast and peak contrast time represent the dominant feature of the two effects if the subsurface peak is expected to occur at a later time compared to the texture peak. Thus, the peak contrast time has a strong relation to the anomaly depth.

Fifty Percent Left of Peak Time (sec), $t_{50L}$:

This parameter is the time (flash time=0 sec) at which the 50 percent of the peak contrast occurs before the peak contrast time. The contrast evolution before $t_{50L}$ may be useful if the surface/texture anomalies are needed to be analyzed. The IR indications of the surface anomalies are sharpest after the flash and diffuse away with time. Depending upon the location and size of the measurement ROT with respect to the texture indication and the severity of the texture effect, the contrast evolution shows variation in early times ($<t_{50L}$) after flash. This time has a strongly relation to the anomaly depth.

Fifty Percent Right of Peak Time (sec), $t_{50R}$:

This parameter is a time (flash time=0 sec) at which the 50 percent of peak contrast occurs after the peak contrast time. The contrast evolution beyond this time is significantly influenced by slow diffusion and cooling processes. The lateral heat diffusion, if present, can affect the contrast noticeably between the $t_{50R}$ and $t_{end}$. Therefore, a portion of contrast evolution between $t_{50L}$ and $t_{50R}$ is recommended to be used for comparison with the simulated contrast evolution in evaluation of the subsurface delaminations.

Ten Percent Right of Peak Time (sec), $t_{10R}$:

This parameter is a time (flash time=0 sec) at which the 10 percent of the peak contrast occurs after the peak contrast time.

End Time (sec), $t_{end}$:

This parameter is the time corresponding to frame ns in the calculation of the delta square. The relationship between the end time and fifty percent right of peak time and the peak time is given in equation (42a), $$t_{end} = 2t_{50R} - t_{peak}. \quad (42a)$$

Tail Time (sec), $t_{tail}$:

Another time used in the leveling of the contrast signal or in optimizing the location of the reference ROT is the tail time. The IR Contrast method assumes that the contrast value is nearly zero at the time of $t_{tail}$. The tail time is expressed in equation (42b), $$t_{tail} = 3t_{50R} - 2t_{peak}. \quad (42b)$$

Fifty Percent Persistence Time (sec), $t_{50L\text{-}50R}$:

The time between fifty percent left of peak time and fifty percent right of peak time is given by equation (43), $$t_{50L\text{-}50R} = t_{50R} - t_{50L}. \quad (43)$$

The fifty percent persistence time is strongly related to the anomaly width. The times defining the persistence can also be based on other time parameters, e.g., $t_{50L\text{-}10R}$.

Withholding Heat Time (sec):

This parameter is a measure of area under the contrast evolution curve and is strongly related to anomaly width. An expression is shown in equation (44a), $$t_{wh,50\text{-}50} = \overline{C}_{w,a}^{t\text{-}peak} t_{50L\text{-}50R}. \quad (44a)$$

Persistence Energy Time (sec):

This parameter is a measure of time given by equation (44b)

$$t_{E,50-50} = \frac{\sum_{n_{50L}}^{n_{50R}} \overline{C}_{w,a}}{v}. \quad (44b)$$

where v is the frame rate in frames/sec (Hz). $n_{50L}$ and $n_{50R}$ are the frame numbers corresponding to the times of $t_{50L}$ and $t_{50R}$, respectively. The Persistence Energy Time has a strong relation to the anomaly width. The frame numbers could be different as chosen by the user, e.g., $n_{50L}$ to $n_{10R}$; $n_{50L}$ to $n_{peak}$; or n1 to n2. Depending upon the choice of the starting frame number and ending frame number in relation to the peak time, the integrated times of equation (44b) may be denoted as the rise energy time, the decay energy time, etc. In many situations of inspection, especially for thin parts, use of the rise energy time may be appropriate, as the rise time is much shorter than the decay time and relates to the anomaly characteristics better due to the higher rate of the temperature change. Also, if the anomaly depth is expected to be constant, integrating between fixed frames (e.g., n1 and n2) is useful, especially within the rise time window. Both the persistence energy time and the withholding heat time are related to the heat trapping volume, or to the depth and diameter of the anomaly.

Two other parameters based on time may be defined. They are the "peak product time" and the "peak time to contrast ratio" (or peak time per unit peak contrast). The peak product time (sec), $t_{product}$, is given by equation (45a), $$t_{product} = \overline{C}_{w,a}^{t-peak} t_{peak}. \quad (45a)$$

The peak time to contrast ratio (sec), $t_{t,C}$, is given by equation (45b), $$t_{t,C} = \frac{t_{peak}}{\overline{C}_{w,a}^{t-peak}}. \quad (45b)$$

Figure 21A:
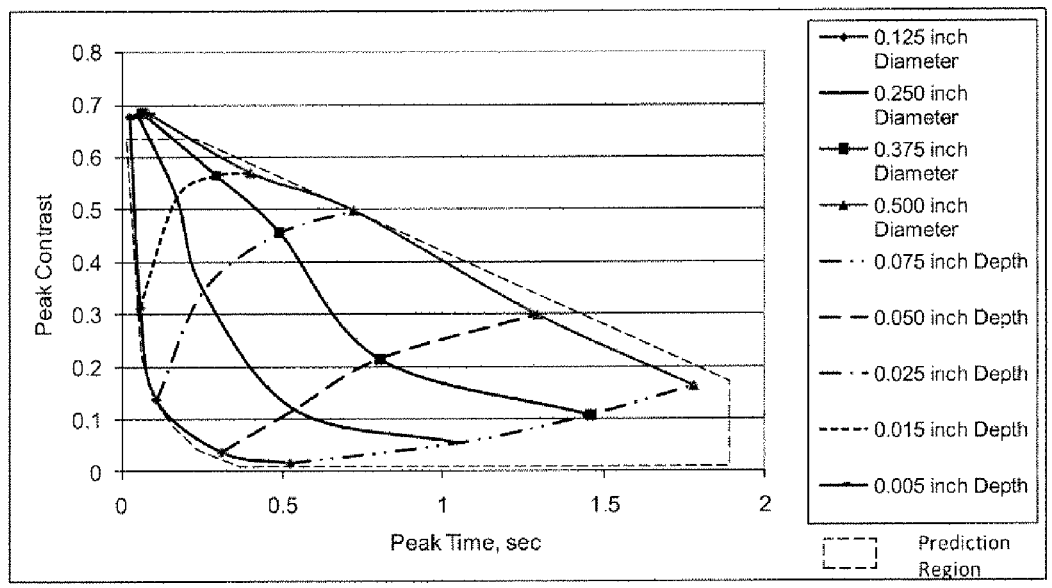
Figure 21B:
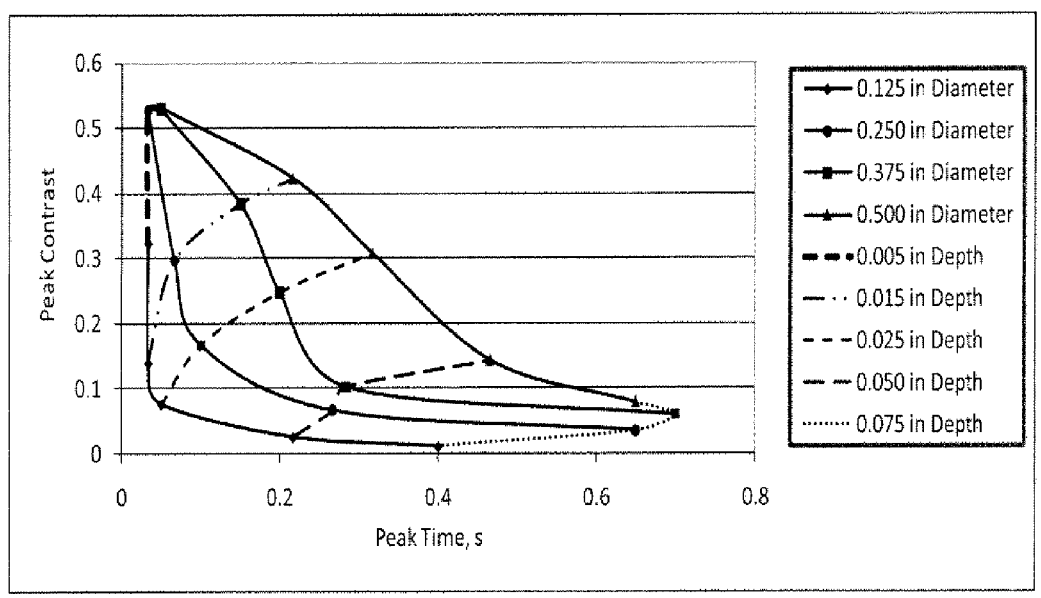

From the contrast maps shown in FIG. 20, FIG. 21(a), and FIG. 21(b), it is evident that the peak product time is related to the diameter of the EFBH (or EUG) and the peak time to contrast ratio is related to the depth of the EFBH (or EUG). The contrast map in FIG. 20 is generated by using an image post-processing simulation routine of a commercially available software known as ThermoCalc, sold by Innovation Ltd., whereas the contrast maps in FIG. 21(a) and FIG. 21(b) were plotted using the calibrated IR contrast of the embodiments described herein. FIG. 21(a) is from a flat bottom hole calibration, and FIG. 21(b) is from the same size (in depth and diameter) but thins voids with 50% attenuation. Thus, these measurements are useful if the simulation analysis is not performed. A smoothed contrast evolution and even simulation fit can provide a more stable detection of the peak point in the contrast evolution compared to the peak detection on the raw contrast evolution. Therefore, for more repeatable and reliable measurements, a smoothed evolution or the simulation fit evolution is recommended. In some circumstances, the raw evolution may not have a peak corresponding to the subsurface anomaly due to the influence of the texture. In such a case, use of the simulation fit evolution that is fitted to the subsurface portion of the raw contrast evolution may be better due to higher confidence in locating the peak and computing the quantities in equations (45a) and (45b).

Adjusted Flaw Size Parameter (adjusted FSP), $A_{cA}$:

This parameter is also known as flaw size parameter 2 and is given by equation (46), $$A_{cA} = C_A A_c. \quad (46)$$

The adjusted FSP relates to the peak contrast per equations (26a) and (26b) and is illustrated in FIG. 22. The data for FIG. 22 was taken from an RCC sample. The adjusted flaw size parameter provides correlation with the peak contrast and therefore is useful in statistical analysis, such as probability of detection analysis.

The persistence energy time, withholding heat time, and peak contrast are all measures of signal strength. The FSP and the adjusted FSP are measures of the anomaly size. Therefore, these measurements are candidates for a conventional probability of detection (POD) analysis where signal response to flaw size data is analyzed. The product of peak time and persistence time provides a correlation to the product of depth and diameter. The withholding heat time and persistence energy time capture the strength of the IR indication to draw attention for further analysis including the half-max width and the equivalent flat bottom hole analysis. Shallow anomalies have shorter persistence but higher amplitude. Deeper anomalies have lower amplitude. Wider anomalies have longer persistence. The persistence energy time captures the portion of evolution containing the peak of the contrast.

In a contrast evolution, the contrast is zero until time denoted by $t_{appear}$. The rise time (which is equal to $t_{peak} - t_{appear}$) is much shorter than the decay time ($t_{10R} - t_{peak}$). An inflection point exists between the $t_{peak}$ and $t_{appear}$. Also, an inflection point is located between $t_{peak}$ and $t_{10R}$. Different temperature gradients and heat flows exist in different time zones of the contrast evolutions of the FBH. Consider a FBH with a high γ value. For a post-flash time less than $t_{50L}$, the normal heat flow dominates and is therefore related more to the depth of the anomaly. The normal heat flow is highest immediately after the flash and reduces rapidly until the time $t_{50L}$. The lateral heat flow is negligible immediately after the flash till the early detection time ($t_{appear}$). Therefore, the early detection time strongly relates to the depth but not to the diameter. Unfortunately, it is a bit cumbersome to locate the early detection time due to the low contrast amplitude.

As the normal heat flow reduces, the lateral heat flow increases in the trapped volume with time. Thus, direction of the heat flow changes from vertical to a near lateral in the heat trapping volume. The lateral heat flow causes "spilling" of the heat from the boundary of the heat trapping volume into the surrounding volume. The normal conduction is dominant in the surrounding area for the period of the significant contrast. A small value for ω is assumed so that the heat transit time to the back surface is much longer than the heat transit time to the anomaly or the lateral transit times. Between the time $t_{50L}$ and the $t_{peak}$, the normal heat flow reduces significantly and the lateral heat flow builds up in the trapped volume. The time $t_{50L}$ is close to the inflection point in the contrast evolution, a time at which the normal temperature gradient in the heat trapping volume becomes low and the contrast continues to rise due to outpacing of the cooling in the surrounding area compared to the lateral heat flow (spilling). The inflection point near the $t_{50L}$ signifies transition from dominant normal heat flow in the trapped volume to the dominant lateral heat flow and the resulting heat flow across the boundary of the heat trapping volume. This observation can be demonstrated by examining the contrast evolutions of FBHs (or voids) with same characteristics but different widths (or diameters).

Thus, $t_{50}$, is related to both the depth and diameter of the anomaly. During the time period from $t_{50L}$ to $t_{peak}$, the surrounding area cools faster than the anomaly area. A larger diameter anomaly has a longer peak time. The peak time signifies the maximum in the lateral heat flow across the boundary of the trapped volume. The peak time is related to both the depth and the diameter.

Beyond the peak time, the trapped volume continues to cool faster than the surrounding area. The lateral heat flow continues to reduce gradually from the peak time until the contrast reaches a zero value. The lateral heat flow in the trapped volume dominates in the post peak time zone. The lateral heat flow is not only affected by the depth of the anomaly but also by the lateral transit time or the diameter of the anomaly. The $t_{50R}$ is also related to the anomaly width. The second inflection point may appear before or after the time $t_{50R}$ depending upon anomaly parameters. The second inflection point in the contrast evolution indicates transition from rapid cooling to slower cooling across the boundary of the trapped volume.

To understand the overall direction of the heat flow from the measurement ROI, a term called the "effective heat flow" is introduced. The direction of the effective heat flow can be approximated as from the anomaly center point on the surface to the closest inner corner of the FBH. The tangent of this angle is given by $\gamma/2$. The diffusivity in this direction can be called as an estimate of "the effective diffusivity" for the FBH. It is assumed that the effective diffusivity and the transit time from the center of the anomaly to the closest inner corner of the FBH have a controlling effect in influencing the contrast evolution. The contrast prediction model uses $\gamma$, which defines the direction of effective heat flow, to set-up the calibration. At any moment, the heat flow direction is different in different areas around the anomaly. For an anisotropic material, the diffusivity is different in different directions. For anisotropic materials, the diffusivity may also be different at different locations. Thus, in reality, the heat flows that influence the contrast evolution may be subject to varying diffusivity and direction with time. The IR Contrast method assumes that the normal and lateral diffusivities do not differ significantly and can be approximated in a single value of the effective diffusivity, although some variation in the effective diffusivity with anomaly depth has been accommodated in the methods of the embodiments described herein.

True delaminations are different from flat bottom holes. Unlike the circumstance of a FBH, heat flows behind the delamination. Moreover, the gap thickness between the two faces of the delamination may vary from the center towards the edge. The gap thickness may be largest in the center. From the center of the delamination to the edge, the gap may taper off to an intermittent contact/gap and finally to a zero gap or continuous material. The intermittent contact close to the edge provides a path for heat conduction. Both the heat conduction through the edge and the heat conduction behind the delamination cause change in the direction of the effective heat flow, changing the contrast evolution and the IR Contrast prediction. In some cases, the delamination may have varying degree of intermittent contact resulting in a positive heat transmissivity. The degree of bridging affects the contrast evolution and the contrast prediction.

In delaminations with the tapering gap, the measurement ROI is located close to the center of the anomaly where the gap thickness is highest. The contrast evolution is influenced by the effective heat flow direction that is primarily influenced by the thicker gap. The region bounded by the effective heat flow directions at the plane of the anomaly is called the primary region of measurement for the chosen measurement ROI. Therefore, in this situation, the contrast analysis predicts the EFBH (or EUG) diameter that relates to the width of the delamination where the gap is relatively thicker. The boundary or width of the thicker gap can be assessed using the half-max technique, which will be described in further detail later herein. The thinner gap surrounding the thicker gap does not influence the contrast evolution appreciably, and the thinner gap region is considered to be outside the primary region of the measurement. A similar effect occurs when the delamination gap is intermittent such that there is bridging (or a thin gap) at several regions of a delamination. When the bridging occurs at multiple locations within a delamination, the effective heat flow angle for the measurement ROI may be heavily influenced by the bridging. Localized high pixel intensity locations occur between the bridging locations. Any of the localized high pixel intensity locations can be chosen as the measurement ROI. Therefore, the primary region of measurement around the chosen measurement ROI may be much smaller than the overall width of the delamination. The half-max technique, depending upon the choice of measurement and reference ROI, may provide boundaries for the overall delamination or the primary region of measurement.

The width of the anomaly indications, denoted by $w_{hm}$, can be directly measured from the IR data by choosing an appropriate frame. The IR Contrast technique assumes that the delamination gap thickness is uniform. The pixel intensities along a scan line drawn across the linear indication or through the center of a circular indication are plotted against the pixel location. For a randomly oriented indication boundary, a scan line is established normal the boundary and the IR Contrast technique is used for localized edge detection. The maximum intensity pixel coordinate and its intensity ($W_{max}$) are noted. Similarly, the pixel coordinate and intensity of the baseline or reference level ($W_{ref,L}$ and $W_{ref,R}$) at left of the maximum intensity pixel and to the right of the maximum intensity pixel are noted. The average intensity of the maximum value and the base level value is used as the 50 percent or half-max intensity level ($W_{hm}$). Although, other percent boundaries (e.g. 30 percent boundary) are sometimes used to make the boundary estimates more or less conservative. The half-max algorithm can be applied to the normalized intensity data-cube. The normalized data-cube is obtained by subtracting the pre-flash frame intensity of each pixel from corresponding pixels of all post-flash frames (i.e. $W^n = W - W^0$). Equations (47a) through (47e) provide various formulas to compute the half max intensity:

$$W_{hm,L} = \frac{W_{ref,L} + W_{max}}{2}, \tag{47a}$$

$$W_{hm,R} = \frac{W_{ref,R} + W_{max}}{2}, \tag{47b}$$

$$W_{hm} = \frac{W_{ref,R} + W_{ref,R} + 2W_{max}}{4}, \tag{47c}$$

$$W_{hm} = \frac{W_{ref} + W_{max}}{2}, \text{ and} \tag{47d}$$

$$W_{hm}^n = \frac{W_{ref}^n + W_{max}^n}{2}. \tag{47e}$$

Two pixel coordinates, one at left 50 percent of intensity and the other at right 50 percent of intensity, are located. Pixels between the left 50 percent peak to the right 50 percent peak are counted and converted to length by multiplying the width of the image pixel to compute an approximate measure of the anomaly width. This technique is called the "width measurement using the half-max technique." The technique is applied to frames between $t_{50L}$ and $t_{peak}$ assuming that the surface texture effects occur before $t_{50L}$. For a randomly oriented indication boundary, many scan lines are established along the entire boundary such that the lines are normal to the boundary. The scan lines are used to plot the pixel intensity along the scan line and locate the 50 percent intensity pixel as the location of the edge of the indication. A running contrast threshold (e.g. % $\overline{C}_{r,threshold}$=1 percent) is used to compare maximum running contrast $\overline{C}_{r,max}$ and screen the indication data for noise. The expression for running contrast is shown in equation (470, $$\overline{C}_{r,max} = \frac{W_{max} - W_{ref}}{W_{ref}} \times 100 \geq \overline{C}_{r,threshold}. \tag{47f}$$

The ratio of the normalized half-max intensity to the spatial noise shall typically be a value more than two for meaningful boundary estimation, as expressed in equation (47g)

$$(W_{hm}{}^n/W_{noise} > 2). \tag{47g}$$

Resolution of the half-max pixel can be improved by interpolation within pixels. The half-max estimation is in error if the delamination thickness is not uniform. Therefore, the half-max width estimation should be complemented by the EFBH or EUG diameter estimations as needed to improve confidence in the estimation. FIG. 23(a) illustrates the half-max boundary extraction on selected flat bottom holes and slots.

In order to compare the EFBH estimation with the observed width, a quantity called the "width ratio" is introduced. The width ratio ($\psi$, psi) is defined as the ratio of the simulation estimated EFBH (or EUG) diameter to the half-max calculated width as expressed in equations (48a) and (48b), $$\psi = \frac{D_{EFBH}}{w_{hm}}, \tag{48a}$$

$$\psi = \frac{D_{EUG,\%\mu}}{w_{hm}}. \tag{48b}$$

A correlation of the width ratio measurements is established on the calibration standard FBHs with gamma. The $\psi$ ratio is observed to be close to one for round FBHs. If the anomaly is not like a gapping delamination such that heat is partially conducted or transmitted through the anomaly, then the EFBH diameter estimation is expected to be smaller. Therefore, $\psi$ correlates to the degree of heat transmission through the anomaly. The heat transmission through the anomaly occurs due to heat conduction through the air present in the delamination gap, contact between the delamination faces, or the bridging of material in the delamination gap. It is hypothesized that a ratio close to one for round anomalies implies that the indication is similar to a flat bottom hole or a gapping delamination. The lower values of width ratio will have more inaccuracies in depth assessment. Therefore, another ratio called the amplitude ratio is introduced. The ratio can be calculated for linear indications of flat bottom slots or linear delaminations. The $D_{EFBH}$ is expected to measure slightly more than the actual width due to effect of the length, but little effect is expected in the accuracy of $w_{hm}$. Accordingly, comparing $\psi$ between a round FBH and a long slot with the same depth and width equal to the diameter of the FBH, a higher $\psi$ should be expected for the slot. The effect of length contribution in the contrast evolution is minimal beyond a length of 1.5 times the width.

In order to compare the EFBH diameter estimation with the measured half-max width, a quantity called the "amplitude ratio" is introduced. Similar to the width ratio, this ratio is intended to evaluate the transmissivity or the gap thickness of the anomaly. If a delamination has contact (0>Γ>−1) between the faces, the heat will transmit through the delamination. A term related to the thermal mismatch factor (Γ) is multiplied to the exponential term inside the summation sign in equation (1). In the contrast evolution equation (23), it is assumed to have a value of minus one. A value of 0<Γ<−1 results in lower peak contrast compared to the flat bottom hole of same size (Γ=−1), but the overall shape and the peak time are advanced due to the change in direction of the effective heat flow (e.g., a decrease in angle θ). Here, the half-max width ($w_{hm}$) is used as an input to the IR Contrast simulation. The depth and the amplitude constant inputs to the simulation are adjusted to match the simulation. The value of the diameter constant is obtained from the calibration. The amplitude constant is changed to provide a best match with the measured data. This amplitude constant is denoted by $C_{Ae}$ and is called the "anomaly evaluation amplitude constant." The ratio of the evaluation amplitude constant and the calibrated amplitude constant is called the amplitude ratio and is denoted by (zeta), which is expressed in equation (49a), $$\zeta = \frac{C_{Ae}}{C_A}. \tag{49a}$$

The amplitude ratio compares the peak contrast (amplitude) of the anomaly with the peak contrast of an equivalent flat bottom hole of same depth and diameter. Thus, a ratio close to one would imply that a round anomaly is similar to the FBH. A lower value would imply that there is material bridging, a thin gap, or contact within the anomaly. The lower values also are likely accompanied by mismatch in shapes of the measured contrast and predicted FBH contrast evolutions. The circumstance of the material bridging provides adherence of the material above the anomaly, but a mere contact may not. The anomaly transmissivity measure or the contrast attenuation is defined in equation (49b), $$\mu = 1 - \zeta. \tag{49b}$$

The attenuation ranges from zero to one. Higher attenuation value indicates more heat transmission through the anomaly. A value of one indicates full transmission and a value of zero indicates no heat transmission, similar to the circumstance of no heat transmission in a FBH. The heat transmission through the anomaly is also due to partial contact or gap within the anomaly region. The heat may also transmit through the anomaly if the gap is too small, as thinner air gaps are more conductive than the larger gaps. The effect of anomaly transmission results in reducing the angle (θ) of the effective heat flow. The effective heat flow is related to γ and $A_c$. Therefore, the calibration curves which are functions of $A_c$ can be developed for anomalies with controlled transmission (e.g., known air gap thickness or effective gap conductivity and thickness). Thus, the EFBH analysis can be extended to assumed equivalent uniform gap (EUG) diameter and depth.

A selected image area (or point) with a contiguous mosaic of fixed number of pixels is called the region of interest (ROI). The smallest ROI would contain just a single pixel. The next larger-sized ROI would comprise nine pixels in three rows and three columns. Usually, the rows and columns of pixels are equal, with an odd number of pixel columns and rows providing symmetry about the center pixel. In some embodiments, the intensity of the ROI is the average of all pixel intensities contained in the ROT, and the pixel coordinate of the center pixel is assigned as the location of the ROI. Measurement accuracy of the half-max width is affected by the size of the ROI. Therefore, a term called the "pixel resolution ratio", 2 is defined as expressed in equation (50a), $$\lambda = \frac{w_{hm}}{R}. \tag{50a}$$

In order to compare the ROI size with the width of the anomaly, another ratio parameter, $\lambda'$, is defined as expressed in equation (50b), $$\lambda' = \frac{w}{R}, \tag{50b}$$

where R is the size of the region of interest for the measurement pixel and w is the width or diameter of the anomaly.

The size of a single pixel is also known as the instantaneous field of view (IFOV). A quantity called the slit response function (SRF) is determined experimentally for the IR camera to determine the resolution of the combination of the camera and lens. The slit response function provides a relationship between the slit width (e.g. width of a warm object) at constant temperature with the measured relative intensity. Usually, the slit width should be a minimum of 3 to 5 pixels to register over 90 percent of maximum relative intensity. Thus, the width of an IR indication needs to be at least 4 times ($\lambda$=4) the ROT size. An ROI with pixel size of 0.025 inch would be sufficient to measure the contrast on anomalies with width (or half-max width) larger than 0.1 inch. In other words, an indication with a half-max width of 0.1 inch can be satisfactorily measured with an ROT having a maximum dimension of 0.025 inch. Lower values of $\lambda$ cause averaging of the pixel intensity of the measurement ROI, resulting in lower contrast. If two ROIs of same size but different number of pixels are compared, the ROI with more pixels would have less noise in the intensity value.

For curved surfaces, some defocusing is inevitable due to varying distances of the test object's surface to the lens. The defocusing reduces the resolution by smearing the edges of the indication. In the above case, the ROI needs to be smaller than 0.025 inch to account for smearing due to the effect of defocusing. Although A values of larger than 4 may be satisfactory to measure contrast, it is not sufficient to measure the half-max width. The half-max width measurement resolution (ROI size) should be an order of magnitude smaller than the measurement (i.e., $\lambda$>10). For $\lambda$, values lower than ten are likely to introduce higher uncertainty in the half-max width measurement and the width ratio. Smaller pixel size, however, provides better imaging of surface texture, but provides more variation in contrast data for detection of subsurface delaminations. Thus, a real small pixel size may not provide the most repeatable results. A pixel size that is one fourth of the feature size to be detected may provide a better compromise between the contrast repeatability and the resolution needed for the half-max width measurement.

The peak contrast amplitude and peak contrast time are the two most important features that define the approximate shape of the contrast evolution curve. The simulation available from the ThermoCalc software program was used to study the correlation between the normalized contrast peak time and the peak amplitude for selected values of both the diameter and the depth of flat bottom holes. The simulation provided by ThermoCalc is based on finite difference modeling of the test object's temperature, as shown in FIG. 20. FIGS. 21($a$) and 21($b$) show similar contrast maps from the calibrated IR Contrast method described herein with respect to a test object made of RCC. The maps show similar trends but are different in magnitude due to the differences in material properties, assumptions, and accuracy of the models. The results of the simulation indicate that each combination of a FBH diameter and depth provides a unique combination of the corresponding peak time and peak amplitude for higher values of the contrast. Lines may be drawn through the constant diameter and the constant depth data points to form a grid. The constant diameter grid lines do not intersect for a peak contrast value above a certain threshold. The constant depth grid lines also do not intersect each other. The plot indicates that it is possible to assess the depth and diameter from the measured contrast evolution curve if the peak contrast amplitude is above a certain threshold within the calibration space for the depth and diameter. The plot also suggests that the peak contrast is higher for higher values of D/d, e.g., $\gamma$=20. The IR Contrast method is intended to capture the dependence of the peak contrast and the peak time on the diameter and depth using the calibration. The shape of the contrast evolution is usually taken from a thermally isotropic material with high $\gamma$ values. The IR Contrast prediction would be applicable to materials and anomalies with similar $\gamma$ values.

The IR Contrast method seeks to estimate the EFBH diameter and depth of the anomaly. As the peak contrast value decreases below a certain threshold, accuracy of establishing unique values of depth and diameter decreases. Accuracy in locating the peak contrast time and other times (e.g., $t_{50L}$ and $t_{50R}$) decreases significantly for lower peak contrast signals due to the correspondingly low signal to noise ratio. Deeper flaws provide long persistence time and lower peak amplitude, causing flattening of the contrast evolution curve at the peak point and reducing the accuracy of locating the peak time. Consequently, the accuracy of the depth measurement is reduced. Similarly, sensitivity of the peak contrast to the change in diameter decreases for deeper flaws. Thus, the accuracy of estimating $\gamma$ and the diameter also decreases for deeper flaws. Therefore, EFBH depth and diameter estimation is limited within a certain range of depth and $\gamma$ values. For deeper flaws, if an approximate value for one of the two parameters (e.g., depth or diameter) is known, the other may be assessed with better accuracy instead of estimating both the EFBH depth and diameter simultaneously.

For example, consider a layered material with different thermal properties for each layer. The thermal response is affected by the variation in the layer thicknesses within a test object. The calibration standards should use the layer thickness covering the range of actual layer thicknesses. For a material with a coating layer, the thermal response is affected by the variation in thickness of the coating. An appropriate calibration file corresponding to the coating thickness should be used. The IR Contrast model uses three calibration constants (e.g., the amplitude constant, the diameter constant, and the depth constant) as the primary means to match the prediction to the measured data. The validation process should assess the degree of fit using any of the indices discussed here. In some situations, it might be prudent to establish the reference evolution from a reference anomaly (e.g. a FBH or flat bottom slot) in the desired material with nominal properties and establish limits on prediction ($\gamma$ and $\omega$) in the neighboring region of the reference anomaly (e.g. $\gamma_{ref}$ and $\omega_{ref}$). The values of the evolution shape constants may also be changed in some embodiments. The model uses a single value for diffusivity for prediction of a single contrast evolution.

Layered materials may be anisotropic in diffusivity. If the in-plane (lateral) and through thickness (normal) diffusivities are significantly different then the diffusivity experienced by the thermal conduction in the heat trapping volume, the surrounding area may be different at different post-flash times and may cause the shape of the contrast evolution to be different compared to the contrast evolution from an isotropic material having the same value for $\gamma$. Thus, the lateral heat flow in the trapped volume is affected by the lateral diffusivity, while the heat flow in the surrounding area is dominated by the normal diffusivity. The contrast evolution shape is affected by interaction of these two heat flows. If lateral heat diffusivity is significantly different than normal diffusivity, then the contrast evolution curve beyond $t_{peak}$ is not likely to be useful for depth estimation, as it relates more to the difference between the lateral diffusivity and the normal diffusivity. The contrast evolution is dictated by heat diffusion in the reference and measurement ROIs. The primary factor affecting the contrast evolution near the peak time is heat diffusion in the direction dictated by $\gamma$ for the FBH. The diffusivity experienced by the heat flow not only depends upon the value of $\gamma$, but also upon the layer thickness in the heat trapping volume and the in-plane and normal diffusivities in each layer. Thus, the diffusivity is dependent on the direction of the dominant heat flow. At different times in the contrast evolution, the direction of the dominant heat flow changes, and therefore the effective diffusivity experienced by the heat flow can be different at different points of time during the contrast evolution for an anisotropic material. For an anisotropic material, correlation between the depth and the effective diffusivity may be established to improve the contrast prediction.

The depth estimation is likely to be more reliable based on the contrast evolution up to the peak time and particularly for the portion of curve between $t_{50L}$ and $t_{peak}$. If the effective diffusivity does not differ significantly from the normal diffusivity, then the calibration profiles may compensate for the anisotropy. For a layered material with a given $\gamma$, the effective diffusivity of the FBH may be dependent on the depth. Accordingly, in most embodiments the IR Contrast method needs a single diffusivity value and may be limited to a range of $\gamma$ values for an anisotropic material to limit the variation in the effective diffusivity.

Comparison of the simulated evolution to the real evolution provides an estimation of the EFBH depth and diameter. Anomalies may or may not be circular in shape. Anomalies may be elongated in shape and have a portion of perimeter concave outward. In such situations, contrast is measured at a point of maximum localized intensity on a line drawn across the localized width of the indication. The intensity at this point is affected mostly by the closest boundary of the anomaly (e.g. width) and to a lesser extent by the continuation of the anomaly in the direction of length. The IR Contrast measurements on the elongated flat bottom holes indicate that as the aspect ratio ($\phi$) increases beyond one, the length contributes to contrast amplitude, but the derivative of slope d $\overline{C}_w$/dl is negative, implying diminishing contribution of length to the contrast amplitude with increasing length. In practice, the contrast evolution is not affected by aspect ratio of 1.5 and above for high gamma values. Consider a case with two anomalies at the same depth, one with a round shape, and the other with a square shape such that the diameter equals the length of the side of the square anomaly. The square anomaly has 27 percent larger area compared to the round anomaly and consequently has a 13 percent larger equivalent FBH diameter. Thus, for elongated anomalies, the equivalent FBH diameter estimations are expected to be slightly larger than the physical width by 13 to 25 percent to account for the effect of the shape and length. The EFBH depth and diameter are expected to bear correlation to the actual width and depth of a delamination-like anomaly under certain limitations. FIG. 23(b) shows both the actual width and the equivalent diameter on holes numbered 3, 4, and 5 of an RCC test specimen as shown in FIG. 23(a).

If cracks are present in the heat trapping volume, the thermal response or the contrast evolution is affected. Cracks may have partial contact between the faying surfaces. Depending on the degree of contact, gap thickness, size, location and number of cracks in the heat trapping volume and the surrounding material, the thermal response is affected. If the crack distribution (cracks per unit surface area) is uniform and the same as in the calibration standard, then the effect of cracks can be accounted for by calibration. Consider for example a special case of a linear anomaly with a single crack running lengthwise through the center, bisecting the heat trapping volume. The crack length is at least as long as the width. The measurement pixel is located in the center of the anomaly width and right next to the location of the crack. Therefore, as the heat conducts through the trapping volume, it reaches the crack boundary before it reaches the anomaly. The measurement pixel is located close to the crack, and the transit time from the measurement pixel to the crack is shorter than the transit time to the next closest boundary, which is at a depth of the delamination. The effect of the crack boundary is felt earlier by the measurement pixel. This effect results in the advancement of the peak contrast time or appearance of a separate peak. If the peak is advanced, it also may result in an increase in the peak contrast value. However, the heat continues to diffuse to the anomaly and then around the edges of the anomaly. The persistence energy time is governed by the heat trapping volume and not by presence of a single crack. Therefore, as the contrast peak is advanced, the trailing side of the contrast evolution has lower amplitude so that the area under contrast evolution curve is more or less unchanged. The shape of the contrast evolution curve is also changed accordingly. The simulation based on the FBHs without cracks and matching EFBH simulation to the contrast evolutions from the crack containing anomalies result in a lower estimation of anomaly depth. The mismatch between the simulation and measured contrast evolutions at the peak contrast region may indicate the severity of the effect of the linear crack.

The extraction of optimal contrast evolution from the IR data-cube helps to achieve full potential of the IR Contrast analysis. Typically, three shapes of delamination-like anomalies are observed: round, elliptical, and elongated in the form of a strip. Examining the case of a round anomaly, the measurement ROI is located close to the geometrical center as determined by the highest intensity pixel, which is a unique pixel and can be easily located through user interface or by a computer algorithm. The contrast evolution is influenced by the measurement and the reference ROIs. The reference ROI can be located at a chosen radial distance and at any clocking orientation from the measurement ROI. A discussion of locating the measurement and reference ROIs follows:

Radial Distance of the Reference ROI:

The chosen radial distance is such that it locates the reference ROI just outside the anomaly footprint where the pixel intensity has no influence from the anomaly. Moving the reference ROI closer to the measurement ROI, the contrast amplitude starts reducing. If the reference ROI is located within the boundary of the anomaly footprint, it is likely that the contrast evolution has less amplitude than the maximum possible from the anomaly. Moving the reference ROI away from the anomaly, at a certain radial distance, the maximum in the contrast amplitude is reached. Moving further away, the reference ROI is less related to the measurement ROT and bias due to local (including lateral) heal flow effects at the reference ROI influencing the contrast evolution. Thus, there is an optimal radial distance range for the reference ROI where the contrast evolution is close to the ideal maximum possible from the anomaly and is mostly invariant with further increase in distance of the reference ROI. Typically, the location of the optimal reference ROI is determined by analyzing a frame with time in a range $t_{50R}$ to $t_{tail}$. The optimal reference ROI provides the shallowest possible depth estimation and the largest possible EFBH diameter estimation.

Reference ROI Clocking on Round Anomalies:

If there were no lateral heat currents (or temperature gradients), then the clocking of the reference ROI should not matter. However, in most circumstances, there are always some lateral heat currents due to the test object curvature, uneven flash heating, and change in material properties or thickness along the surface and proximity of the test object's edge. The lateral heat current from the reference to the anomaly indicates that the reference area is relatively warmer and the contrast evolution will be lower than the true contrast potential of the flaw. The reverse is true for the heat flow in the other direction. Assuming that the lateral heat flow (0 deg) has the same direction in the vicinity of the flaw where both the measurement ROT and the reference ROI data will be measured, consider two reference ROIs, one in the upstream (180 deg) of lateral heat flow and the other in the downstream (0 deg) of the lateral heat flow with respect to the measurement ROI, both located at the same radial distance from the measurement ROI. The two reference ROIs have opposing effect on the contrast evolution, i.e., the upstream reference ROI causes the contrast evolution to lower, whereas the downstream reference ROI causes it to be elevated. Thus, the act of averaging the two reference temperature profiles provides some compensation for the lateral heat flow. If the reference ROIs are clocked at right angles (+/−90 deg) to the heat flow, then the lateral heat flow has the least effect on the contrast evolution. Variation in the contrast evolution due to clocking can be minimized by choosing the reference ROI such that the contrast at the tail end of the contrast evolution (at $t_{tail}$) is nearly zero. Thus, a search of the optimum reference ROT providing zero tail end contrast is needed if a single reference ROI is used. Another method involves choosing many reference ROIs clocked uniformly over the full 360 degree rotation, each located at the same radial distance. The temperature profiles of these reference ROIs can be averaged to create an artificial reference ROI for contrast computation. In this case, it is not necessary to locate the optimal clocking, but only the optimal radial distance. The optimal clocking provides the lowest EFBH depth prediction and the EFBH diameter prediction somewhere in between the extremities of prediction from the un-optimized contrast evolutions.

Variation in the Measurement ROI Location: The measurement ROI is chosen at a location where the peak amplitude (at $t_{peak}$) of the pixel intensity is a maximum across a scan line that is approximately normal to the anomaly boundary. The area of the measurement ROI is chosen to be small, i.e., it is the size of a single pixel to minimize the effect of the area averaging. Consider a case of a round FBH where the reference ROI is located optimally and the location of the measurement ROI is changed from its optimal location. As the measurement ROI moves away from the optimal location, the contrast peak amplitude reduces and the peak time increases resulting in the increase in the EFBH depth estimation. It is observed that the EFBH diameter estimation diminishes slightly. The optimal measurement ROI provides the shallowest depth estimation. This observation can also be applied to a rectangular FBH. For instance, consider a rectangular FBH with the measurement ROI located at the center. The center location of the measurement ROI would be the optimum location. Imagine a centerline that runs parallel to the length of the anomaly. Moving the measurement ROI along the centerline away from the optimum location, the contrast estimations are affected depending upon proximity of the reference to the closest end of the anomaly. If the distance of the measurement ROI from the end is less than the width of the FBH, then a slight decrease in EFBH diameter is expected, similar to the case of a round FBH. Similarly, as the measurement ROI is moved closer to the end, an increase in EFBH depth is expected. The slight decrease in width estimation can be accounted as error in measurements. The increase in depth signifies a limit on the location of the measurement ROI.

The Reference ROI Locations for Elongated Anomalies:

For elongated and elliptical flaws, the uniform clocking over 360 degrees of rotation may not be applicable. Alternatively, two reference ROIs that are located on either side of the anomaly may be possible, and averaging of the reference ROIs may provide some compensation to the adverse effect of lateral heat flow. The reference ROI optimization schemes work only under the assumption that nearly uniform lateral heat flow (surface temperature gradient) exists in the zone between the measurement ROI and the reference ROIs. Thus, although reference ROI optimization is possible, it may not provide full compensation, especially if radial distance is too large. Alternatively, one may locate the anomaly area in the center of the flash-hood where the flash intensity is most uniform and the test object surface can be most normal to the camera line of sight, resulting in the least amount of lateral heat currents at the center of hood. Measurements performed at the center of symmetry of lateral temperature gradients may result in better results, as the temperature gradient is lower in the center compared to any other area.

Separate Reference ROI Evolution:

In the previous discussion, it was assumed that the reference ROI is located on the same part and same camera shot. However, there can be certain advantages of locating the reference ROI on a different part or different camera shot or both. The reference ROI evolution may be obtained from a separate part (e.g. NDE reference standard) in a "separate shot" taken on the reference standard. The reference standard may be located next to the part area being imaged so that part of the standard also appears in the "same shot", and the reference ROI then can be located on the NDE reference standard. The reference standard can be chosen to have optimal properties including flatness. Similarly, if a separate shot is chosen for the reference ROI, the reference ROI may be located exactly at the location of measurement ROI, thus improving chances of illuminating the reference area with same intensity of illumination. However, these benefits may not be realized if the reference standard has different thermal properties, or the presence of a separate reference standard influences the heat flow within the part inspected.

In some embodiments, better image resolution may be obtained using a small image pixel size. The measurement ROI is chosen at a location of the maximum intensity in the frame of maximum contrast ($t_{peak}$). It is located from the intensity versus the distance profile along a line drawn across the longer axis of the IR indication. Larger ROI size may reduce the peak amplitude (peak clipping or averaging) due to averaging of intensity over many pixels. A λ value of 4 may result in acceptable pixel intensity averaging. The reference ROI size is usually larger than the measurement ROI. The larger reference ROI provides better confidence in the temperature evolution of the reference area due to noise reduction and suppression of the texture effect. As the size of reference ROI is increased, its distance from the measurement ROI needs to be increased to prevent the reference ROI from running into the anomaly indication area. Typically, the reference ROI shall be outside the anomaly footprint (as defined by the half-max measurement) at time larger than $t_{50R}$. Increased distance between the measurement and the reference ROI may also cause issues with averaging over larger variations in the lateral heat flow or surface temperature gradients. Thus, reference ROI size cannot be increased beyond a certain limit. Use of a zoom lens reduces the pixel size and can provide better λ values. Stability of the camera with respect to the test object becomes more critical with a zoom lens due to the smaller pixel size.

The anomaly indication is formed due to the heat diffusion. Immediately after the flash or at the beginning of the heat diffusion ($t<t_{50L}$), the absorbed heat is concentrated at the surface. If the object surface has a surface texture in terms of surface roughness, then the incident heat flux has variation from peak to valley of the roughness topography. The peaks in the surface texture absorb higher flux compared to the valley areas, and the high points in the surface texture appear as hot spots with the size comparable to the physical size of each high point. The surface texture affects the lateral and normal heat conduction and is the other major factor causing hot spots in IR images immediately after flash time. A similar effect is observed when shallow surface cracks are present causing IR indication due to uneven cooling rates and the heat flow direction at either side of the crack. If a pixel size is larger than quarter of width ($\lambda<4$) of these features, then the pixel intensity can capture only a portion of the actual spot intensity. For a pixel diameter of about 0.023 inch, the smallest IR indication half-max width can be about 0.092 inch in order to have a measurement above 90 percent of maximum possible intensity. Thus, smaller (area and amplitude) indications appearing in the earlier frames are not measured adequately. For example, if one were to use a zoom lens to change from one to five, a dramatic increase in the pixel intensity of texture indications would be expected where pixels are located at the hot spots, with a corresponding decrease in intensity where pixels are located at the cooler spots. Thus, if surface texture is present in the part, the earlier portion of the contrast evolution curve ($t<t_{50L}$) may be more affected by the pixel size. With time, the heat diffuses and the texture indications fade away due to heat conduction. Smaller indications fade away before the larger ones. In most situations, indications due to subsurface delaminations and not due to surface texture are of interest. Delaminations larger than a certain threshold size are of interest. Therefore, the $\lambda_{anomaly}$ for the threshold size should be greater than four. The apparent $\lambda_{anomaly}$ measured at time $t_{50L}$ should be greater than four. The decay of the surface texture indications is dependent on many factors, such as the spatial frequency of the surface texture features and the depth of the surface features (including the surface crack depth). Thus, the texture indications are superimposed on the subsurface anomaly indication. FIG. 24 shows an early IR frame of flash thermography data for a graphite epoxy laminate. The image reveals a weave-like pattern due to surface texture with simple contrast evolutions illustrating the positive and negative texture peaks.

Near surface resolution (depth) refers to the ability to resolve the challenge of shallow delaminations. Shallow anomalies have a shorter peak time and persistence. FIG. 25 illustrates that a higher frame rate frequency provides better time resolution and definition of the contrast evolution. In the example of FIG. 25, the 60 Hz and lower frame rates do not capture the peak in the contrast evolution. In order to run automatic fit routines, one must capture the peak of the contrast. The near surface indications may be affected by the surface texture. Also, depending on extent of the texture effect, the near surface delaminations may not be discernible in the contrast evolution. A higher frame rate helps in improving definition of the early portion of the contrast evolution. The near surface resolution is affected by the anomaly size (or gamma) and the pixel resolution, among other factors.

The predicted contrast evolution curve is based on "calibration" of the numerical model to the real contrast evolution curves within certain limits on γ and ω. In most embodiments for contrast prediction, the material should be thermally isotropic, and the diffusivity and other thermal properties should be the same as the calibration reference standard. The calibration is usually done on a reference piece of the same material, and round flat bottom holes are used to simulate the anomalies. The reference evolution can be based on the reference material itself. If the IR Contrast is calibrated on the flat bottom round holes, then the IR Contrast approach predicts the diameter and depth of an equivalent flat bottom hole (EFBH) that provides a close match to the contrast measured on test hardware with a delamination-like anomaly. Comparison of the predicted contrast evolution curve to the measured contrast evolution curve is done under the following assumptions. The material properties between the calibration standard and the test object inspected are the same or are correlated (e.g., thermal properties including coating thickness for a two-layer material). The test object's thickness is similar to the calibration standard. The anomaly depth is much less than the test object's thickness (e.g. $\omega\ll1$). Values for omega that are close to one are not desirable, for in such situations the bottom of the test object would influence the contrast signature. A precise upper limit on w can be validated through calibration.

In the IR contrast method, it is assumed that the contrast evolution curve and measurements on the contrast evolution (the peak contrast, peak product time, persistence energy time, etc.) are only influenced by characteristics of the anomaly (e.g., anomaly or FBH depth, width, gap thickness and length) and not by any factors that are not related to the characteristics of the anomaly, such as proximity of the anomaly to the edge of the test object, proximity of the anomaly to the edge of the flash zone, a less than optimal choice of reference ROI location, lateral heat flow not related to the anomaly, and uneven flash heating. It is assumed that the contrast evolution curve is positive and has a shape similar to the contrast evolution curve for flat bottom holes (or other programmed anomalies) in the calibration reference standard. Factors not related to the anomaly characteristics are assumed to be small and assumed not to distort the contrast evolution from its expected shape similar to an ideal shape (i.e., a positive skewed distribution with sharp rise and gradual decay).

Natural anomalies are like delaminations and differ from FBHs. The contrast evolutions of the FBH and of delaminations of the same size are likely to differ to some extent due to additional mass below the delamination compared to the FBH. If the delamination-like controlled anomalies are available for calibration, then it is advisable to establish the reference evolution and the calibration curves to these anomalies to improve contrast prediction. In general, the additional mass under the delamination should cool the surface above the anomaly faster, possibly implying the need to use slightly higher depth constants (e.g., a higher diffusivity) in the simulation routine.

The IR Contrast technique assumes a high emissivity value (such as by way of non-limiting example, a value >0.8). Thus, the pixel intensity is assumed to be proportional to a positive power (3 to 10 approximately) of the absolute surface temperature. The polished inner sides of the flash-hood help to reflect the flash energy onto the test object, thereby maximizing the incident energy on the test object. The lamps are hot after flash, and the test object reflects the heat radiation from the lamps in proportion to the test object's reflectivity characteristic. The shiny inner sides of the flash-hood may act as four front-side mirrors and provide multiple mirror images of the flash lamps, resulting in a portion of pixel intensity that is not related to the test object's surface temperature. If a test object has low emissivity, high emissivity paint can be applied to the test object to improve the emissivity to some extent. On the other hand, applying paint also introduces more variables, such as the thermal properties of the paint, introducing a potential new source of errors.

The emissivity is dependent on wavelength of the incident radiation. The test object may have a different value of emissivity for visible and infrared wavelengths. Flash radiation comprises visible white light, but after the visible radiation stops the lamps radiate infrared radiation (part of afterglow) at much lower intensity. The slow decay after the peak intensity time in the flash is undesirable, as it has the effect of reducing contrast. A square flash pulse of a given duration provides the most contrast but is impractical. It is recommended to keep the flash duration constant (e.g. 3 ms) during calibration and inspection. In some embodiments, the test object should have high emissivity for both visible light and thermal radiation. The object surface angle with the camera's line of sight affects thermal absorption, radiation, and the resulting contrast measurements.

The flash-hood uses two long flash lamps with length along the inner roof and on either side of the camera lens. The lamps provide fairly uniform incident light radiation (<5 percent variation) at the hood opening. Thus, the heat illumination can be thought to have a direction parallel to "the center axis of the hood." The camera lens is located at the center of the hood. In some embodiments, for a flat test object that is located at the hood opening with the camera "optics axis" (optic centerline) pointing to the center of hood opening, the line of sight from the camera lens center to the area at the center of hood is collinear with the optic axis and normal to the surface of the test object. In areas of the test object that are away from the center of the hood, the line of sight makes an angle called the line of sight angle with the normal to the surface of the test object. The heat emission in the direction of the line of sight is received by the camera. The line of sight angle increases as the distance of the area increases from the optic axis.

For a diffuse radiator, the emissivity changes as a function of the cosine of the radiation angle measured from the line that is normal to the surface of the test object, and it is assumed to follow Lambert's law. Thus, the measured intensity is of maximum value if the ROI is located on the optic axis. If both the measurement ROI and the reference ROI have about the same line of sight angle, then the effect of angle on the contrast is minimized. In at least some embodiments, centering the area where contrast measurements are extracted provides exemplary measurements.

In another embodiment, the test object is curved with a sloping step. In this embodiment, the direction of the surface normal is not collinear with the hood axis at many locations of the surface of the test object, particularly including the sloping surface. The angle between the surface normal and the hood axis can be considered to be the incident angle of the flash radiation. The intensity of the incident radiation is proportional to the cosine of the incident angle. The absorption of incident energy is also proportional to the cosine of the angle for a diffuse radiator. Thus, surfaces with surface normals that are not collinear with the hood axis receive less flash radiation, and they absorb less of the received radiation. If the surface also makes a line of sight angle with the camera, then the emitted radiation is proportional to the cosine of the line of sight angle. Thus, the angle of the object surface affects the pixel intensity and measured temperature from the pixel intensity. The curvature of the test object and the test object's surface angle result in undesirable surface or lateral temperature gradients that can be accommodated.

The calibration profiles of the diameter and amplitude constants are about the same for thermally isotropic materials. This similarity implies that, once we calibrate the predicted evolution on a set of different FBHs with high $\gamma$ values, the calibration is applicable to other materials under certain conditions, such as the requirement of high emissivity and similar range of $\gamma$ values. The procedure involves calibrating the predicted contrast evolutions using the measured contrast on FBHs of a reference material with known diffusivity ($\alpha_{ref}$). The calibration involves plotting the diameter and amplitude constants (e.g. $C_D$ and $C_A$) versus the flaw size parameter ($A_C$) using the value of the depth constant equal to one ($C_{d,ref}=1$). To measure the diffusivity on an isotropic material of interest, FBHs with identical $\gamma$ values are machined in the sample. Measured contrast evolutions on the sample are obtained. Next, using the measured evolutions, the simulation fit with the closest actual diameter and depth as input is found. The diameter and amplitude constant from the calibration profiles of the reference material are used. The only variable in play while seeking the simulation fit is the depth constant, which is chosen by trial and error. The effective diffusivity of the material is determined using equation (51), $$\alpha_e = \alpha_{e,ref} \frac{C_d}{C_{d,ref}}, \qquad (51)$$

For isotropic materials, the effective diffusivity is a measure of the material diffusivity.

A flowchart for the process of measuring the effective thermal diffusivity using this method is provided in FIG. 26. At step 2605, flash thermography video data is recorded as digital frames for a known size flat bottom hole found in a material of interest. At step 2610, contrast evolution data on a flat bottom hole with known depth and diameter is extracted. At step 2615, the contrast evolution is computed, followed by the filtering of the contrast evolution at step 2620. At step 2625, the peak contrast, the peak contrast time, the left fifty percent peak time, and the right fifty percent peak time are calculated. Next, at step 2630, a simulation contrast evolution match with known diameter and depth values and assumed depth constant values is performed. At step 2635, the delta square between the simulation contrast and the filtered contrast is calculated. At decision step 2640, the calculated delta square is compared to the value from the previous iteration. If the change in value is less than a set specified value, then the effective diffusivity can be computed using equation (51) at step 2645. If the change is greater than a set specified value, then the process continues by going to step 2650, where the depth constant value is changed, before looping back to step 2630 to perform the step of matching the simulation contrast evolution to know values.

The peak contrast and peak contrast time are two important parameters in the IR Contrast analysis. The peak contrast value is controlled by the size parameter Ac and it is independent of the diffusivity. For identical FBH in two materials with different diffusivities, the two peak contrast values of the contrast evolutions are the same, but the peak contrast time for the material with the higher diffusivity is shorter compared to the other material. The effect of the increase in the diffusivity is similar to the effect of decreasing depth of the FBH, provided the value of γ is kept about the same. The effect of doubling the depth is equivalent to changing diffusivity to about one fourth of the prior value. The effect of change in the diffusivity and depth is illustrated in FIG. 27. The change in the diffusivity of the test object due to mechanisms such as mass loss, off-gassing, or chemical reaction can be assessed by monitoring the peak time (or $t_{50L}$). The change in peak time provides a measure to assess the change in diffusivity, provided that anomaly dimensions and transmissivity do not change. The lack of change in the peak contrast (including peak time) of an anomaly contrast evolution suggests that there is no change in the size of the anomaly and in transmissivity.

The effect of change in the diameter of an anomaly as to the contrast is illustrated in FIG. 28. An increase in the diameter increases both the peak contrast and the peak contrast time. The effect of the anomaly's transmissivity (or attenuation) on the contrast is illustrated in FIG. 29. Depending upon the anomaly transmissivity, the peak amplitude is affected. In one embodiment, the calibration curves for a selected attenuation can be generated with the help of an independent simulation, such as using the software program ThermoCalc. The approach first involves generation of the calibration curves corresponding to flat bottom holes.

A flow diagram for generating calibration curves for flat bottom holes without attenuation is illustrated in FIG. 30. At step 3005, flash thermography video data is recorded as a series of digital frames for calibration using a set of flat bottom holes of known size and made of a material of interest. Next at step 3010, contrast evolution data on all flat bottom holes with known depth and diameter is extracted. At step 3015, contrast evolution for selected contrast data in the hole of interest is computed and filtered. At step 3020, the peak contrast, the peak contrast time, the left fifty percent peak time, the right fifty percent peak time, and the flaw size parameter are calculated. At step 3025, simulation contrast evolution match with known diameter and depth values, depth constant value of one, and correct material diffusivity is performed as well as the selection of diameter and amplitude constant values. At step 3030, the delta square between the simulation contrast and the filtered contrast is calculated. At decision step 3035, the calculated delta square value is compared with the value from the previous iteration and if the change is less than a specified set value, then the diameter and amplitude constant for the flaw size parameter are finalized at step 3040. If not, the process continues to step 3052, wherein the diameter and/or the amplitude constant value(s) are changed, and then the process loops back to step 3025. After step 3040, the process continues to decision step 3045, wherein it is determined whether all calibration hole data of interest has been analyzed. If it has not, the process loops back to step 3015. If it has, then the process continues to step 3050, wherein the calibration data of diameter constant and amplitude constant versus the flaw size parameter are plotted and a calibration data file is created. At step 3054, the calibration file is loaded into the IR contrast application. From here, a parallel set of steps is performed, including at step 3055 the creation of a contrast map and at step 3060 the calculation of the adjusted flaw size parameter as a function of gamma.

Next, in another embodiment, a ThermoCalc simulation of the same size (diameter and depth) and different gap thicknesses is undertaken. The gap thicknesses range from large (which are considered to be the same as the flat bottom hole) to thin gaps. The simulation provides the temperature contrast evolutions for each void of interest. Both the peak contrast and the peak time are noted for each contrast evolution. For each void, the peak time is divided by the peak time of the corresponding flat bottom hole (same diameter and same depth) to obtain the peak time ratio. For each void, the peak contrast is divided by the peak contrast of the corresponding flat bottom hole (same diameter and same depth) to obtain the peak contrast ratio or attenuation. A plot of the peak time ratio to the peak contrast ratio is generated as shown in FIG. 31(*a*). A table with values of the peak time ratio is generated at a selected attenuation (e.g. 50%) as shown in FIG. 31(*b*).

FIG. 32 provides a flowchart of the process for generating attenuated calibration curves. The process begins at step 3205, wherein flash thermography surface temperature response in thin gap delaminations and flat bottom holes are simulated using ThermoCalc or other simulation software. At step 3210, peak time ratio versus peak contrast ratio (or attenuation) plots are created for various gamma values for each gap thickness. At step 3215, the IR contrast simulation is opened and loaded with the calibration for flat bottom holes. The selected depth and diameter are used as inputs to obtain a simulated contrast, and the flat bottom hole peak contrast and peak time are noted. At step 3220, an attenuation level is chosen, for example μ=50%, and an attenuated peak contrast is computed as μ times the flat bottom hole peak contrast. The peak time ratio is then noted and the attenuated peak time is calculated as the peak time ratio times the flat bottom hole peak time. At step 3225, the diameter and amplitude constants are set (manually) to achieve correct values of attenuated peak contrast and peak time. The diameter and amplitude constants are noted as well as the corresponding flaw size parameter. At step 3230, a decision is made whether all relevant hole sizes have been analyzed covering the desired range for the flaw size parameter. If not, then the process returns to step 3215. If all relevant hole sizes have been analyzed, then the process continues to step 3235, wherein calibration curves of diameter and amplitude constant versus flaw size parameter for the chosen value of attenuation are generated and a calibration file is created. At step 3240, the attenuated calibration file for the attenuated contrast prediction is loaded in the IR contrast application. The process then continues by performing two additional steps. At step 3245, the measured filtered contrast evolution is loaded and either an automated or manual simulation match is performed. Also from step 3240, an attenuated contrast map is generated at step 3250.

Figure 9B:
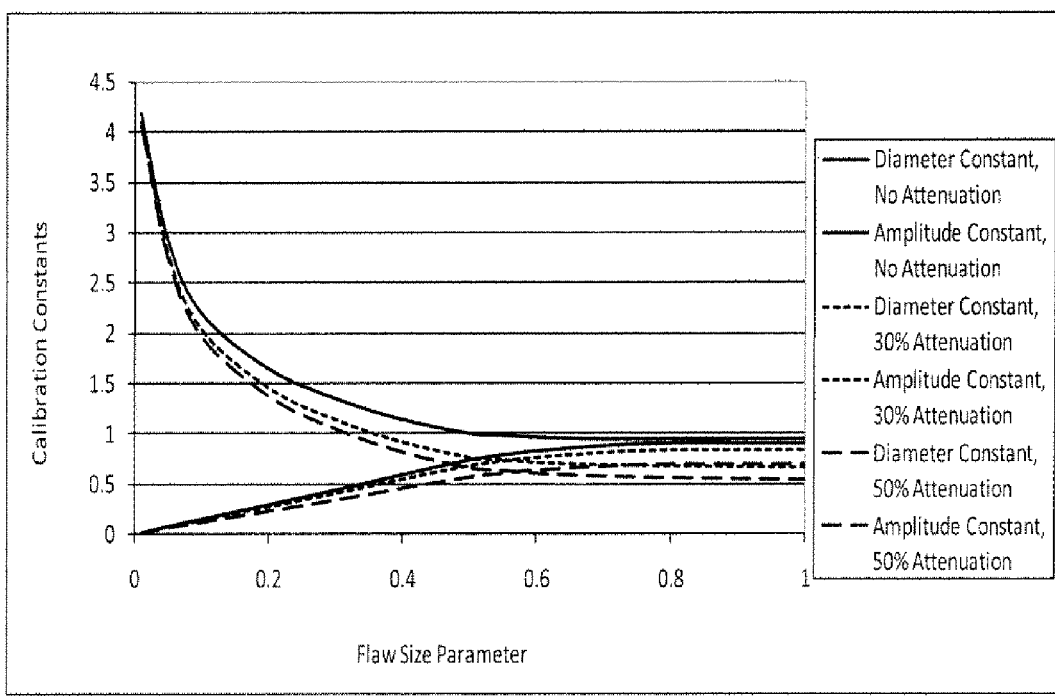

In some layered materials, the effective diffusivity may be depth dependent. If the diffusivity varies monotonically between a range of depths of interest, then calibration can account for the depth dependence of the diffusivity. The depth constant calibration is controlled by the empirical equation (52), $$C_{d,d} = C_{d,b} + S_d \text{Log}\left(\frac{d}{d_b}\right), \quad (52)$$

where $C_{d,d}$ is the depth constant at depth d, $C_{d,b}$ is the depth constant for base depth (e.g. 2.9), $S_d$ is the slope for the depth constant (e.g., −0.9), d is the value for delamination, FBH, or uniform gap depth, $d_b$ is the base depth for a calibration FBH, and $\chi = d/d_b$ is the depth to base depth ratio or simply depth ratio. The amplitude constant may also be depth dependent. Equations (53) and (54) capture the relationship between the amplitude constant for base depth and variable depth, $$C_{A,d} = C_{AF,d} C_{A,b,\mu} \text{ and} \quad (53)$$

$$C_{AF,d} = C_{AF,b} + S_{AF,d} \text{Log}\left(\frac{d}{d_b}\right), \quad (54)$$

where $C_{A,d}$ is the amplitude constant for a given depth d, $C_{AF,d}$ is the amplitude factor for a given depth d, $C_{A,b,\mu}$ is the amplitude constant from the calibration curve for a base depth and given attenuation $\mu$, $C_{AF,b}$ is the amplitude factor at base depth, usually 1, and $S_{AF,d}$ is the slope for the amplitude factor (e.g., −0.1). Moreover the calibration curves for given calibration can be customized for a chosen attenuation level using equations (55) and (56), $$C_{D,\mu} = C_{D,0} - S_{D,\mu}(A_c)^\eta \text{ and} \quad (55)$$

$$C_{A,\mu} = C_{A,0} S_{A,\mu}, \quad (56)$$

where $\mu$ is the attenuation or transmissivity measure, $C_{D,\mu}$ is the diameter constant for attenuation $\mu$, $C_{D,0}$ (same as $C_D$) is the diameter constant for no attenuation, $S_{D,\mu}$ is the slope for the diameter constant, $A_c$ is the flaw size parameter, $C_{A,\mu}$ is the amplitude constant for attenuation $\mu$, $C_{A,0}$ is the amplitude constant for no attenuation, $S_{A,\mu}$ is the slope for the amplitude constant and is chosen by best fit (for example $\eta=0.25$), which depends upon the value for $\mu$. FIG. 9(a) is a graph of the calibration curves for the diameter constant and amplitude constant. FIG. 9(b) shows an example of calibration curves for no attenuation (FBH) and with 30 percent and 50 percent attenuation. For thin gaps with 50 percent attenuation, the contrast map indicates much lower peak contrast and peak times. The contrast application can choose a FBH calibration or the corresponding percent attenuation calibration. For long indications, the EFBH or EUG width estimations are higher than the actual width due to the length to width aspect ratio of greater than one. If the data contains only long indications, one may set-up the calibration on long slot (aspect ratio >3) standards using width in place of the diameter. In this situation, correction for the length effect will not be needed for most of the length of the indication except near the ends.

Delaminations typically have their largest gap in the center, and the gap tapers off towards the edge or boundary of the delamination. There is a limit on the fractional range of attenuation (e.g., $\Delta\mu_{lim}=0.5$) that influences the contrast evolution, primarily depending upon the gap thickness and the gap thickness slope (dg/dw) profile in a tapering delamination. The fractional range on the attenuation is defined in equation (57), $$\Delta\mu_{lim} = (\mu_{edge} - \mu_{min})/(1 - \mu_{min}). \quad (57)$$

Here, the variable $\mu_{min}$ is the attenuation corresponding to the optimum location of the measurement ROI, which in most circumstances also corresponds to the location of the maximum gap thickness and therefore has a relatively minimum value. The term $\mu_{edge}$ is the attenuation at a location close to the half-max boundary and defines the edge of the primary region of measurement. EFBH (or EUG) analysis assumes that the contrast evolution is within the prediction region as shown in the dashed lined box of FIG. 21(a). If the peak time and peak contrast coordinate pair lie outside the prediction region or on the boundaries of the prediction region, then the estimates will likely be inaccurate. A spatial pixel intensity profile along the major and the minor axis of the anomaly can be evaluated to determine if the anomaly falls within the contrast prediction region. Any shape other than a shape of sharp bell curve for the intensity profile along any of the major or minor axes would clearly indicate that the anomaly span exceeds the maximum prediction limit along that direction.

An example of experimental data of width ratio (EFBH diameter/half-max width) versus the actual gap in the specimens made of RCC is provided in FIG. 33(a). The results show a correlation between the delamination gap and the width ratio. FIG. 33(b) shows an experimental correlation between a gap correlation parameter (peak product time/half-max width$^2$) and the gap thickness from the same flash thermography data used in FIG. 33(a). The results of FIG. 33(b) also show a correlation between the delamination gap and the gap correlation parameter.

An example of simulation results using ThermoCalc are shown in FIG. 34. The simulation was done on uniform square voids. A gap correlation parameter is defined as the peak product time divided by the width$^{2.3}$ (i.e., the width to the power of 2.3). The simulation indicates a better correlation for thinner gaps. The simulation and experimental results provide evidence of correlation between the gap correlation parameter and the gap thickness.

The IR Contrast approach provides two methodologies to analyze the flash thermography video data for characterization of delamination-like anomalies. The first methodology involves measurements such as the peak contrast, the peak product time, the peak time to contrast ratio, the persistence energy time, and the peak time, which can be plotted against the location of the measurement. These measurements show some correlation to the anomaly's depth (peak time to contrast ratio), the width of the anomaly (half-max), and the gap of the anomaly (ratio of peak product time to half-max width). These measurements are also applicable to measurement of surface cracks. An aspect of this approach is conversion of the flash thermography digital video data to the normalized contrast datacube. The contrast values of each pixel and the extracted contrast evolution features (e.g. peak contrast, peak time) of each pixel are used to generate 2-D (frame) images.

The second methodology involves matching the calibration-based predicted contrast evolution to the measured contrast evolution. The matching of the simulated evolution to the measured contrast evolution provides size and depth of the equivalent flat bottom hole or equivalent uniform gap with a known attenuation. The EFBH (or EUG) depth and diameter are shown to bear correlation to the width, the depth, and the gap thickness of the measured anomaly. Comparison of the EFBH (or EUG) evolutions with measured contrast evolutions, to provide evaluation of delaminations in terms of the depth (EFBH or EUG depth), the width (half-max), the gap thickness (width ratio of the EFBH or EUG diameter to half-max width) and the presence of surface cracks (EFBH diameter and depth estimations), confirms correlation to the width, the depth, and the gap thickness of the measured anomaly.

Another aspect of the first methodology is the half-max edge detection, which is considered to be the primary measurement of the width, and the IR Contrast EFBH (or EUG)

diameter prediction is considered to be the secondary. Any difference in the two width measurements is thought to be due to non-uniformity of the gap thickness, the value of the gap thickness, the heat transmissivity across the delamination, as well as the limitations of the two estimations. Both the half-max and the EFBH provide analysis of the area of delamination within a certain fractional range of attenuation that is weighed heavily by the width containing a relatively thicker gap in the center (primary region of measurement) and is weighed hardly at all by the thin gap portion of the delamination at the periphery. The width ratio provides correlation with the delamination gap thickness in the primary region of measurement. A flowchart that diagrams these methodologies is given in FIG. 17.

FIG. 35 is a block diagram illustrating an apparatus for characterizing anomalies in a material in accordance with embodiments described herein. Apparatus 3510 comprises a processor 3515 and a memory unit Processor 3515 is configured to perform computations and general control operations, and memory unit 3520 is configured to acquire data 3525, store a set of instructions to calibrate the IR camera system and process the data 3530, analyze the data 3535, and to evaluate an anomaly for size, depth, gap thickness, and material diffusivity 3540.

In light of the principles and exemplary embodiments described and illustrated herein, it will be recognized that the exemplary embodiments can be modified in arrangement and detail without departing from such principles. Also, the foregoing discussion has focused on particular embodiments, but other configurations are contemplated. In particular, even though expressions such as "in one embodiment," "in another embodiment," or the like are used herein, these phrases are meant to reference the possibilities of embodiment generally, and are not intended to limit the embodiment described to one particular configuration. As used herein, these terms may reference the same or different embodiments that may be combinable into other embodiments.

Similarly, although exemplary processes have been described with regard to particular operations performed in a particular sequence, numerous modifications could be applied to those processes to derive numerous alternative embodiments. For example, alternative embodiments may include processes that use fewer than all of the disclosed operations, processes that use additional operations, and processes in which the individual operations disclosed herein are combined, subdivided, rearranged, or otherwise altered.

In view of the wide variety of useful permutations that may be readily derived from the exemplary embodiments described herein, this detailed description is intended to be illustrative only, and should not be taken as limiting the scope of the embodiments described herein. What is claimed as the invention, therefore, are all implementations that come within the scope of the following claims and all equivalents to such implementations.

Thus, although only a few exemplary embodiments have been described in detail above, those skilled in the art will readily appreciate that many modifications are possible in the exemplary embodiments without materially departing from the novel teachings and advantages of the invention. Accordingly, all such modifications are intended to be included within the scope of the invention as defined in the following claims. In the claims, means-plus-function and step-plus-function clauses are intended to cover the structures or acts described herein as performing the recited function and not only structural equivalents, but also equivalent structures. Thus, while a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method for characterizing an anomaly in a material, the method comprising:
    extracting contrast data;
    measuring a contrast evolution;
    filtering the contrast evolution;
    measuring a peak amplitude of the contrast evolution;
    determining a diameter and a depth of the anomaly, wherein determining the diameter and the depth of the anomaly called direct depth estimation comprises:
        calculating a multiplier M and a flaw size parameter $A_c$ using an amplitude constant $C_A$ equal to one for a first iteration of determining the diameter and the depth of the anomaly and for subsequent iterations of determining using an amplitude constant derived from an amplitude constant calibration curve;
        calculating an adjusted diameter to depth ratio $\gamma'$;
        estimating the depth of the anomaly using a diameter constant $C_D$ equal to one for the first iteration of determining the diameter and the depth and for subsequent iterations of determining using a diameter constant derived from a diameter constant calibration curve;
        estimating the diameter of the anomaly;
        comparing the estimate of the depth of the anomaly after each iteration of estimating to the prior estimate of the depth of the anomaly to calculate a change in the estimate of the depth of the anomaly; and
    repeating the step of determining the diameter and the depth of the anomaly until the change in the estimate of the depth of the anomaly is less than a set value.

2. The method of claim 1, wherein measuring a contrast evolution comprises calculating a normalized pixel intensity contrast, wherein calculating a normalized pixel intensity contrast comprises calculating a ratio of:
    a change in pixel intensity at a measurement region of interest minus a change in pixel intensity at a reference region of interest compared to the sum of the change in pixel intensity at the measurement region of interest and the change in pixel intensity at the reference region of interest.

3. The method of claim 1, wherein measuring a contrast evolution comprises calculating a normalized temperature contrast, wherein calculating the normalized temperature contrast comprises calculating a ratio of:
    the difference between a change in temperature at a measurement region of interest and a change in temperature at a reference region of interest to the sum of the change in temperature at the measurement region of interest and the change in temperature at the reference region of interest.

4. The method of claim 1, wherein filtering the contrast evolution comprises applying at least one of: an FFT filter, an infinite impulse response filter, a finite impulse response filter, an exponential running average filter, an alpha beta filter, and a Kalman filter.

5. The method of claim 1, wherein calculating a multiplier M comprises calculating a ratio of the peak amplitude of the contrast evolution that is measured to the peak amplitude of a reference contrast evolution.

6. The method of claim 5, wherein the flaw size parameter $A_c$ is calculated according to the equation of:

$$A_c = \frac{M}{\epsilon' \zeta C_A C_5},$$

wherein $\epsilon'$ is a ratio of a normalized pixel intensity contrast to a normalized temperature contrast, $\zeta$ is an amplitude ratio; and $C_5$ is a contrast evolution shape constant.

7. The method of claim 1, wherein the amplitude constant derived from the amplitude constant calibration curve comprises using the flaw size parameter $A_c$ calculated according to the equation of:

$$A_C = 1 - e^{-\left(\frac{\gamma' C_9}{C_4}\right)},$$

wherein $C_4$ is a contrast evolution shape constant, and $C_9$ is a contrast evolution shape constant.

8. The method of claim 1, wherein the adjusted diameter to depth ratio $\gamma'$ is calculated according to the equation of:

$$\gamma' = (-(\ln(1 - A_c))C_4)^{\frac{1}{C_9}},$$

wherein $C_4$ is a contrast evolution shape constant, and $C_9$ is a contrast evolution shape constant.

9. The method of claim 1, wherein estimating the depth (d) of the anomaly is calculated according to the equation of:

$$\frac{1}{d^2} = \left( \frac{(t' - C_8)\left(1 - e^{\frac{\gamma'}{C_1}}\right)}{C_3 \left(e^{\frac{C_6}{\gamma'}}\right)} - C_7 \right) \frac{1}{C_d \alpha_e t},$$

wherein d is the depth of the anomaly, t is a time; t' is a normalized time, $\alpha_e$ is an effective thermal diffusivity, $C_1$, $C_3$, $C_6$, $C_7$, and $C_8$ are constants, and $C_d$ is a depth constant.

10. The method of claim 1, wherein estimating the diameter (D) of the anomaly is calculated according to the equation of:

$$D = \frac{\gamma' d}{C_D},$$

wherein d is the depth of the anomaly.

11. The method of claim 1, wherein the set value equals a user defined percentage.

12. An apparatus for characterizing an anomaly in a material, the apparatus comprising:
one or more processors; and
one or more memory units coupled to the one or more processors,
the apparatus being constructed and arranged to:
extract contrast data;
measure a contrast evolution;
filter the contrast evolution;
measure a peak amplitude of the contrast evolution;
determine a diameter and a depth of the anomaly, wherein determining the diameter and the depth of the anomaly called the direct depth estimation comprises:
calculating a multiplier M and a flaw size parameter $A_c$ using an amplitude constant $C_A$ equal to one for a first iteration of determining the diameter and the depth for subsequent iterations of determining using an amplitude constant derived from an amplitude constant calibration curve;
calculating an adjusted diameter to depth ratio $\gamma'$;
estimating the depth of the anomaly using a diameter constant $C_D$ equal to one for a first iteration of determining the diameter and the depth and for subsequent iterations of determining using a diameter constant derived from a diameter constant calibration curve;
estimating the diameter of the anomaly;
comparing the estimate of the depth of the anomaly after each iteration of estimating to the prior estimate of the depth of the anomaly to calculate a change in the estimate of the depth of the anomaly; and
repeat the act of determining the diameter and the depth of the anomaly until the change in the estimate of the depth of the anomaly is less than a set value.

13. The apparatus of claim 12, wherein the apparatus being constructed and arranged to measure a contrast evolution comprises means for calculating a normalized pixel intensity contrast evolution, wherein calculating the normalized pixel intensity contrast evolution comprises calculating a ratio of:
the difference between a change in pixel intensity at a measurement region of interest and a change in pixel intensity at a reference region of interest to the sum of the change in pixel intensity at the measurement region of interest and the change in pixel intensity at the reference region of interest.

14. The apparatus of claim 12, wherein the apparatus being constructed and arranged to measure a contrast evolution comprises means for calculating a normalized temperature contrast evolution, wherein calculating the normalized temperature contrast evolution comprises calculating a ratio of;
the difference between a change in temperature at a measurement region of interest and a change in temperature at a reference region of interest and to the sum of the change in temperature at the measurement region of interest and the change in temperature at the reference region of interest.

15. The apparatus of claim 12, wherein the apparatus being constructed and arranged to filter the contrast evolution comprises at least one of: an FFT filter, an infinite impulse response filter, a finite impulse response filter, an exponential running average filter, an alpha beta filter, and a Kalman filter.

16. The apparatus of claim 12, wherein the apparatus being constructed and arranged to calculate the multiplier M comprises means for calculating a ratio of the peak amplitude of the contrast evolution that is measured to the peak amplitude of a reference contrast evolution.

17. The apparatus of claim 16, wherein the flaw size parameter $A_c$ is calculated according to the equation of:

$$A_c = \frac{M}{\epsilon' \zeta C_A C_5},$$

wherein $\epsilon'$ is a ratio of a normalized pixel intensity contrast to a normalized temperature contrast, $\zeta$ is an amplitude ratio, and $C_5$ is a contrast evolution shape constant.

18. The apparatus of claim 12, wherein the amplitude constant derived from the amplitude constant calibration curve comprises using the flaw size parameter $A_c$ calculated according to the equation of:

$$A_C = 1 - e^{-\left(\frac{\gamma'^{C_9}}{C_4}\right)},$$

wherein $C_4$ is a contrast evolution shape constant, and $C_9$ is a contrast evolution shape constant.

19. The apparatus of claim 12, wherein the adjusted diameter to depth ratio $\gamma'$ is calculated according to the equation of:

$$\gamma' = (-(\ln(1 - A_c))C_4)^{\frac{1}{C_9}},$$

wherein $C_4$ is a contrast evolution shape constant, and $C_9$ is a contrast evolution shape constant.

20. The apparatus of claim 12, wherein estimating the depth (d) of the anomaly is calculated according to the equation of $$\frac{1}{d^2} = \left(\frac{(t' - C_8)\left(1 - e^{\frac{\gamma'}{C_1}}\right)}{C_3\left(e^{\frac{C_6}{\gamma'^2}}\right)} - C_7\right)\frac{1}{C_d \alpha_e t},$$

wherein d is the depth of the anomaly, t is a time, t' is a normalized time, $\alpha_e$ is an effective thermal diffusivity, $C_1$, $C_3$, $C_6$, $C_7$, and $C_8$ are constants, and $C_d$ is a depth constant.

21. The apparatus of claim 12, wherein estimating the diameter (D) of the anomaly is calculated according to the equation of:

$$D = \frac{\gamma' d}{C_D},$$

wherein d is the depth of the anomaly.

22. The apparatus of claim 12, wherein the set value equals a user defined percentage.

23. The apparatus of claim 12 further comprising:
a flash lamp;
an IR camera operatively connected to the one or more processors and the flash lamp;
data acquisition electronics operatively connected to the IR camera; and
a power supply/trigger unit operatively connected to the flash lamp, the power supply/trigger unit being operatively connected to the one or more processors, the one or more memory units, and the data acquisition electronics, the one or more processors being configured with a set of instructions to trigger lighting of the flash lamp and to initiate the acquisition of the contrast data.

24. A computer program product stored on a non-transitory computer operable medium, the computer program product comprising software code being effective to characterize an anomaly in a material by comprising a set of instructions to:
extract contrast data;
measure a contrast evolution;
filter the contrast evolution;
measure a peak amplitude of the contrast evolution;
determine a diameter and a depth of the anomaly, wherein determining the diameter and the depth of the anomaly called the direct depth estimation comprises:
calculating a multiplier M and a flaw size parameter $A_c$ using an amplitude constant $C_A$ equal to one for a first iteration of determining the diameter and the depth and for subsequent iterations of determining using an amplitude constant derived from an amplitude constant calibration curve;
calculating an adjusted diameter to depth ratio $\gamma'$;
estimating the depth of the anomaly using a diameter constant $C_D$ equal to one for the first iteration of determining the diameter and the depth of the anomaly and for subsequent iterations of determining using a diameter constant derived from a diameter constant calibration curve;
estimating the diameter of the anomaly;
comparing the estimate of the depth of the anomaly after each iteration of estimating to the prior estimate of the depth of the anomaly to calculate a change in the estimate of the depth of the anomaly; and
repeat the step of determining the diameter and the depth of the anomaly until the change in the estimate of the depth of the anomaly is less than a set value.

25. The computer program product of claim 24, wherein the software code being effective to measure a contrast evolution comprises a set of instructions to calculate a normalized pixel intensity contrast evolution, wherein the step of calculating the normalized pixel intensity contrast evolution comprises calculating a ratio of:
the difference between a change in pixel intensity at a measurement region of interest and a change in pixel intensity at a reference region of interest to sum of the change in pixel intensity at the measurement region of interest and the change in pixel intensity at the reference region of interest.

26. The computer program product of claim 24, wherein the software code being effective to measure a contrast evolution comprises a set of instructions to calculate a normalized temperature contrast evolution, wherein the step of calculating the normalized temperature contrast evolution comprises calculating a ratio of:
the difference between a change in temperature at a measurement region of interest and a change in temperature at a reference region of interest to the sum of the change in temperature at the measurement region of interest and the change in temperature at the reference region of interest.

27. The computer program product of claim 24, wherein the software code to filter the contrast evolution comprises a set of instructions for applying at least one of: an FFT filter, an infinite impulse response filter, a finite impulse response filter, an exponential running average filter, an alpha beta filter, and a Kalman filter.

28. The computer program product of claim 24, wherein the software code to calculate the multiplier M comprises a set of instructions for calculating a ratio of the peak amplitude of the contrast evolution that is measured to the peak amplitude of a reference contrast evolution.

29. The computer program product of claim 28, wherein the flaw size parameter $A_c$ is calculated according to the equation of:

$$A_c = \frac{M}{\varepsilon' \zeta C_A C_5},$$

wherein $\varepsilon'$ is a ratio of a normalized pixel intensity contrast to a normalized temperature contrast, $\zeta$ is an amplitude ratio, and $C_5$ is a contrast evolution shape constant.

30. The computer program product of claim 24, wherein the software code being effective to use the amplitude constant derived from the amplitude constant calibration curve comprises a set of instructions for using the flaw size parameter $A_c$ calculated according to the equation of:

$$A_C = 1 - e^{-\left(\frac{\gamma' C_9}{C_4}\right)},$$

wherein $C_4$ is a contrast evolution shape constant, and $C_9$ is a contrast evolution shape constant.

31. The computer program product of claim 24, wherein the software code being effective to calculate the adjusted diameter to depth ratio $\gamma'$ comprises a set of instructions for calculating $\gamma'$ according to the equation of:

$$\gamma' = (-(\ln(1 - A_c))C_4)^{\frac{1}{C_9}},$$

wherein $C_4$ is a contrast evolution shape constant, and $C_9$ is a contrast evolution shape constant.

32. The computer program product of claim 24, wherein the software code comprises a set of instructions for estimating the depth (d) of the anomaly according to the equation of $$\frac{1}{d^2} = \left( \frac{(t' - C_8)\left(1 - e^{\frac{\gamma'}{C_1}}\right)}{C_3 \left(e^{\frac{C_6}{\gamma'}}\right)} - C_7 \right) \frac{1}{C_d \alpha_e t},$$

wherein d is the depth of the anomaly, t is a time, t' is a normalized time, $\alpha_e$ is an effective thermal diffusivity, $C_1$, $C_3$, $C_6$, $C_7$, and $C_8$ are constants, and $C_d$ is a depth constant.

33. The computer program product of claim 24, wherein the software code comprises a set of instructions for estimating the diameter (D) of the anomaly according to the equation of:

$$D = \frac{\gamma' d}{C_D},$$

wherein d is the depth of the anomaly.

34. The computer program product of claim 24, wherein the set value equals a user defined percentage.

* * * * *